US012738060B1

(12) United States Patent
Lam et al.

(10) Patent No.: US 12,738,060 B1
(45) Date of Patent: Sep. 15, 2026

(54) VISUAL EVENT PROCESSING USING LANGUAGE MODELS

(71) Applicant: Amazon Technologies, Inc., Seattle, WA (US)

(72) Inventors: Kent V Lam, Diamond Bar, CA (US); Amey Laxman Gawde, Foothill Ranch, CA (US); Kevin Roderick Sellon, Santa Ana, CA (US); Pijung Roy Chen, Diamond Bar, CA (US); Dongyang Huang, Bellevue, WA (US); Shivakumar Venkatakrishna, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 150 days.

(21) Appl. No.: 18/759,294

(22) Filed: Jun. 28, 2024

(51) Int. Cl.

| | |
|---|---|
| ***G06V 20/40*** | (2022.01) |
| ***G06F 16/732*** | (2019.01) |
| ***G06V 20/52*** | (2022.01) |

(52) U.S. Cl.
CPC .......... *G06V 20/47* (2022.01); *G06F 16/7328* (2019.01); *G06V 20/52* (2022.01)

(58) Field of Classification Search
CPC ..... G06V 20/47; G06V 20/52; G06F 16/7328
See application file for complete search history.

(56) References Cited

U.S. PATENT DOCUMENTS

| | | | | |
|---|---|---|---|---|
| 11,393,253 | B1 * | 7/2022 | Maron | G06Q 30/0601 |
| 2020/0310749 | A1 * | 10/2020 | Miller | G06F 3/167 |
| 2023/0334857 | A1 * | 10/2023 | Goldstein | G06V 20/41 |
| 2025/0111674 | A1 * | 4/2025 | Li | G06V 10/82 |

FOREIGN PATENT DOCUMENTS

CN 117237488 A * 12/2023

OTHER PUBLICATIONS

Ju, Chen, et al. "Prompting visual-language models for efficient video understanding." European conference on computer vision. Cham: Springer Nature Switzerland, 2022.https://link.springer.com/chapter/10.1007/978-3-031-19833-5_7 (Year: 2022).*

* cited by examiner

*Primary Examiner* — Han Hoang
(74) *Attorney, Agent, or Firm* — Eversheds Sutherland (US) LLP

(57) ABSTRACT

Systems and methods for visual event processing using multi-modal language models include receiving, at a first device, first user input data representing a first user command to store occurrence of a type of visual, auditory or other event over time, the event associated with a physical activity involving movement, sound, or other type of detectable physical stimuli. An activity indicator describing the activity may be stored in the first device. The first device's functionality can be extended to process data from the sensors of a second device. As such, the activity indicator stored in the first device can be used to process a first query requesting that a model identify the activity from the data. The model may determine that the data depicts the activity and a first output (natural language, notification, smart home device response, etc.) may be generated indicating occurrence of the event.

20 Claims, 19 Drawing Sheets

Receive first user input data representing first user command to store activity indictor representing occurrence of visual event, visual event associated with activity in environment
902

Store activity indicator in device
904

Generate, utilizing activity indicator stored in device, first query requesting that LM identify activity from image data, wherein LM is disposed on device and is configured to determine results utilizing image data as input
906

Determine, at device utilizing LM and first query, that image data depicts activity
908

Store first data indicating occurrence of visual event based at least in part on LM determining that image data depicts activity
910

Receive second user input data representing natural language request associated with stored visual events
912

Determine, utilizing LM and based at least in part on second user input data, that natural language request is associated with visual event
914

Generate first natural language response to second user input data indicating that visual event has been detected, wherein generating first natural language response is based at least in part on first data indicating occurrence of visual event
916

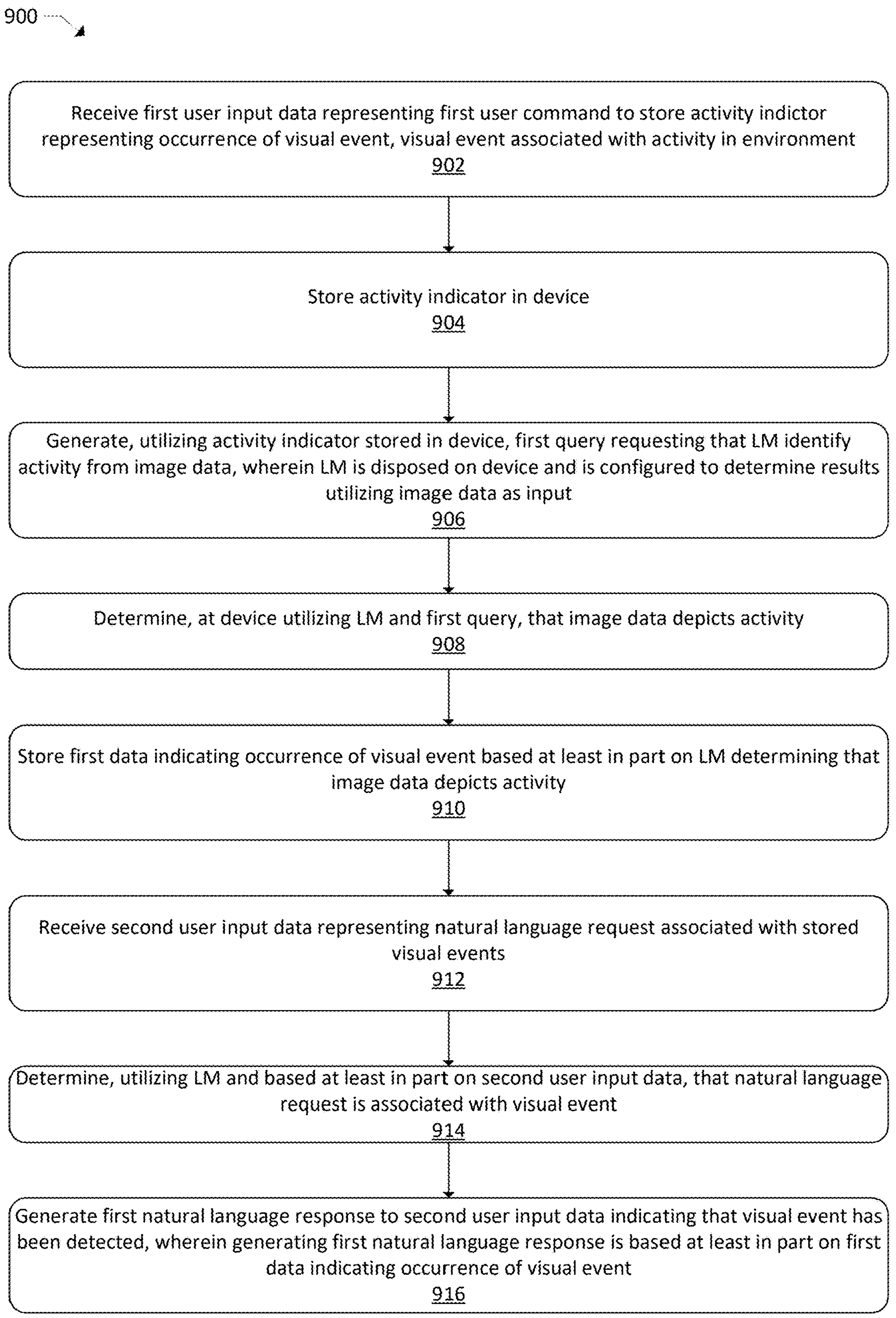

FIG. 9

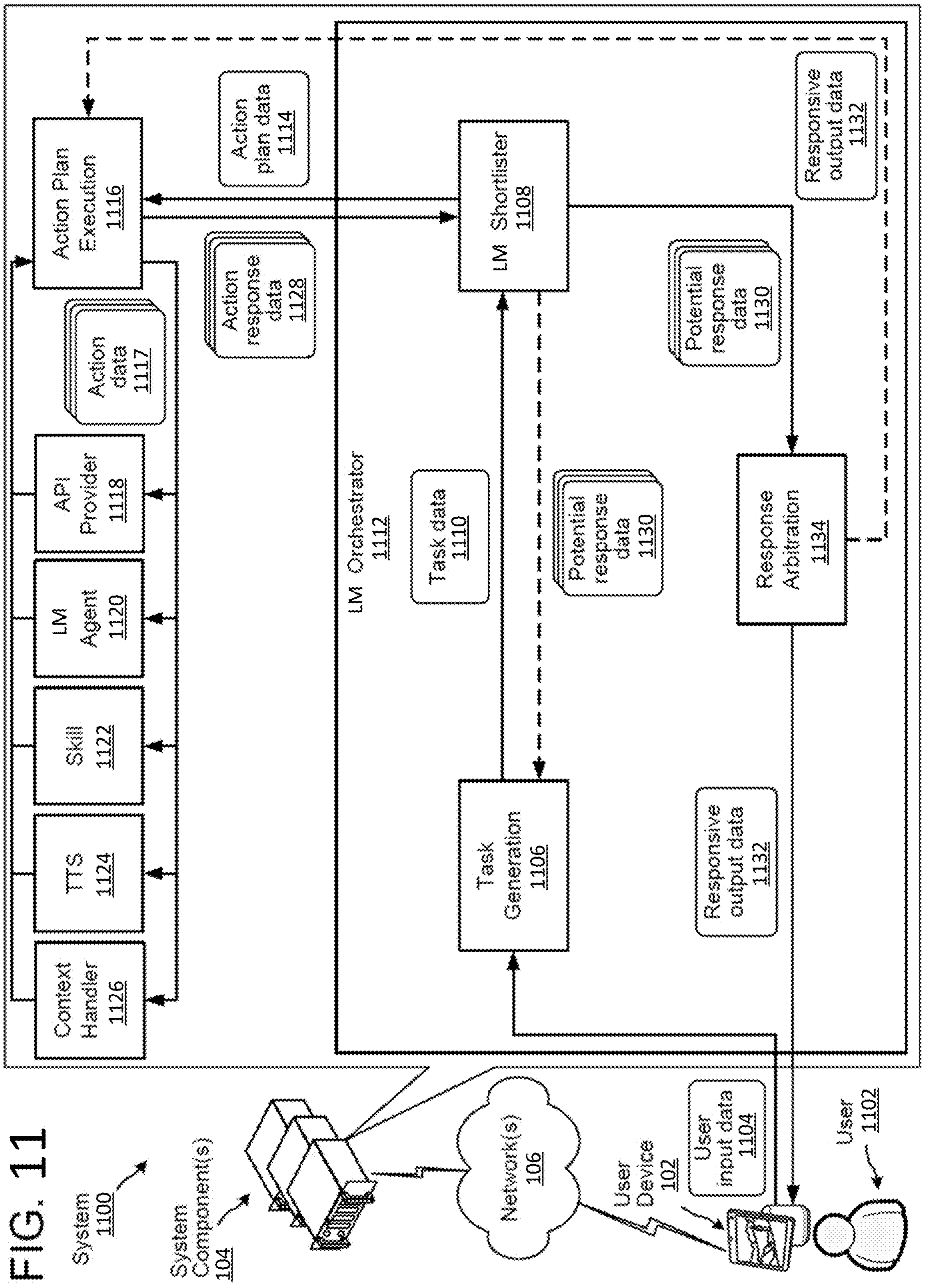

FIG. 11
System 1100
System Component(s) 104
Network(s) 106
User Device 102
User input data 1104
User 1102
Context Handler 1126
TTS 1124
Skill 1122
LM Agent 1120
API Provider 1118
Action data 1117
Action Plan Execution 1116
Action response data 1128
Action plan data 1114
LM Orchestrator 1112
Task data 1110
Task Generation 1106
LM Shortlister 1108
Potential response data 1130
Responsive output data 1132
Potential response data 1130
Response Arbitration 1134
Responsive output data 1132

LM Shortlister 1108
Task data 1110
Shortlister Prompt Generation 1302
Prompt data 1304
Relevant API data 1308
API Retrieval 1306
Relevant API data 1308
Index Storage 1312
Shortlister Language Model 1310
Action data 1117
Action plan data 1114
Action response data 1328
Context Handler 1126
TTS 1124
Skill 1122
LM Agent 1120
API Provider 1118
Action response data 1128
Action Plan Execution 1116
Potential response data 1314

System 1100
WW Detection 1404
User Device 102
Audio 1402
Audio Data 1406
Image Data 1408
System Component(s) 104
Text data 1410
User Device 102
Orchestrator 1412
Arbitrator 1414
ASR 1090
User Recognition 1416
Profile Storage 1418
Context Handler 1126
TTS 1124
System Directed Detector 1420
Action Plan Execution 1116
Skill Component 1422
LM Orchestrator 1112
Skill System Component(s) 1450

1502

Image Data Processing 1504

Feature Extraction 1506

Object Detection Classifier 1508

Number Of Objects 1510

Object Attributes 1512

Position 1514

Object Detection Classifier 1516

Number Of Objects 1518

Segment Object Detection 1520

Object Attributes 1522

Match Object To Identifier 1524

VISUAL EVENT PROCESSING USING LANGUAGE MODELS

BACKGROUND

Devices, including voice interface devices, have become available. Some of these devices may be utilized to perform actions in environments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 9 illustrates a flow diagram of another example process for visual event processing using LMs.

FIG. 11 is a conceptual diagram illustrating example components and processing of a system configured to determine a response to a user input, according to embodiments of the present disclosure.

DETAILED DESCRIPTION

Figure 1:
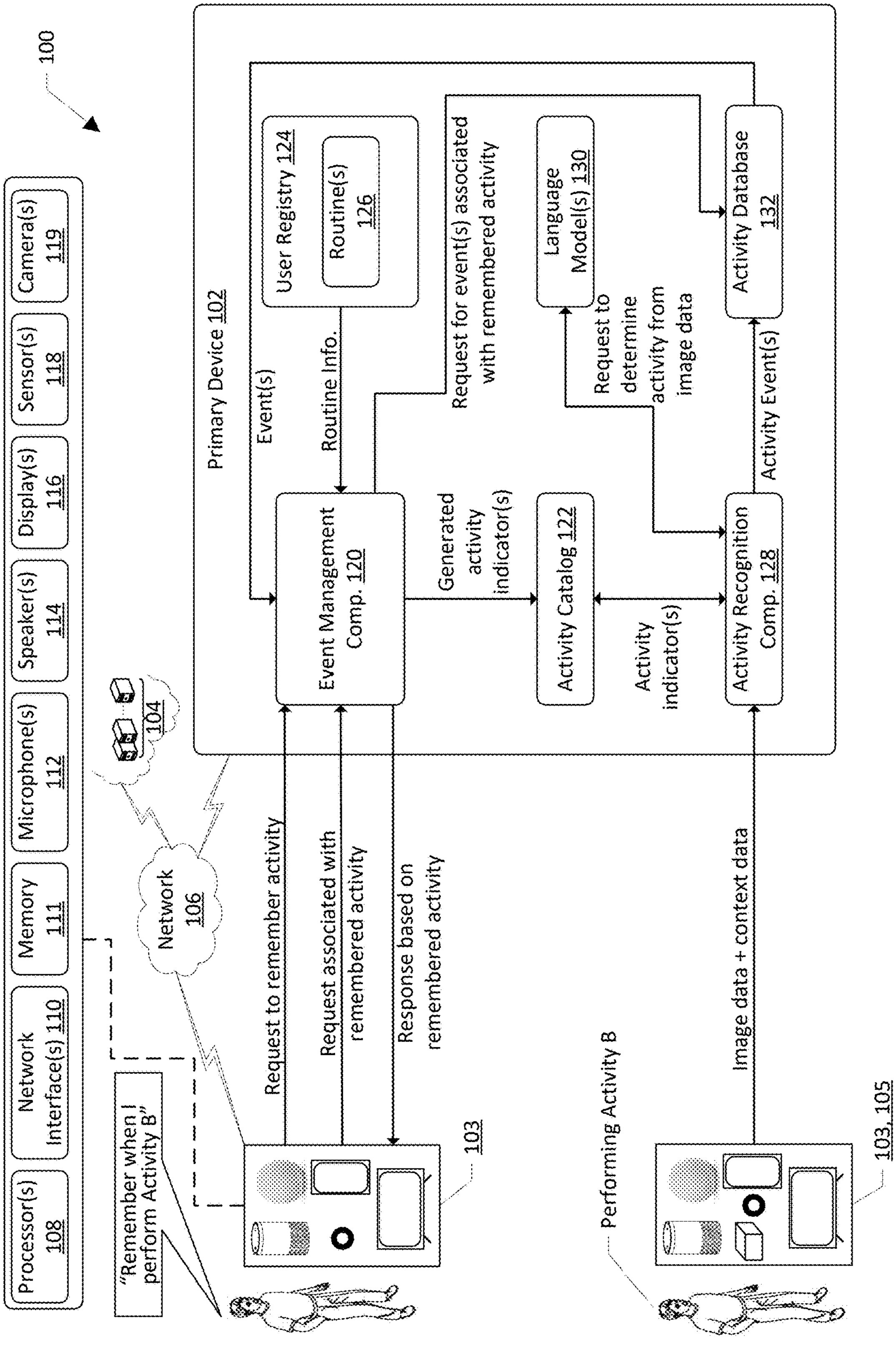
FIG. 1 illustrates a schematic diagram of an example environment for visual event processing using language models (LMs).

Systems and methods for visual event processing using LMs are disclosed, among other things. Take, for example, an environment (such as a space in and/or around a home, hotel, vehicle, office, store, restaurant, etc.) where one or more devices may be present. The devices may be utilized by users or may otherwise be utilized to detect and/or control conditions associated with the environments. For example, the electronic devices may include voice interface devices (e.g., smart speaker devices, mobile phones, tablets, personal computers, televisions, appliances like refrigerators and microwaves, etc.), graphical interface devices (e.g., televisions, set top boxes, virtual/augmented reality headsets, etc.), wearable devices (e.g., smart watch, earbuds, healthcare devices), transportation devices (e.g., cars, bicycles, scooters, etc.), televisions and/or monitors, smart thermostats, security systems (including motion sensors and open/close sensors, including sensors that indicate whether a security system is armed, disarmed, or in a "home mode"), smart cameras (e.g., home security cameras), and/or touch interface devices (tablets, phones, steering wheels, laptops, kiosks, billboard, other devices with buttons, etc.). Some devices can be multiple types of those noted above.

In these and other scenarios, a given environment may have a number of devices disposed therein. At least some of these devices may include a camera configured to capture images of the environment within a field of view of the camera and to generate corresponding image data. Such image data may generally be processed by sending the image data from devices in the environment to cloud-based components of a system with more computing power and/or computing resources than the devices in the environment. However, sending image data depicting users, objects, and/or activities from devices within a user's environment to remote components of a system can have various technical challenges. As such, on-device image data processing, particularly utilizing LMs as described herein, may be beneficial in some situations. To do so, a primary device disposed within the environment in which the image data is generated may be utilized to infer when certain activities are depicted in the image data and to perform actions associated with the inferred activities. As utilized herein, the primary device may be a device in the same environment as the devices and/or sensors (e.g., in the physical possession of the user) that are generating image data and/or sensor signals, but the primary device may have more processing power and plugged into power mains more regularly than other devices in the environment (e.g., refrigerator is usually plugged into the wall outlet while a smart watch, earbuds, or other wearable is often running on battery power when being used), and/or may be a device on which one or more LMs are stored, and/or may be a device that is selected as the device to perform processing on behalf of other devices in the environment and/or may be described as an edge server for a backend system. Additionally, when a LM is described herein as "inferring" or otherwise making an inference, it should be understood that the LM may determine a result from a prompt and data available to the LM.

In a nonlimiting example, a user may provide user input data to a device, and the user input data may request that a given activity be remembered or otherwise logged by the system. In this example, the user has provided an explicit instruction for images to be captured within the environment and for corresponding image data to be analyzed for the purpose provided by the user. In these and other examples, the user input data may be received at an event management component of the primary device. The event management component may analyze the user input data to determine an activity indicated by the user input data to be remembered over time. For example, the user input data may be "remember when I and/or Person A performs Activity B." In this example, the event management component may determine that the activity in question is Activity B. The event management component may also determine that the request to remember the activity includes one or more conditions, such as the activity being performed by a specific user (here Person A) and/or the activity being performed in association with a given object. An example of this may be a request to remember when a given user plays an instrument. The event management component, having determined the activity to be remembered and one or more conditions may generate an activity indicator that may be stored in an activity catalog of the primary device. The activity catalog may be called, as described in more detail below, for the activity indicator when analyzing subsequently received image data.

In another example, user account data associated with the primary device may be utilized to determine activities to be remembered and/or to generate activity indicators to be stored in the on-device activity catalog. For example, given user account data may indicate that one or more routines have been set up. As used herein, a routine may indicate that a given action is to be performed by one or more devices in the environment when a given trigger event occurs. A nonlimiting example of a routine may be that a specified light should turn on when motion is detected in a room where the light is disposed. The user account data may indicate actions and trigger events associated with routines, and these actions and trigger events may be utilized by the event management component to determine candidate activities to be remembered. Corresponding activity indicators may be generated by the event management component utilizing the routines of the user account data, and these activity indicators may also be stored in the on-device activity catalog.

Thereafter, visual events detected by one or more devices in the environment may be processed by the primary device utilizing the activity indicators in the activity catalog. For example, image data may be generated by one or more devices having a camera in the environment. To do so, in a nonlimiting example, the devices (and/or a different device) may determine when motion is detected in the environment and may commence capturing images based at least in part on detection of the motion. The image data may be sent from the various device(s) and/or sensor(s) to the primary device. A camera component of the primary device may receive the image data and may, in examples, perform filtering on the image data to determine one or more keyframes. As described in more detail below, the camera component may analyze changes in pixels frame by frame to determine which frames are sufficiently different from the preceding frame. When this occurs, such a frame of the image data may be selected as a keyframe for further analysis. The keyframes may then be sent to one or more components of the primary device for processing.

One of the components may be an object recognition component configured to analyze the keyframes utilizing one or more object classification models to recognize objects depicted in the images. In examples, contextual data such as which space the images were captured in (e.g., the images are from a device situated in a "kitchen" space or a "living room" space) may be utilized to select an object classification model, and the object classification model may analyze the keyframes to determine if the images depict any of the objects that the object classification model is trained to detect. Additional details on the object classification model, including the use of computer vision techniques to detect objects, is provided below. The object classification model may detect objects depicted in the images and may generate data indicating these recognized objects. The results of the object classification model may be stored in an on-device activity database to be utilized for further processing as described below.

Another of the components may be an entity recognition component configured to analyze the keyframes and/or contextual signals to recognize users depicted in the images. In examples, the image data itself may be utilized to identify features of a depicted user. Additional data such as device beaconing data, speech-related data, location data, etc. may be utilized by the entity recognition component to determine which user is depicted in the images, if any. Again, additional details on the detection of users utilizing image data and/or sensor data are provided below. The entity recognition component may detect users depicted in the images and may generate data indicating these recognized users (otherwise referred to herein as recognized entities). The results of the entity recognition component may be stored in the on-device activity database to be utilized for further processing as described below.

Another of the components may be an activity recognition component configured to utilizing on-device LMs to infer an activity being performed by a user depicted in the images. For example, the keyframes of the image data may be received by the activity recognition component, which may construct an image description prompt to be utilized by a LM configured to analyze image data to generate keyframe descriptions of activities depicted in images. To do so, the activity recognition component may query the activity catalog for the activity indicators stored therein. These activity indicators may be utilized to construct the prompt such that the LM is instructed to infer whether one or more of the activities associated with the activity indicators are occurring in the images. As used herein, the LM may be configured to receive, as input, one or more prompts to infer results and to utilize image data as input and/or to utilize text data as input. It should be understood however that a given LM may be configured to utilize image data, text data, or both image data and text data to infer results. When "visual LMs" are described, those LMs may be configured to utilize image data (as well as other data in examples) and may intake the keyframes of the image data and utilize the image description prompts to generate keyframe descriptions of activities inferred from the image data. These keyframe descriptions may be stored in the on-device activity database.

Although, with respect to activity recognition, a dual-model approach is described above where a visual LM is first utilized to generate keyframe descriptions and then a textual LM is utilized to generate activity descriptions from the keyframe descriptions, it should be understood that a multi-modal LM may be utilized instead of or in addition to the dual-model approach. When the multi-modal LM is utilized, the multi-modal LM may be provided image data, video data (e.g., a series of images), text data, and/or audio data associated with a given event. The multi-modal LM may utilize some or all of these data types along with the activity indicators from the activity catalog to determine whether the event is associated with one or more activities from the activity catalog.

In examples, the object recognition component, the activity recognition component, and the entity recognition component may be the same component and/or may be associated with a multi-modal LM that may be configured to recognize objects depicted in image data, to recognize entities depicted in image data, and to recognize activities as described herein. As such, when object recognition is described herein as being performed utilizing one or more object classification models, it should be understood that a multi-modal LM may be utilized in addition to or instead of the object classification models to recognize objects. Likewise, when entity recognition is described herein as being performed utilizing one or more entity recognition models, it should be understood that the multi-modal LM may be utilized in addition to or instead of the entity recognition models to recognize entities.

Thereafter, an event may occur that is associated with a request for a summary and/or identification of visual events inferred by the primary device. One nonlimiting example of such an event may be the receipt of user input data requesting a summary of the remembered visual events. By way of example, the user may have originally requested that the system remember when a given user plays piano. The primary device may infer when the given user played the piano over time utilizing the components described above, and those inferences may be stored in the activity database. Thereafter, a request for a summary of those audio/visual events, here the example being, say, "how long did I and/or Person A play the piano this week?" may be received. In examples, the event may request a recall of audio, visual or other types of events. In other examples, such as the example provided above, the event may request additional processing of the events as inferred by the primary device. Specifically, here, the additional processing may include determining a period of time when events should be identified as relevant (e.g., "this week"), determining what the relevant activity is (e.g., "playing the piano"), determining when the activity was performed by a specific user (e.g., Person A), and/or determining what response is requested (e.g., the response is a summary of how long the activity was performed in total, not necessarily a request to recall and/or show the detected visual event(s)). The event management component described herein may query the activity database for the recognized objects, recognized entities, and recognized activities stored therein and may utilize such data to generate a response to the summary request. In examples, one or more of the on-device LMs may be utilized to infer and/or generate the summary utilizing the data stored in the activity database. For example, a summary prompt may be constructed utilizing the data from the activity database and the prompt may request that a textual LM utilize the keyframe descriptions stored in the activity database to recognize the activity in question and to generate the requested summary. In the example above, the generated summary may be that Person A played the piano for a certain period of time. The generated summary may also include the image data associated with the activity, the keyframes, and/or contextual information utilized by the primary device to generate the summary.

Additionally, in some examples, image data may be processed by the primary device as described above, but that analysis may not yield detection of a given activity from the activity catalog. However, analysis of the image data may still yield a result where a given object is detected from the image data and/or that a given user is detected from the image data. In these examples, the results of such an analysis may still be stored in the activity database even though a predefined activity from the activity catalog was not inferred from the image data. Thereafter, a request for visual event information may be received. An example of this may be a user request such as "who left the kitchen drawer open?" In this example, the activity catalog may not have been previously populated with an activity indicator associated with opening and/or closing a kitchen drawer. However, the activity database may still include data from analyzed images indicating when certain image data depicted a kitchen drawer and which entities were identified in such image data. As such, the event management component may still be configured to query the activity database for such data and to provide a response to the request. As with the above example, the event management component may utilize one or more of the on-device LMs to infer a response to the request based on the data stored in the activity database.

Additionally, in examples, the primary device may be configured to determine how long to store image data, keyframes, and/or data from the activity database. For example, the storage of image data and other data on the primary device may be hampered by storage limitations and/or may not be optimal in some circumstances. As such, the primary device may be configured to determine how long such data should be stored. To do so, the primary device may determine to store the image data and the data in the activity database for a first period of time based at least in part on that data being associated with a detected visual event. In other words, when analysis of image data by the primary device indicates that occurrence of an activity from the activity catalog is detected, such image data and the resulting analysis thereof may be determined to be potentially more useful than in situations where motion is detected the activities from the activity catalog are not detected. In this latter example, the primary device may determine that the image data and/or other data associated with such image data should be stored for a second period of time that is less than the first period of time.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

Additional details are described below with reference to several example embodiments.

FIG. 1 illustrates a schematic diagram of an example environment 100 for visual event processing using LMs. The environment 100 may include, for example, a primary device 102. In certain examples, the primary device 102 may be any one or more of a voice interface device (e.g., smart speaker devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In some examples, the devices may be situated in a home, place of business, healthcare facility (e.g., hospital, doctor's office, pharmacy, etc.), in a vehicle (e.g., airplane, truck, car, bus, etc.), and/or in a public forum (e.g., shopping center, store, hotel, etc.), for example. In some nonlimiting examples, the primary device 102 may be a multi-modal device that may be configured to capture audio representing user utterances and/or to capture user input by a display or otherwise. The environment 100 may also include one or more other devices 103, 105, which may be the same or similar to the primary device 102 or may be devices with less processing power than the primary device 102 and/or may be devices that do not include an on-device LM configured to infer user presence as described herein.

The devices 102, 103, 105 may be configured to send data to and/or receive data from remote component(s) of a system 104, such as via a network 106. It should be understood that where operations are described herein as being performed by the remote component(s) of the system 104, some or all of those operations may be performed by the devices 102, 103, 105. It should also be understood that anytime the remote component(s) of the system 104 are referenced, that system may include any system and/or device, whether local to an environment of the devices or remote from that environment. Additionally, it should be understood that a given space and/or environment may include numerous devices. It should also be understood that when a "space" or "environment" is used herein, those terms mean an area of any size and delineation and can include but are not necessarily limited to a given room, building, or other structure, unless otherwise specifically described as such.

The devices 102, 103, 105 may include one or more components, such as, for example, one or more processors 108, one or more network interfaces 110, memory 111, one or more microphones 112, one or more speakers 114, one or more displays 116, one or more sensors 118, and/or one or more cameras 119. The microphones 112 may be configured to capture audio, such as user utterances, and generate corresponding audio data. The speakers 114 may be configured to output audio, such as audio corresponding to audio data received from another device. The displays 116 may be configured to display images corresponding to image data, such as image data received from the remote component(s) of the system 104 as well as user interface elements that may be configured to receive user input indicating selection of such user interface elements. The devices 102, 103, 105 may be configured to detect an environmental condition associated with the environment utilizing the sensors 118. Some example sensors 118 that may be utilized to detect conditions may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors 118, usage data and/or account data may be utilized to determine if an environmental condition is present. In some examples, the sensors 118 may also include radar and/or ultrasonic sensors. The cameras 119 may be configured to capture images from within a field of view of the cameras 119 and to generate corresponding image data.

It should be understood that while several examples used herein include a voice-enabled device that allows users to interact therewith via user utterances, one or more other devices, which may not include a voice interface, may be utilized instead of or in addition to voice-enabled devices. In these examples, the devices 102, 103, 105 may be configured to send and receive data over the network 106 and to communicate with other devices in the environment 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

In addition to the above, the primary device 102 may include components such as, for example, an event management component 120, an activity catalog 122, a user registry 124 that may include one or more routines 126, an activity recognition component 128, one or more language models 130, and/or an activity database 132. Each of these components will be described in detail below.

The remote component(s) of the system 104 may include components such as, for example, a speech processing system as well as components associated with user presence inference. It should be understood that while the components of the remote component(s) of the system 104 are depicted and/or described as separate from each other in FIG. 1, some or all of the components may be a part of the same system. The speech processing system may include an automatic speech recognition component (ASR) and/or a natural language understanding component (NLU). Each of the components described herein with respect to the remote component(s) of the system 104 may be associated with their own systems, which collectively may be referred to herein as the remote component(s) of the system 104, and/or some or all of the components may be associated with a single system. Additionally, the remote component(s) of the system 104 may include one or more applications, which may be described as skills. "Skills," as described herein may be applications and/or may be a subset of an application. For example, a skill may receive data representing an intent. For example, an intent may be determined by the NLU component and/or as determined from user input via a computing device. Skills may be configured to utilize the intent to output data for input to a text-to-speech (TTS) component, a link or other resource locator for audio data, and/or a command to a device, such as smart devices. "Skills" may include applications running on devices, such as the smart devices, and/or may include portions that interface with voice user interfaces of smart devices.

In instances where a voice-enabled device is utilized, skills may extend the functionality of smart devices that can be controlled by users utilizing a voice-user interface. In some examples, skills may be a type of application that may be useable in association with target devices and may have been developed specifically to work in connection with given target devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

Additionally, the operations and/or functionalities associated with and/or described with respect to the components of the remote component(s) of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the component(s) of the primary device 102, the user registry 124 may be configured to determine and/or generate associations between users, user accounts, environment identifiers, and/or devices. For example, one or more associations between user accounts may be identified, determined, and/or generated by the user registry 124. The user registry 124 may additionally store information indicating one or more applications and/or resources accessible to and/or enabled for a given user account. Additionally, the user registry 124 may include information indicating device identifiers, such as naming identifiers, associated with a given user account, as well as device types associated with the device identifiers. The user registry 124 may also include information indicating user account identifiers, naming indicators of devices associated with user accounts, and/or associations between devices, such as the smart devices. The user registry 124 may also include information associated with usage of the smart devices. It should also be understood that a user account may be associated with one or more than one user profiles. It should also be understood that the term "user account" may be used to describe a set of data and/or functionalities associated with a given account identifier. For example, data identified, determined, and/or generated while using some or all of the environment 100 may be stored or otherwise associated with an account identifier. Data associated with the user accounts may include, for example, account access information, historical usage data, device-association data, and/or preference data.

The speech-processing system, which may be disposed on the primary device 102 and/or on remote components of the system 104, may be configured to receive audio data from the devices 102, 103, 105 and/or other devices and perform speech-processing operations. For example, the ASR component may be configured to generate text data corresponding to the audio data, and the NLU component may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "remember when I and/or Person A performs Activity B," the NLU component may identify a "remember" intent. In this example where the intent data indicates an intent to detect when visual events occur, the speech processing system may call one or more applications to effectuate the intent. Skills, as described herein may otherwise be described as applications and may include functionality for utilizing intent data to generate directives and/or instructions.

The components of the environment 100 are described below by way of example. To illustrate, a user may provide user input data to a device 103, and the user input data may request that a given activity be remembered. In this example, the user has provided an explicit instruction for images to be captured within the environment and for corresponding image data to be analyzed for the purpose provided by the user. In these and other examples, the user input data may be received at the event management component 120 of the primary device 102. The event management component 120 may analyze the user input data to determine an activity indicated by the user input data to be analyzed over time. For example, the user input data may be "remember when I and/or Person A performs Activity B." In this example, the event management component 120 may determine that the activity in question is Activity B. The event management component 120 may also determine that the request to remember the activity includes one or more conditions, such as the activity being performed by a specific user (here Person A) and/or the activity being performed in association with a given object. An example of this may be a request to remember when a given user plays an instrument. The event management component 120, having determined the activity to be remembered and one or more conditions may generate an activity indicator that may be stored in the activity catalog 122 of the primary device 102. The activity catalog 122 may be called, as described in more detail below, for the activity indicator when analyzing subsequently received image data.

In another example, user account data as stored in association with the user registry 124 associated with the primary device 102 may be utilized to determine activities to be remembered and/or to generate activity indicators to be stored in the on-device activity catalog. For example, given user account data may indicate that one or more routines 126 have been set up. As used herein, a routine 126 may indicate that a given action is to be performed by one or more devices 103, 105 in the environment when a given trigger event occurs. A nonlimiting example of a routine 126 may be that a given light should turn on when motion is detected in a room where the light is disposed. The user account data may indicate actions and trigger events associated with routines 126, and these actions and trigger events may be utilized by the event management component 120 to determine candidate activities to be remembered. Corresponding activity indicators may be generated by the event management component 120 utilizing the routines 126 of the user account data, and these activity indicators may also be stored in the on-device activity catalog 122.

Thereafter, visual events detected by one or more devices 102, 103, 105 in the environment may be processed by the primary device 102 utilizing the activity indicators in the activity catalog 122. For example, image data may be generated by one or more devices 103, 105 having a camera 119 in the environment. To do so, in a nonlimiting example, the devices 103, 105 (and/or a different device) may determine when motion is detected in the environment and may commence capturing images based at least in part on the detection of the motion. The image data may be sent from the various device(s) 103, 105 to the primary device 102. A camera component of the primary device 102 may receive the image data and may, in examples, perform filtering on the image data to determine one or more keyframes. As described in more detail below, the camera component may analyze changes in pixels frame by frame to determine which frames are sufficiently different from the preceding frame. When this occurs, such a frame of the image data may be selected as a keyframe for further analysis. Therefore, the keyframes may be sent to one or more components of the primary device 102 for processing.

One of the components may be an object recognition component configured to analyze the keyframes utilizing one or more object classification models to recognize objects depicted in the images. In examples, contextual data such as which space the images were captured in (e.g., the images are from a device situated in a "kitchen" space or a "living room" space) may be utilized to select an object classification model, and the object classification model may analyze the keyframes to determine if the images depict any of the objects that the object classification model is trained to detect. Additional details on the object classification model, including the use of computer vision techniques to detect objects, is provided below. The object classification model may detect objects depicted in the images and may generate data indicating these recognized objects. The results of the object classification model may be stored in the on-device activity database 132 to be utilized for further processing described below.

Another of the components may be an entity recognition component configured to analyze the keyframes and/or contextual signals to recognize users depicted in the images. In examples, the image data itself may be utilized to identify features of a depicted user. Additional data such as device beaconing data, speech-related data, location data, etc. may be utilized by the entity recognition component to determine which user is depicted in the images, if any. Again, additional details on the detection of users utilizing image data and/or sensor data is provided below. The entity recognition component may detect users depicted in the images and may generate data indicating these recognized users (otherwise referred to herein as recognized entities). The results of the entity recognition component may be stored in the on-device activity database 132 to be utilized for further processing described below.

Another of the components may be the activity recognition component 128 configured to utilizing on-device LMs 130 to infer an activity being performed by a user depicted in the images. For example, the keyframes of the image data may be received by the activity recognition component 128, which may construct an image description prompt to be utilized by a visual LM 130 to generate keyframe descriptions of activities depicted in images. To do so, the activity recognition component 128 may query the activity catalog 122 for the activity indicators stored therein. These activity indicators may be utilized to construct the prompt such that the visual LM 130 is instructed to infer whether one or more of the activities associated with the activity indicators are occurring in the images. As used herein, a visual LM 130 may refer to a language model that is configured to receive, as input, one or more prompts to infer results and to utilize image data as input. The visual LMs 130 may differ, at least in part, from textual LMs 130 that are configured to utilize text data as input. It should be understood however that a given LM 130 may be configured to utilize image data, text data, or both image data and text data to infer results. The visual LM 130 may intake the keyframes of the image data and utilize the image description prompt to generate keyframe descriptions of activities inferred from the image data. These keyframe descriptions may be stored in the on-device activity database 132.

Although, with respect to activity recognition, a dual-model approach is described above where a visual LM is first utilized to generate keyframe descriptions and then a textual LM is utilized to generate activity descriptions from the keyframe descriptions, it should be understood that a multi-modal LM may be utilized instead of or in addition to the dual-model approach. When the multi-modal LM is utilized, the multi-modal LM may be provided image data, video data (e.g., a series of images), text data, and/or audio data associated with a given event. The multi-modal LM may utilize some or all of these data types along with the activity indicators from the activity catalog to determine whether the event is associated with one or more activities from the activity catalog.

In examples, the object recognition component, the activity recognition component 128, and the entity recognition component may be the same component and/or may be associated with a multi-modal LM that may be configured to recognize objects depicted in image data, to recognize entities depicted in image data, and to recognize activities as described herein. As such, when object recognition is described herein as being performed utilizing one or more object classification models, it should be understood that a multi-modal LM may be utilized in addition to or instead of the object classification models to recognize objects. Likewise, when entity recognition is described herein as being performed utilizing one or more entity recognition models, it should be understood that the multi-modal LM may be utilized in addition to or instead of the entity recognition models to recognize entities.

Thereafter, an event may occur that is associated with a request for a summary and/or identification of visual events inferred by the primary device 102. One nonlimiting example of such an event may be the receipt of user input data requesting a summary of the remembered visual events. Utilizing a piano example, the user may have originally requested that the primary device 102 remember when a given user plays piano. The primary device 102 may infer when the given user played the piano over time utilizing the components described above, and those inferences may be stored in the activity database 132. Thereafter, a request for a summary of those visual events, here the example being, say, "how long did I and/or Person A play the piano this week?" may be received. In examples, the event may request a recall of visual events. In other examples, such as the example provided above, the event may request additional processing of the visual events as inferred by the primary device 102. Specifically, here, the additional processing may include determining a period of time when visual events should be identified as relevant (e.g., "this week"), determining what the relevant activity is (e.g., "playing the piano"), determining when the activity was performed by a specific user (e.g., Person A), and/or determining what response is requested (e.g., the response is a summary of how long the activity was performed in total, not necessarily a request to recall and/or show the detected visual event(s)). The event management component 120 described herein may query the activity database 132 for the recognized objects, recognized entities, and recognized activities stored therein and may utilize such data to generate a response to the summary request. In examples, one or more of the on-device LMs 130 may be utilized to infer and/or generate the summary utilizing the data stored in the activity database 132. For example, a summary prompt may be constructed utilizing the data from the activity database 132 and the prompt may request that a textual LM 130 utilize the keyframe descriptions stored in the activity database 132 to recognize the activity in question and to generate the requested summary. In the example above, the generated summary may be that Person A played the piano for a certain period of time. The generated summary may also include the image data associated with the activity, the keyframes, and/or contextual information utilized by the primary device 102 to generate the summary.

Additionally, in some examples, image data may be processed by the primary device 102 as described above, but that analysis may not yield detection of a given activity from the activity catalog 122. However, analysis of the image data may still yield a result where a given object is detected from the image data and/or that a given user is detected from the image data. In these examples, the results of such an analysis may still be stored in the activity database 132. Thereafter, a request for visual event information may be received. An example of this may be a user request such as “who left the kitchen drawer open?” In this example, the activity catalog 122 may not have been previously populated with an activity indicator associated with opening and/or closing a kitchen drawer. However, the activity database 132 may still include data from analyzed images indicating when certain image data depicted a kitchen drawer and which entities were identified in such image data. As such, the event management component 120 may still be configured to query the activity database 132 for such data and to provide a response to the request. As with the above example, the event management component 120 may utilize one or more of the on-device LMs 130 to infer a response to the request based on the data stored in the activity database 132.

Additionally, in examples, the primary device 102 may be configured to determine how long to store image data, keyframes, and/or data from the activity database 132. For example, the storage of image data and other data on the primary device 102 may be hampered by storage limitations and/or may not be optimal in some circumstances. As such, the primary device 102 may be configured to determine how long such data should be stored. To do so, the primary device 102 may determine to store the image data and the data in the activity database 132 for a first period of time based at least in part on that data being associated with a detected visual event. In other words, when analysis of image data by the primary device 102 indicates that occurrence of an activity from the activity catalog 122 is detected, such image data and the resulting analysis thereof may be determined to be potentially more useful than in situations where motion is detected but at least one of the activities from the activity catalog 122 is not detected. In this latter example, the primary device 102 may determine that the image data and/or other data associated with such image data should be stored for a second period of time that is less than the first period of time.

As used herein, the one or more processes performed by the device 102, 103, 105 and/or the remote component(s) of the system 104 may include the use of models. These models may be machine learning models. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with prior user input data. The models may be trained for multiple user accounts and/or for a specific user account. As such, the machine learning models may be configured to learn, without human intervention, attributes of collected data and/or actions taken associated with device usage cessation.

It should be noted that while text data is described as a type of data utilized to communicate between various components of the remote component(s) of the system 104 and/or other systems and/or devices, the components of the remote component(s) of the system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices.

As shown in FIG. 1, several of the remote component(s) of the system 104 and the associated functionality of those components as described herein may be performed by one or more of the devices 102, 103, 105. Additionally, or alternatively, some or all of the components and/or functionalities associated with the devices 102 may be performed by the remote component(s) of the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 104 may possess its own local memory, which also may store program components, program data, and/or one or more operating systems.

The memory 111 and/or the memory described with respect to the components of the system 104 may include volatile and nonvolatile memory, removable and non-removable media implemented in any method or technology for storage of information, such as non-transitory computer-readable instructions, data structures, program component, or other data. Such memory 111 and/or the memory described with respect to the components of the system 104 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 111 and/or the memory described with respect to the components of the system 104 may be implemented as computer-readable storage media ("CRSM"), which may be any available physical media accessible by the processor(s) 108 and/or the processor(s) described with respect to the system 104 to execute instructions stored on the memory 111 and/or the memory described with respect to the components of the system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 111 and/or the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; AOSP Android; and so forth.

The network interface(s) 110 and/or the network interface(s) described with respect to the components of the system 104 may enable messages between the components and/or devices shown in environment 100 and/or with one or more other polling systems, as well as other networked devices. Such network interface(s) 110 and/or the network interface(s) described with respect to the components of the system 104 may include one or more network interface controllers (NICs) or other types of transceiver devices to send and receive messages over the network 106.

For instance, each of the network interface(s) 110 and/or the network interface(s) described with respect to the components of the system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the system 104 may include a wide area network (WAN) component to enable message over a wide area network.

In some instances, the remote component(s) of the system 104 may be local to an environment associated the devices. For instance, the remote component(s) of the system 104 may be located within one or more of the primary device, and/or the devices 103, 105. In some instances, some or all of the functionality of the remote component(s) of the system 104 may be performed by one or more of the devices. Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2:
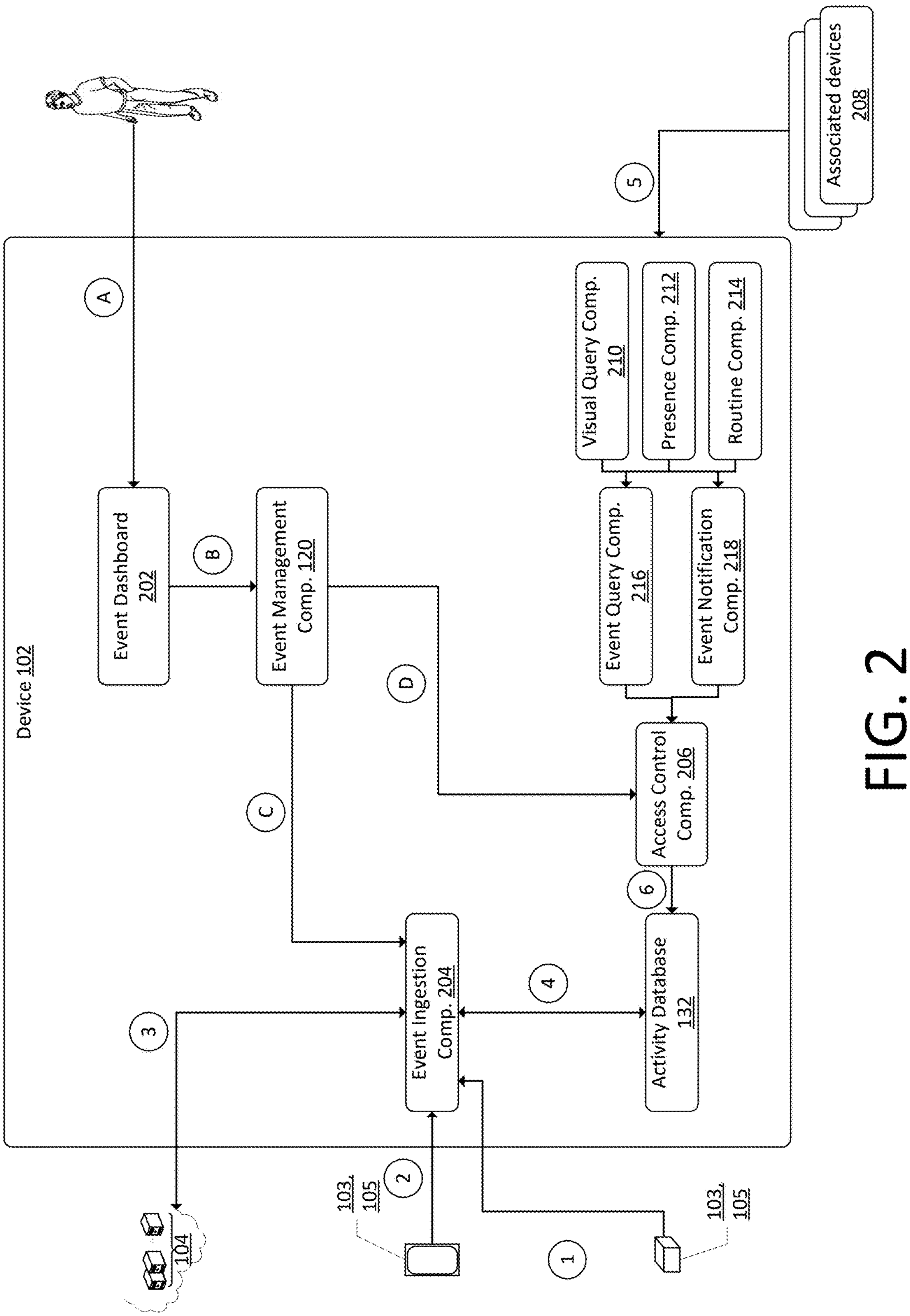
FIG. 2 illustrates a conceptual diagram of example components of a primary device for visual event processing using LMs.

FIG. 2 illustrates a conceptual diagram of example components of a primary device for visual event processing using LMs. The components of FIG. 2 may be the same or similar to the components of FIG. 1. For example, FIG. 2 may include a primary device 102, one or more other devices 103, 105, remote components of a system 104, an event management component 120, and/or an activity database 132. Additionally, FIG. 2 may include an event dashboard 202, an event ingestion component 204, an access control component 206, one or more associated devices 208, a visual query component 210, a presence component 212, a routine component 214, a query component 216, and/or an event notification component 218. Each of these components will be described in more detail below. Also, FIG. 2 is described with respect to steps A-D and steps 1-6. It should be understood that more, fewer, and/or different steps may be associated with the components of FIG. 2.

For example, at step A, a user may provide user input data requesting that a given activity be remembered. This user input data may be received at the primary device 102 by the event dashboard 202. The event dashboard, in examples, may be a graphical user interface, a voice interface, and/or other an interface that may allow a user provide the user input data and/or may present options associated with remembering visual events. The event dashboard 202 may also be configured to allow users to manage existing instructions to remember visual events, including changing such instructions, deleting such instructions, etc.

In this example, the user has provided an explicit instruction for images to be captured within the environment and for corresponding image data to be analyzed for the purpose provided by the user. In these and other examples, at step B, the event dashboard 202 may communicate the user input data to the event management component 120 of the primary device 102. The event management component 120 may analyze the user input data to determine an activity indicated by the user input data to be remembered over time. For example, the user input data may be "remember when I and/or Person A performs Activity B." In this example, the event management component 120 may determine that the activity in question is Activity B. The event management component 120 may also determine that the request to remember the activity includes one or more conditions, such as the activity being performed by a specific user (here Person A) and/or the activity being performed in association with a given object. An example of this may be a request to remember when a given user plays an instrument. The event management component 120, having determined the activity to be remembered and one or more conditions may send, at step C, such information to the event ingestion component 204. The event ingestion component may include an activity catalog that may be utilized to store the activity indicator. The activity catalog 122 may be called, as described in more detail below, for the activity indicator when analyzing subsequently received image data.

Additionally, at step D, the event management component 120 may send information associated with the determined activity indicator to the access control component 206. The access control component 206 may be configured to include the activity indicator as a permitted event that may be utilized when other components of the system are utilized to process image data and/or to otherwise determine when given visual events occur.

Thereafter, at steps 1 and 2, visual events detected by one or more devices 103, 105 in the environment may be processed by the primary device 102 utilizing the activity indicators in the activity catalog. For example, image data may be generated by one or more devices 103, 105 having a camera in the environment. To do so, in a nonlimiting example, the devices 103, 105 (and/or a different device) may determine when motion is detected in the environment and may commence capturing images based at least in part on the detection of the motion. The image data may be sent from the various device(s) 103, 105 to the primary device 102. The event ingestion component 204 may receive the image data and may, in examples, perform filtering on the image data to determine one or more keyframes. As described in more detail below, the event ingestion component 204 may analyze changes in pixels frame by frame to determine which frames are sufficiently different from the preceding frame. When this occurs, such a frame of the image data may be selected as a keyframe for further analysis. Therefore, the keyframes may be sent to one or more components of the primary device 102 for processing.

One of the components may be an activity recognition component of the event ingestion component 204 configured to utilizing on-device LMs to infer an activity being performed by a user depicted in the images. For example, the keyframes of the image data may be received by the activity recognition component, which may construct an image description prompt to be utilized by a visual LM to generate keyframe descriptions of activities depicted in images. To do so, the activity recognition component may query the activity catalog for the activity indicators stored therein. These activity indicators may be utilized to construct the prompt such that the visual LM is instructed to infer whether one or more of the activities associated with the activity indicators are occurring in the images. As used herein, a visual LM may refer to a language model that is configured to receive, as input, one or more prompts to infer results and to utilize image data as input. The visual LMs may differ, at least in part, from textual LMs that are configured to utilize text data as input. It should be understood however that a given LM may be configured to utilize image data, text data, or both image data and text data to infer results. The visual LM may intake the keyframes of the image data and utilize the image description prompt to generate keyframe descriptions of activities inferred from the image data.

Additionally, at step 3, the event ingestion component 204 may query remote components of the system 104 for contextual data that may be utilized to assist the event ingestion component 204 with detecting objects in image data, detecting entities in image data, and/or for inferring activities depicted in the image data. The remote components of the system 104, which may include the user registry described herein in some examples, may provide requested contextual data to the event ingestion component 204 in response to a request for such data. The LMs may then utilize the contextual data to infer activities. At step 4, these keyframe descriptions may be stored in the on-device activity database 132.

In addition to utilizing the event ingestion component 204 to infer activities from the image data, one or more other events may occur that may indicate whether an activity in the activity catalog has occurred. For example, at step 5, the associated devices 208 may generate sensor data, which in examples may differ from image data. This sensor data may indicate detected changes in the environment in question, and one or more components of the primary device 102 may be configured to intake this sensor data and utilize the sensor data for purposes that those components are trained for. For example, the visual query component 210 may be configured to perform visual querying requests such as when motion is detected at, say, a smart doorbell and a request is received to view images from a camera of the smart doorbell. In another example, the presence component 212 may be configured to detect user presence in a given space utilizing the sensor data. In still another example, the routine component 214 may be configured to perform routines as described herein when certain trigger events occur. Some or all of these events may be associated with one or more of the activities in the activity catalog. As such, the event query component 216, which may be configured to query for specific events, and/or the event notification component 218, which may be configured to receive notifications of the specific events, may be in communication with the access control component 206 to determine whether any of these events that may not specifically include analysis of image data are indicative of an activity from the activity catalog being performed. When this occurs, at step 6, the access control component 206 may generate data indicating the activity was detected and this data may be stored in the activity database 132.

Figure 3:
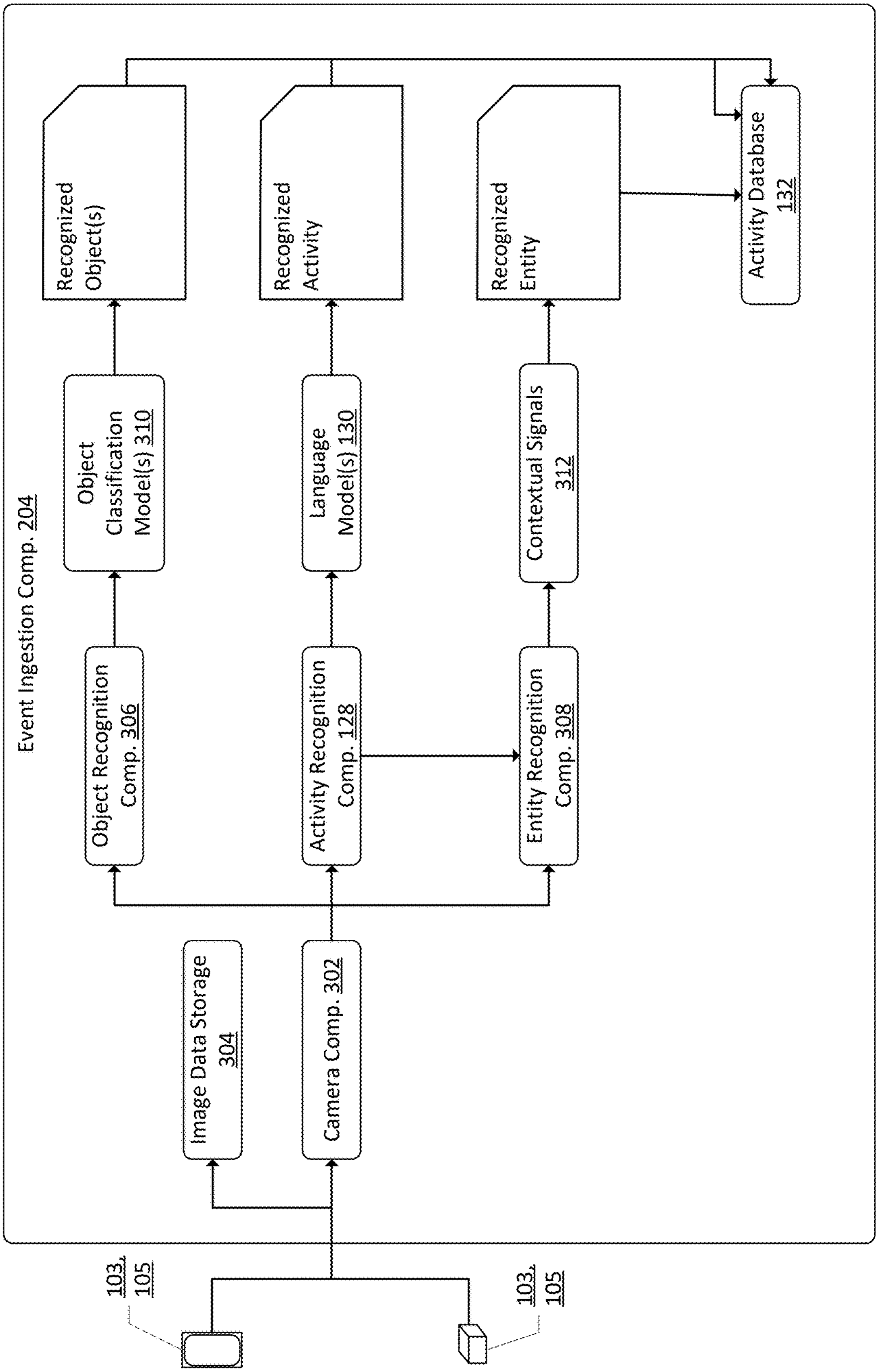
FIG. 3 illustrates a conceptual diagram of example components of an event ingestion component associated with visual event processing using LMs.

FIG. 3 illustrates a conceptual diagram of example components of an event ingestion component 204 associated with visual event processing using LMs. The components of FIG. 3 may be the same or similar to the components of FIGS. 1 and/or 2. For example, the components may include devices 103, 105, an activity recognition component 128, LMs 130, an activity database 132, and/or an event ingestion component 204. FIG. 3 may also include components such as a camera component 302, an image data storage 304, an object recognition component 306, an entity recognition component 308, one or more object classification models 310, and/or contextual signals 312. Each of these components will be described in more detail below.

For example, visual events detected by one or more devices 103, 105 in the environment in question may be processed by a primary device utilizing activity indicators in an activity catalog, as described above. For example, image data may be generated by one or more devices 103, 105. To do so, in a nonlimiting example, the devices 103, 105 (and/or a different device) may determine when motion is detected in the environment and may commence capturing images based at least in part on the detection of the motion. The image data may be sent from the various device(s) 103, 105 to the primary device. In examples, an instance of the image data may be stored in the image data storage 304 while the image data is being processed by the event ingestion component 204 and/or for a period of time thereafter. The amount of time that the image data is stored in the image data storage 304 may be based at least in part on whether an activity from the activity catalog is detected.

In other examples, the image data to be processed may be received in one or more alternative manners. For example, parental controls and/or otherwise applications that are associated with images and/or screenshots of images may be utilized to initial the visual event processing described herein. For example, a user may provide image data (e.g., a screenshot) and provide user input such as "tell me every time User C views Content D." In this scenario, the screenshot may be analyzed as described herein to determine if the associated image data depicts User C, depicts one or more objects associated with Content D, and if a viewing activity is determined.

Additionally, the image data may be sent to the camera component 302, which may, in examples, perform filtering on the image data to determine one or more keyframes. As described in more detail below, the camera component 302 may analyze changes in pixels frame by frame to determine which frames are sufficiently different from the preceding frame. When this occurs, such a frame of the image data may be selected as a keyframe for further analysis. Therefore, the keyframes may be sent to one or more components of the primary device for processing.

One of the components may be the object recognition component 306 configured to analyze the keyframes utilizing one or more object classification models 310 to recognize objects depicted in the images. In examples, contextual data such as which space the images were captured in (e.g., the images are from a device situated in a "kitchen" space or a "living room" space) may be utilized to select an object classification model 310, and the object classification model 310 may analyze the keyframes to determine if the images depict any of the objects that the object classification model 310 is trained to detect. Additional details on the object classification model 310, including the use of computer vision techniques to detect objects, is provided below. The object classification model 310 may detect objects depicted in the images and may generate data indicating these recognized objects. The results of the object classification model 310 may be stored in the on-device activity database 132 to be utilized for further processing described below.

Another of the components may be the entity recognition component 308 configured to analyze the keyframes and/or contextual signals 312 to recognize users depicted in the images. In examples, the image data itself may be utilized to identify features of a depicted user. Additional data such as device beaconing data, speech-related data, location data, etc. may be utilized by the entity recognition component 308 to determine which user is depicted in the images, if any. Again, additional details on the detection of users utilizing image data and/or sensor data is provided below. The entity recognition component 308 may detect users depicted in the images and may generate data indicating these recognized users (otherwise referred to herein as recognized entities). The results of the entity recognition component 308 may be stored in the on-device activity database 132 to be utilized for further processing described below.

Another of the components may be the activity recognition component 128 configured to utilizing on-device LMs 130 to infer an activity being performed by a user depicted in the images. For example, the keyframes of the image data may be received by the activity recognition component 128, which may construct an image description prompt to be utilized by a visual LM 130 to generate keyframe descriptions of activities depicted in images. To do so, the activity recognition component 128 may query the activity catalog for the activity indicators stored therein. These activity indicators may be utilized to construct the prompt such that the visual LM 130 is instructed to infer whether one or more of the activities associated with the activity indicators are occurring in the images. As used herein, a visual LM 130 may refer to a language model that is configured to receive, as input, one or more prompts to infer results and to utilize image data as input. The visual LMs 130 may differ, at least in part, from textual LMs 130 that are configured to utilize text data as input. It should be understood however that a given LM 130 may be configured to utilize image data, text data, or both image data and text data to infer results. The visual LM 130 may intake the keyframes of the image data and utilize the image description prompt to generate keyframe descriptions of activities inferred from the image data. These keyframe descriptions may be stored in the on-device activity database 132.

Although, with respect to activity recognition, a dual-model approach is described above where a visual LM 130 is first utilized to generate keyframe descriptions and then a textual LM 130 is utilized to generate activity descriptions from the keyframe descriptions, it should be understood that a multi-modal LM 130 may be utilized instead of or in addition to the dual-model approach. When the multi-modal LM 130 is utilized, the multi-modal LM 130 may be provided image data, video data (e.g., a series of images), text data, and/or audio data associated with a given event. The multi-modal LM 130 may utilize some or all of these data types along with the activity indicators from the activity catalog to determine whether the event is associated with one or more activities from the activity catalog.

In examples, the object recognition component 306, the activity recognition component 128, and the entity recognition component 308 may be the same component and/or may be associated with a multi-modal LM 130 that may be configured to recognize objects depicted in image data, to recognize entities depicted in image data, and to recognize activities as described herein. As such, when object recognition is described herein as being performed utilizing one or more object classification models 310, it should be understood that a multi-modal LM 130 may be utilized in addition to or instead of the object classification models 310 to recognize objects. Likewise, when entity recognition is described herein as being performed utilizing one or more entity recognition models, it should be understood that the multi-modal LM 130 may be utilized in addition to or instead of the entity recognition models to recognize entities.

Figure 4:
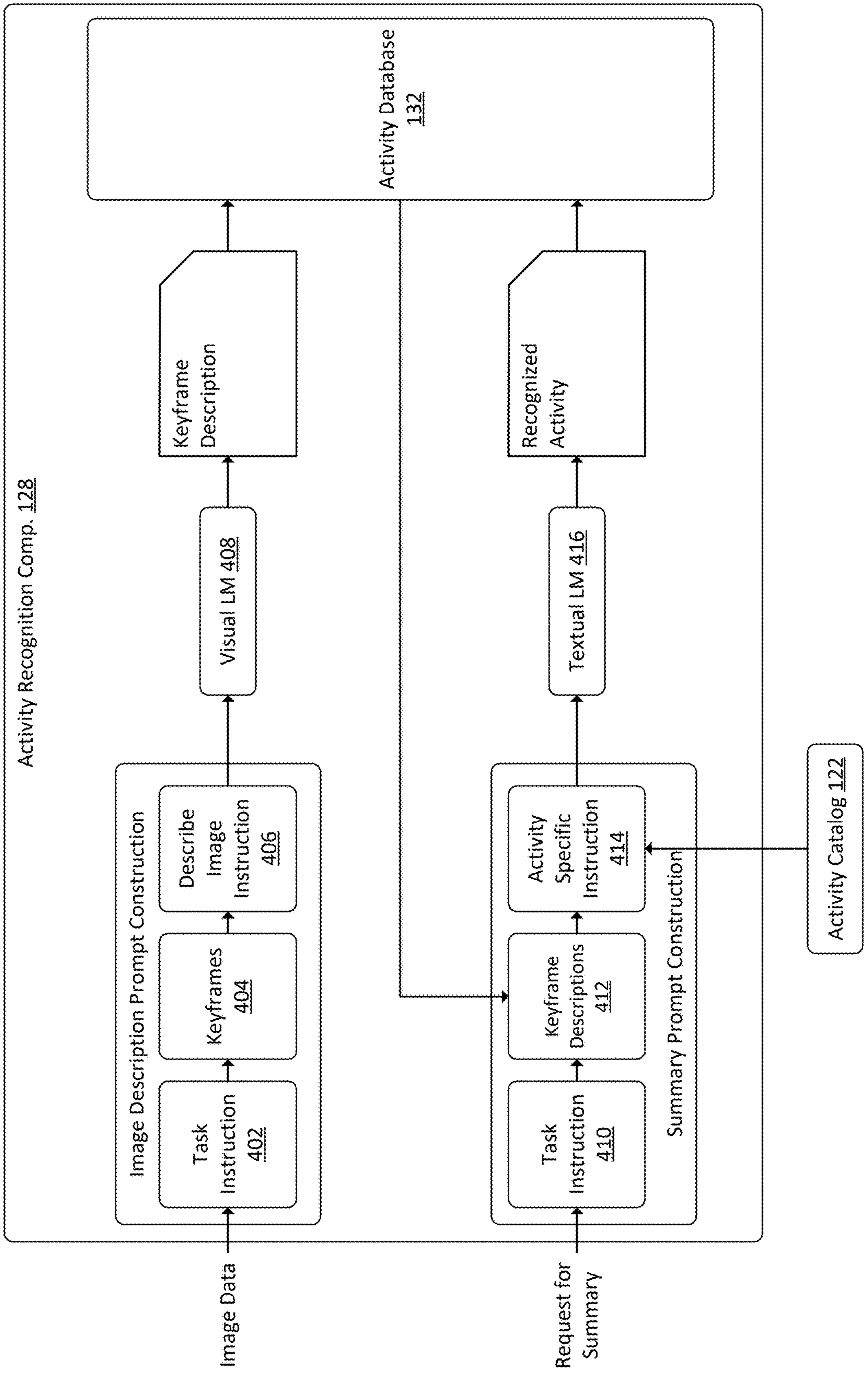
FIG. 4 illustrates a conceptual diagram of example components of an activity recognition component associated with visual event processing using LMs.

FIG. 4 illustrates a conceptual diagram of example components of an activity recognition component 128 associated with visual event processing using LMs. FIG. 4 may include the same or similar components as those described with respect to FIG. 1, such as the activity catalog 122, the activity recognition component 128, and/or the activity database 132. FIG. 4 may also include a task instruction component 402, keyframes 404, a describe image instruction component 406, a visual LM 408, a summary task instruction component 410, keyframe descriptions 412, an activity specific instruction 414, and/or a textual LM 416. Each of the components of FIG. 4 will be described in detail below.

For example, the activity recognition component 128 configured to utilizing on-device LMs such as the visual LM 408 and/or the textual LM 416 to infer an activity being performed by a user depicted in the images. For example, image data may be received at the activity recognition component, which may construct an image description prompt to be utilized by the visual LM 408 to generate keyframe descriptions 412 of activities depicted in images. To do so, the task instruction component 402 may be configured to determine the task the visual LM 408 is to perform, which may be associated with analyzing the image data to detect visual events. The keyframes 404, additional details of which are described above, may also be determined during the image description prompt construction. Additionally, the describe image instruction component 406 may be configured to generate a portion of the prompt instructing the visual LM 408 that the output of the visual LM 408 should be in the form of a textual description of keyframes 404. As used herein, a visual LM 408 may refer to a language model that is configured to receive, as input, one or more prompts to infer results and to utilize image data as input. The visual LMs 408 may differ, at least in part, from the textual LMs 416 that are configured to utilize text data as input. It should be understood however that a given LM may be configured to utilize image data, text data, or both image data and text data to infer results. The visual LM 408 may intake the keyframes 404 of the image data and utilize the image description prompt to generate keyframe descriptions 412 of activities inferred from the image data. These keyframe descriptions 412 may be stored in the on-device activity database 132.

Thereafter, a summary prompt construction process may be performed where a task instruction associated with summarizing and/or identifying an activity in the image data may be generated. Additionally, the prompt construction may include identifying the keyframe descriptions 412 from the activity database 132, and/or generating an activity specific instruction 414 for some or all of the activity indicators in the activity catalog 122. This summary prompt may be utilized along with the keyframe descriptions 412 by the textual LM 416 to infer recognized activities from the keyframe descriptions 412. These recognized activities may be stored in the activity database 132. By so doing, the activity recognition component 128 may utilize a dual-LM methodology to first generate textual keyframe descriptions of potential activities depicted in image data utilizing a visual LM 408, and then to infer whether the image data depicts one or more of the activities in the activity catalog 122 utilizing the textual LM 416.

Although, with respect to activity recognition, a dual-model approach is described above where a visual LM is first utilized to generate keyframe descriptions and then a visual LM is utilized to generate activity descriptions from the keyframe descriptions, it should be understood that a multi-modal LM may be utilized instead of or in addition to the dual-model approach. When the multi-modal LM is utilized, the multi-modal LM may be provided image data, video data (e.g., a series of images), text data, and/or audio data associated with a given event. The multi-modal LM may utilize some or all of these data types along with the activity indicators from the activity catalog to determine whether the event is associated with one or more activities from the activity catalog.

FIGS. 5-9 illustrates processes for visual event processing using LMs. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS.

1-4 and 10-19, although the processes may be implemented in a wide variety of other environments, architectures and systems.

Figure 5:
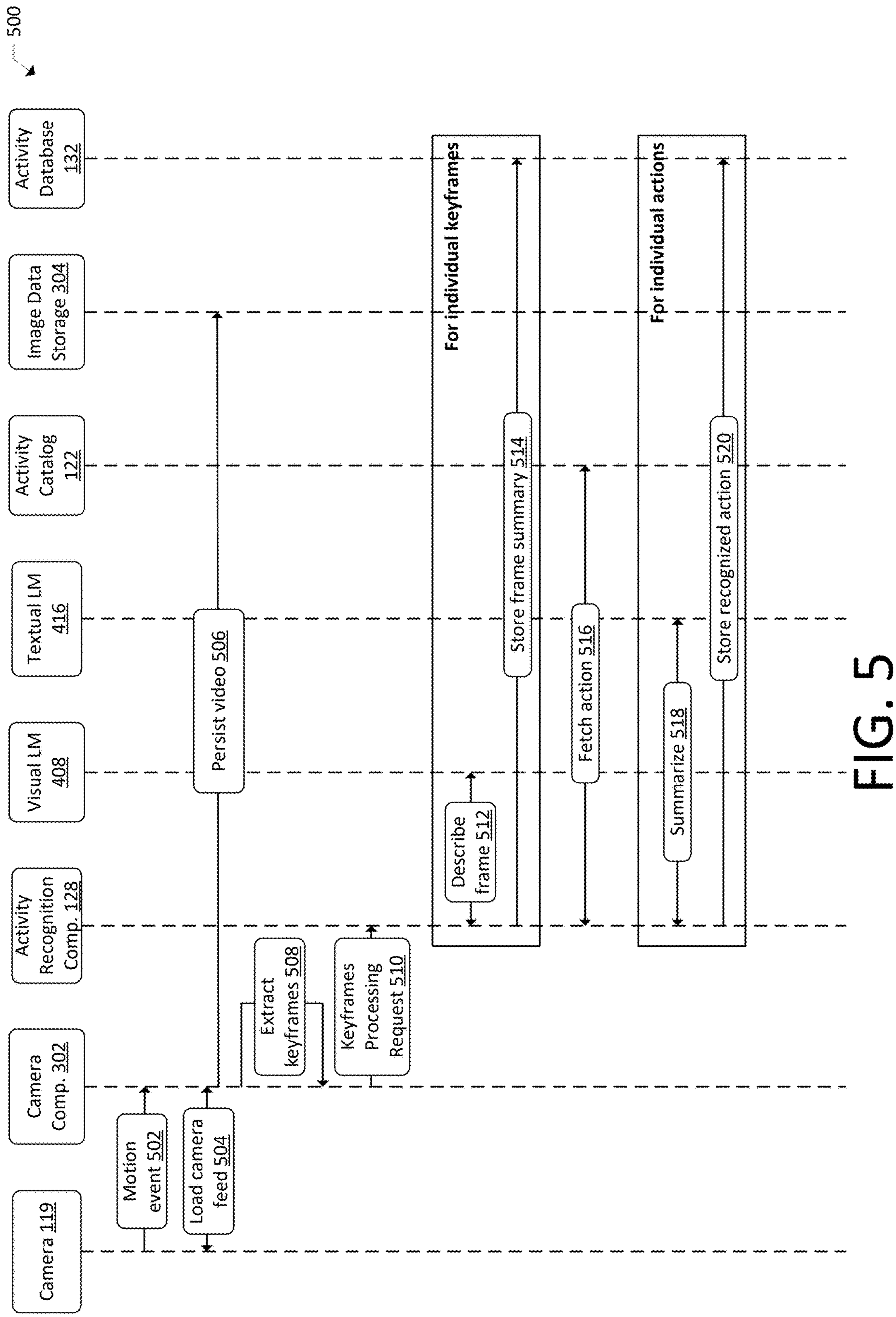
FIG. 5 illustrates a sequence diagram of an example process for visual event processing using LMs.

FIG. 5 illustrates a sequence diagram of an example process 500 for visual event processing using LMs. The order in which the operations or steps are described is not intended to be construed as a limitation, and any number of the described operations may be combined in any order and/or in parallel to implement process 500.

At block 502, a camera 119 of a device may send a motion event to a camera component 302 of a primary device 102. For example, devices in a given environment may determine when motion is detected and may commence capturing images based at least in part on the detection of the motion.

At block 504, the camera component 302 may send a command to load a camera feed to the camera 119. Image data associated with the camera feed may be sent from the various device(s) and/or sensor(s) to the primary device. The camera component 302 of the primary device may receive the image data.

At block 506, the camera component 302 may send a command to the image data storage 304 to persist video associated with the motion event until at least conclusion of the image data processing described herein. In examples, an instance of the image data may be stored in the image data storage 304 while the image data is being processed by the event ingestion component 204 and/or for a period of time thereafter. The amount of time that the image data is stored in the image data storage 304 may be based at least in part on whether an activity from the activity catalog is detected.

At block 508, the camera component 302 may extract keyframes from the image data. For example, the camera component 302 may be configured to perform filtering on the image data to determine one or more keyframes. The camera component 302 may analyze changes in pixels frame by frame to determine which frames are sufficiently different from the preceding frame. When this occurs, such a frame of the image data may be selected as a keyframe for further analysis. Thereafter, the keyframes may be sent to one or more components of the primary device for processing.

At block 510, the camera component 302 may send a keyframes processing request to an activity recognition component 128. In this example, the processing request may include the keyframes of the image data as well as a request to perform visual event processing utilizing LMs associated with the primary device.

For individual ones of the keyframes, at block 512, the activity recognition component 128 may send a prompt to a visual LM 408 to describe the frame. For example, the activity recognition component 128 may construct an image description prompt to be utilized by the visual LM 408 to generate keyframe descriptions of activities depicted in images. To do so, a task instruction component may be configured to determine the task the visual LM 408 is to perform, which may be associated with analyzing the image data to detect visual events. The keyframes may also be determined during the image description prompt construction. Additionally, the described image instruction component may be configured to generate a portion of the prompt instructing the visual LM 408 that the output of the visual LM 408 should be in the form of a textual description of keyframes. The visual LM 408 may intake the keyframes of the image data and utilize the image description prompt to generate keyframe descriptions of activities inferred from the image data At block 514, for individual ones of the keyframes, the activity recognition component 128 may cause a frame summary as generated by the visual LM 408 to be stored in the activity database 132. In this example, the frame summaries themselves may be stored in the activity database 132, and these frame summaries may not yet be associated with the activities stored in the activity catalog 122.

Thereafter, at block 516, the activity recognition component 128 may send a command to fetch actions and/or activity indicators from an activity catalog 122. In this example, activity indicators may be returned to the activity recognition component 128 for activities that visual event analysis has been enabled for. As described above, these activities may be determined from user input data requesting visual event analysis and/or the activities may be determined from user account data, such as from routines associated with a given user account.

For individual actions and/or activities, at block 518, the activity recognition component 128 may send a prompt to a textual LM 416 to summarize the keyframe summaries (also described herein as keyframe descriptions). For example, the prompt construction may include identifying the frame summaries from the activity database 132, and/or generating an activity specific instruction for some or all of the activity indicators in the activity catalog 122. This prompt may be utilized along with the keyframe descriptions by the textual LM 416 to infer recognized activities from the keyframe descriptions.

At block 520, the activity recognition component 128 may cause recognized actions and/or activities as determined by the textual LM 416 to be stored in the activity database 132. For example, these recognized activities may be stored in the activity database 132 and by so doing, the activity recognition component 128 may utilize a dual-LM methodology to first generate textual keyframe descriptions of potential activities depicted in image data utilizing a visual LM 408, and then to infer whether the image data depicts one or more of the activities in the activity catalog 122 utilizing the textual LM 416.

Figure 6:
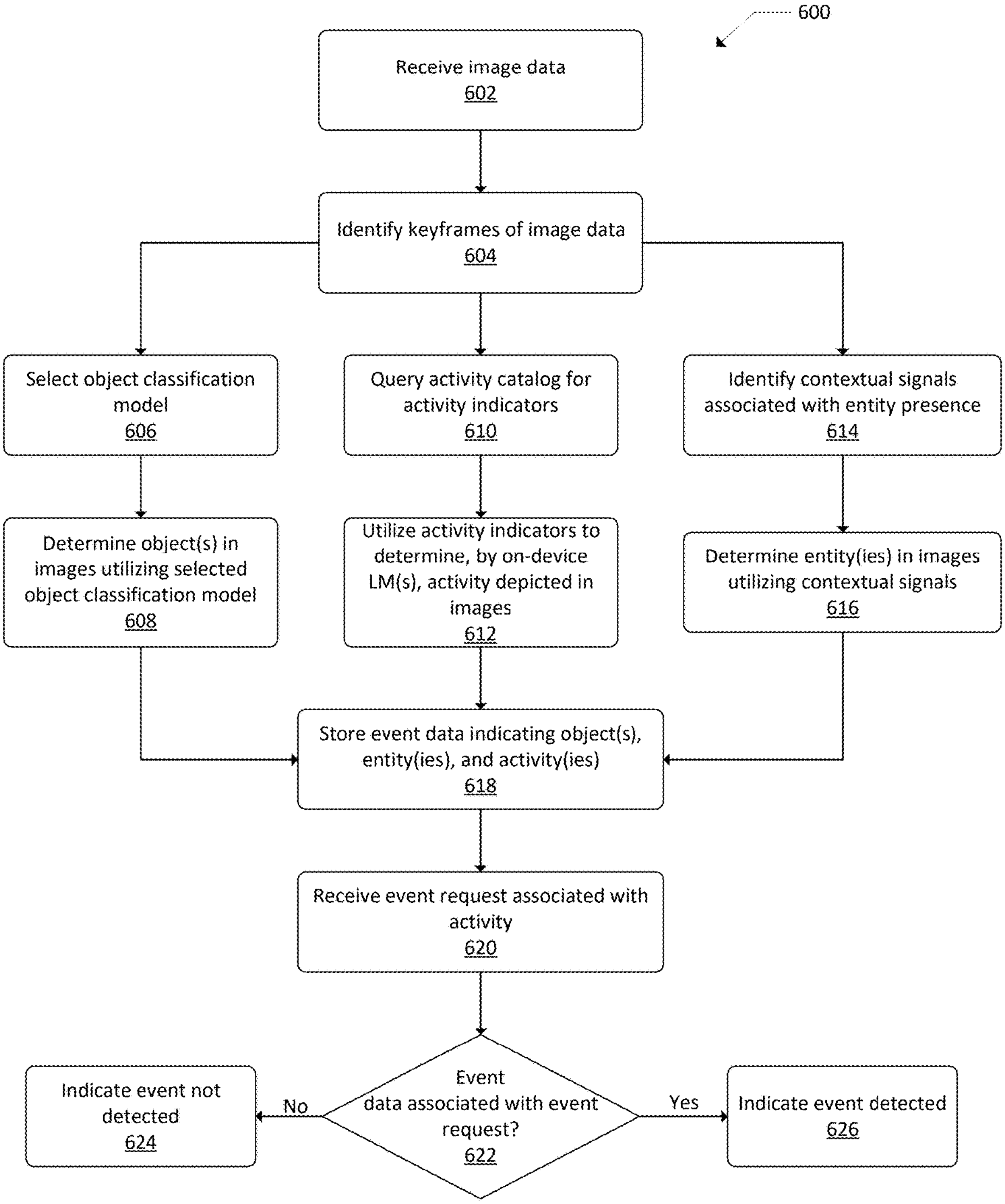
FIG. 6 illustrates a flow diagram of an example process for detecting objects, users, and activities utilizing on-device LMs and other models.

FIG. 6 illustrates a flow diagram of an example process 600 for detecting objects, users, and activities utilizing on-device LMs and other models. The order in which the operations or steps are described is not intended to be construed as a limitation, and any number of the described operations may be combined in any order and/or in parallel to implement process 600.

At block 602, the process 600 may include receiving image data. For example, image data may be generated by one or more devices. To do so, in a nonlimiting example, the devices may determine when motion is detected in the environment and may commence capturing images based at least in part on the detection of the motion. The image data may be sent from the various device(s) to a primary device. In examples, an instance of the image data may be stored in an image data storage while the image data is being processed.

At block 604, the process 600 may include identifying keyframes of the image data. For example, the image data may be sent to a camera component of the primary device, which may, in examples, perform filtering on the image data to determine one or more keyframes. To do so, the camera component may analyze changes in pixels frame by frame to determine which frames are sufficiently different from the preceding frame. When this occurs, such a frame of the image data may be selected as a keyframe for further analysis. Thereafter, the keyframes may be sent to one or more components of the primary device for processing.

At block 606, the process 600 may include selecting an object classification model. For example, one of the components utilized to analyze the keyframes may be an object recognition component configured to analyze the keyframes utilizing one or more object classification models to recognize objects depicted in the images. In examples, contextual data such as which space the images were captured in (e.g., the images are from a device situated in a "kitchen" space or a "living room" space) may be utilized to select an object classification model.

At block 608, the process 600 may include determining one or more objects in the images utilizing the selected object classification model. For example, the object classification model may analyze the keyframes to determine if the images depict any of the objects that the object classification model is trained to detect. Additional details on the object classification model, including the use of computer vision techniques to detect objects, is provided below with respect to FIG. 15. The object classification model may detect objects depicted in the images and may generate data indicating these recognized objects.

At block 610, the process 600 may include querying an activity catalog for activity indicators. For example, another of the components utilized to analyze the image data may be an activity recognition component configured to utilizing on-device LMs to infer an activity being performed by a user depicted in the images. For example, the keyframes of the image data may be received by the activity recognition component, which may construct an image description prompt to be utilized by a visual LM to generate keyframe descriptions of activities depicted in images. To do so, the activity recognition component may query the activity catalog for the activity indicators stored therein.

At block 612, the process 600 may include utilizing the activity indicators to infer, by one or more on-device LMs, an activity depicted in the images. For example, the activity indicators received from the activity catalog may be utilized to construct the prompt described above such that the visual LM is instructed to infer whether one or more of the activities associated with the activity indicators are occurring in the images. The visual LM may intake the keyframes of the image data and utilize the image description prompt to generate keyframe descriptions of activities inferred from the image data. Thereafter, a textual LM may be utilized, with the keyframe descriptions as input, to determine whether the keyframes depict one or more of the activities from the activity catalog.

At block 614, the process 600 may include identifying contextual signals associated with entity presence. For example, another of the components utilized to analyze the image data may be an entity recognition component configured to analyze the keyframes and/or contextual signals to recognize users depicted in the images. In examples, the image data itself may be utilized to identify features of a depicted user. Additional contextual signals such as device beaconing data, speech-related data, location data, etc. may be utilized by the entity recognition component 308 to determine which user is depicted in the images, if any.

At block 616, the process 600 may include determining one or more entities in the images utilizing the contextual signals. Additional details on the detection of users utilizing image data and/or contextual signals is provided below with respect to FIGS. 16-19. The entity recognition component may detect users depicted in the images and may generate data indicating these recognized users (otherwise referred to herein as recognized entities).

At block 618, the process 600 may include storing event data indicating the object(s), entity(ies), and/or activity(ies) detected in the images. For example, an activity database of the primary device may be configured to store some or all of the data determined by the object recognition component, the entity recognition component, and/or the activity recognition component. This data may indicate the objects, entities, and activities that were detected along with timing information indicating when such objects, entities, and activities were detected. In some examples, the image data and/or keyframes may also be stored in the activity database and/or in the image data storage based at least in part on one or more of the activities from the activity catalog being inferred by the on-device LMs.

At block 620, the process 600 may include receiving an event request associated with a given activity. For example, an event may occur that is associated with a request for a summary and/or identification of visual events inferred by the primary device. One nonlimiting example of such an event may be the receipt of user input data requesting a summary of the logged visual events. Utilizing a piano example, the user may have originally requested that the primary device remember when a given user plays piano. The primary device may infer when the given user played the piano over time utilizing the components described above, and those inferences may be stored in the activity database. Thereafter, a request for a summary of those visual events, here the example being, say, "how long did I and/or Person A play the piano this week?" may be received. In examples, the event may request a recall of visual events. In other examples, such as the example provided above, the event may request additional processing of the visual events as inferred by the primary device. Specifically, here, the additional processing may include determining a period of time when visual events should be identified as relevant (e.g., "this week"), determining what the relevant activity is (e.g., "playing the piano"), determining when the activity was performed by a specific user (e.g., Person A), and/or determining what response is requested (e.g., the response is a summary of how long the activity was performed in total, not necessarily a request to recall and/or show the detected visual event(s)).

At block 622, the process 600 may include determining whether the event data as stored in the activity database is associated with the event request. For example, the event management component described herein may query the activity database for the recognized objects, recognized entities, and recognized activities stored therein and may utilize such data to generate a response to the summary request. In some examples, the data received from the activity database may be associated with the event data or otherwise be associated with an activity requested by the user.

In examples where the event data is not associated with the event request, the process 600 may include, at block 624, indicating the event from the event request was not detected. In this example, a response may still be provided to the user, but the response may indicate that the requested event was not detected utilizing the on-device LMs described herein.

In examples where the event data is associated with the event request, the process 600 may include, at block 626, indicating the event from the event request was detected. In examples, one or more of the on-device LMs may be utilized to infer and/or generate the summary of the requested event(s) utilizing the data stored in the activity database. For example, a summary prompt may be constructed utilizing the data from the activity database and the prompt may request that a textual LM utilize the keyframe descriptions stored in the activity database to recognize the activity in question and to generate the requested summary. In the example above, the generated summary may be that Person A played the piano for a certain period of time. The generated summary may also include the image data associated with the activity, the keyframes, and/or contextual information utilized by the primary device to generate the summary.

Figure 7:
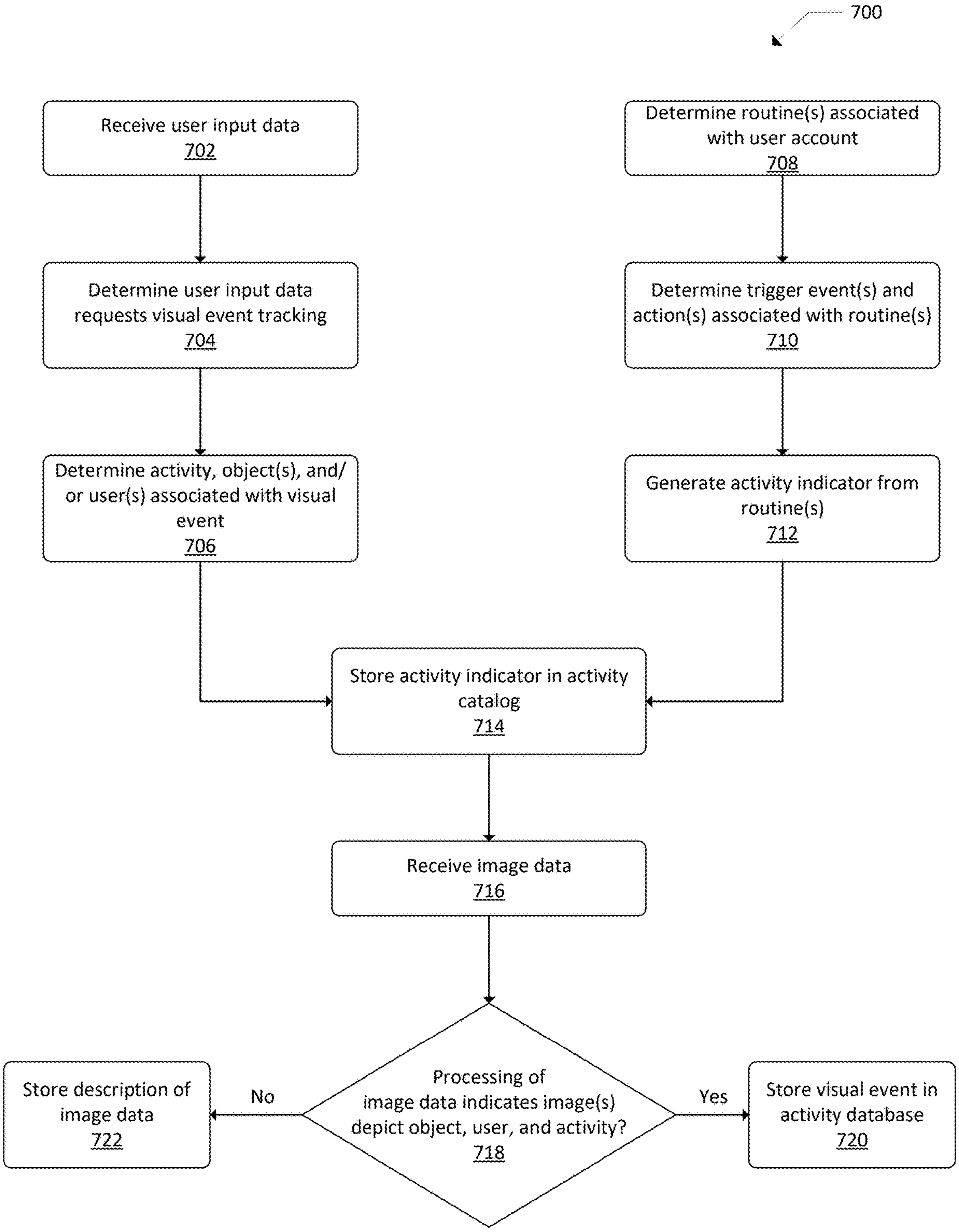
FIG. 7 illustrates a flow diagram of an example process for creating activity indicators to be utilized by on-device LMs to determine activities from image data.

FIG. 7 illustrates a flow diagram of an example process 700 for creating activity indicators to be utilized by on-device LMs to infer activities from image data. The order in which the operations or steps are described is not intended to be construed as a limitation, and any number of the described operations may be combined in any order and/or in parallel to implement process 700.

At block 702, the process 700 may include receiving user input data. In examples, the user input data may be received in the form of audio data when the user input data represents a voice command to perform an action. In other examples, the user input data may be received in the form of text data when the user input data represents a typed or otherwise textual command to perform an action. It should be understood that the user input data may be received in any form and the primary device may be configured to perform language processing on the user input data to determine what action should be performed. In examples, the LMs described herein may be configured to infer the action to be performed as indicated by the user input data.

At block 704, the process 700 may include determining that the user input data requests visual event analysis. In a nonlimiting example, a user may provide user input data to a device, and the user input data may request that a given activity be remembered by the system. In this example, the user has provided an explicit instruction for images to be captured within the environment and for corresponding image data to be analyzed for the purpose provided by the user. In these and other examples, the user input data may be received at an event management component of the primary device. The event management component may analyze the user input data to determine an activity indicated by the user input data to be remembered over time. For example, the user input data may be "remember when I and/or Person A performs Activity B." In this example, the event management component may determine that the activity in question is Activity B.

At block 706, the process 700 may include determining the activity, one or more objects, and/or one or more users associated with the visual event. In examples, The event management component may also determine that the request to remember the activity includes one or more conditions, such as the activity being performed by a specific user (here Person A) and/or the activity being performed in association with a given object. An example of this may be a request to remember when a given user plays an instrument. The event management component, having determined the activity to be remembered and one or more conditions may generate an activity indicator that may be stored in an activity catalog of the primary device. The activity catalog may be called, as described in more detail below, for the activity indicator when analyzing subsequently received image data.

At block 708, the process 700 may include determining one or more routines associated with a given user account. For example, given user account data associated with the primary device may indicate that one or more routines have been set up. A user registry may be queried to determine the user account data associated with the primary device. The user account data may then be parsed to determine whether any routines have been set up by the user, the primary device, and/or remote components of the system described herein.

At block 710, the process 700 may include determining one or more trigger events and/or action(s) associated with the routine(s). For example, a routine may indicate that a given action is to be performed by one or more devices in the environment when a given trigger event occurs. A nonlimiting example of a routine may be that a given light should turn on when motion is detected in a room where the light is disposed. The user account data may indicate actions and trigger events associated with routines.

At block 712, the process 700 may include generating an activity indicator from the routine(s). For example, the actions and trigger events from the routine(s) that were identified as described above may be utilized by an event management component of the primary device to determine candidate activities to be remembered. Corresponding activity indicators may be generated by the event management component utilizing the routines of the user account data. For example, certain trigger events may be considered visual trigger events, such as detection of visual user presence in an environment, detection of a given perform from image data analysis, detection of certain objects using image data analysis, etc. These trigger events may be determined to be candidate activities to be remembered utilizing the techniques described herein. Additionally, certain actions may be considered visual actions, such as causing a garage door to open or close, starting a smart vacuum, opening or closing a door, locking or unlocking a door, etc. These actions may be determined to be candidate activities to be remembered utilizing the techniques described herein.

At block 714, the process 700 may include storing an activity indicator for the determined activity in an activity catalog. For example, as described above, once the activities are determined from user input data and/or from routines and/or from one or more other data sources indicating potential visual events that may be remembered utilizing the on-device LMs described herein, corresponding activity indicators may be generated that describe the activities. These activity indicators may be stored in an activity catalog of the primary device. By so doing, the activity indicators may be stored in such a manner that they may not be sent to remote components of the system.

At block 716, the process 700 may include receiving image data. For example, image data may be generated by one or more devices. To do so, in a nonlimiting example, the devices may determine when motion is detected in the environment and may commence capturing images based at least in part on the detection of the motion. The image data may be sent from the various device(s) to a primary device. In examples, an instance of the image data may be stored in an image data storage while the image data is being processed.

At block 718, the process 700 may include determining whether processing of the image data indicates images corresponding to the image data depict the object, the user, and the activity associated with the activity indicator. For example, one of the components utilized to analyze the keyframes may be an object recognition component configured to analyze the keyframes utilizing one or more object classification models to recognize objects depicted in the images. In examples, contextual data such as which space the images were captured in (e.g., the images are from a device situated in a "kitchen" space or a "living room" space) may be utilized to select an object classification model. The object classification model may analyze the keyframes to determine if the images depict any of the objects that the object classification model is trained to detect. Additional details on the object classification model, including the use of computer vision techniques to detect objects, is provided below with respect to FIG. 15. The object classification model may detect objects depicted in the images and may generate data indicating these recognized objects.

Another of the components utilized to analyze the image data may be an activity recognition component configured to utilizing on-device LMs to infer an activity being performed by a user depicted in the images. For example, the keyframes of the image data may be received by the activity recognition component, which may construct an image description prompt to be utilized by a visual LM to generate keyframe descriptions of activities depicted in images. To do so, the activity recognition component may query the activity catalog for the activity indicators stored therein. The activity indicators received from the activity catalog may be utilized to construct the prompt described above such that the visual LM is instructed to infer whether one or more of the activities associated with the activity indicators are occurring in the images. The visual LM may intake the keyframes of the image data and utilize the image description prompt to generate keyframe descriptions of activities inferred from the image data. Thereafter, a textual LM may be utilized, with the keyframe descriptions as input, to determine whether the keyframes depict one or more of the activities from the activity catalog.

Another of the components utilized to analyze the image data may be an entity recognition component configured to analyze the keyframes and/or contextual signals to recognize users depicted in the images. In examples, the image data itself may be utilized to identify features of a depicted user. Additional contextual signals such as device beaconing data, speech-related data, location data, etc. may be utilized by the entity recognition component to determine which user is depicted in the images, if any. Additional details on the detection of users utilizing image data and/or contextual signals is provided below with respect to FIGS. 16-19. The entity recognition component may detect users depicted in the images and may generate data indicating these recognized users (otherwise referred to herein as recognized entities).

In examples where the images depict the object, the user, and the activity, the process 700 may include, at block 720, storing a visual event in the activity database for the activity detection. For example, an activity database of the primary device may be configured to store some or all of the data determined by the object recognition component, the entity recognition component, and/or the activity recognition component. This data may indicate the objects, entities, and activities that were detected along with timing information indicating when such objects, entities, and activities were detected. In some examples, the image data and/or keyframes may also be stored in the activity database and/or in the image data storage based at least in part on one or more of the activities from the activity catalog being inferred by the on-device LMs.

In examples where the images do not depict the object, the user, and the activity, the process 700 may include, at block 722, storing a description of image data. In this example, even though an activity from the activity catalog was not inferred utilizing the on-device LMs, the image data analysis may still result in the detection of some object and/or the detection of some user from the images. In this scenario, the description of the image data may store be stored for use at a later time, such as when a user subsequently requests information for a visual event that does not correspond to an already-determined activity in the activity catalog.

Figure 8:
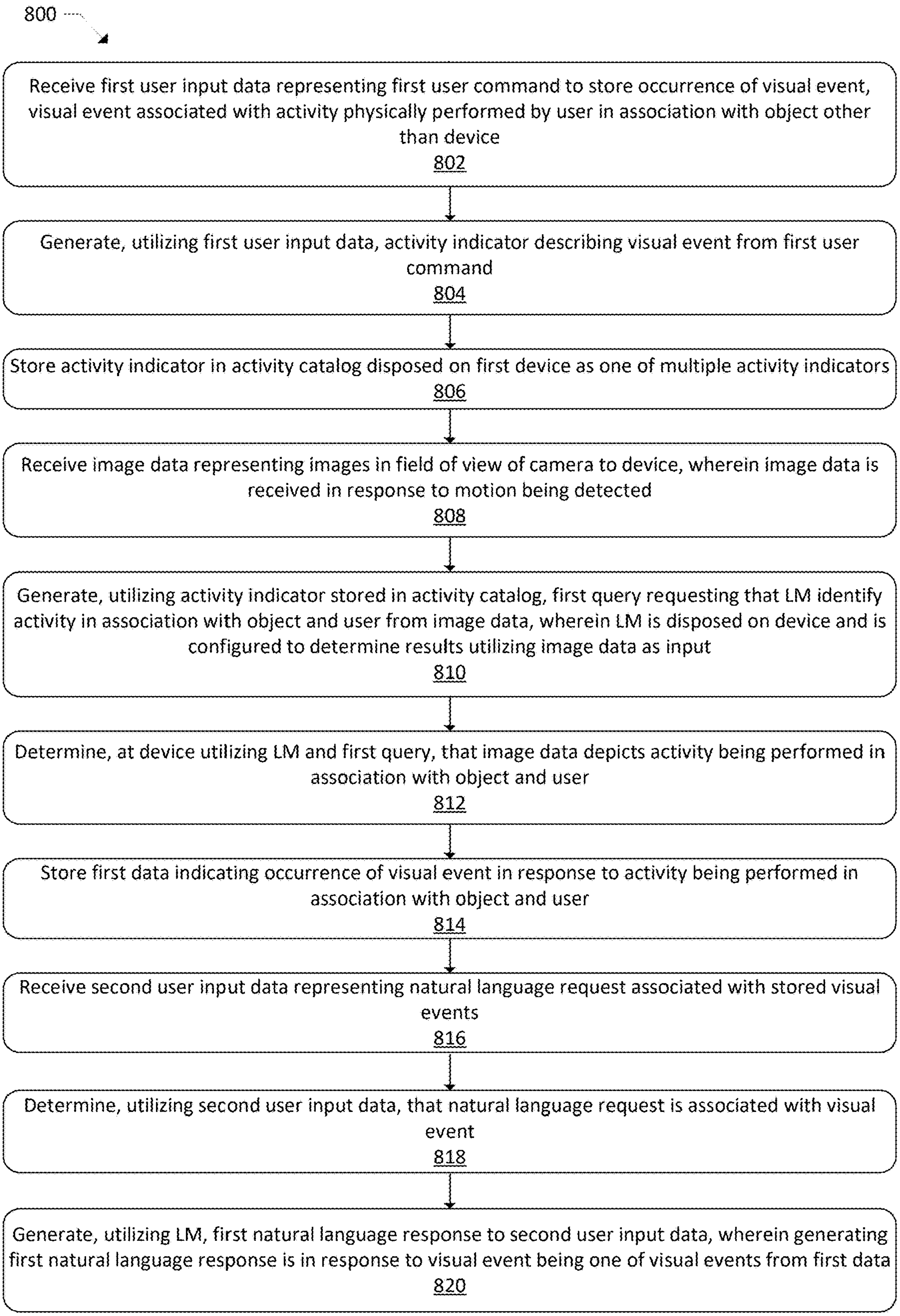
FIG. 8 illustrates a flow diagram of an example process for visual event processing using LMs.

FIG. 8 illustrates a flow diagram of an example process 800 for visual event processing using LMs. The order in which the operations or steps are described is not intended to be construed as a limitation, and any number of the described operations may be combined in any order and/or in parallel to implement process 800.

At block 802, the process 800 may include receiving first user input data representing a first user command to store occurrence of a visual event, the visual event associated with an activity physically performed by a user in association with an object other than the device. In examples, the user input data may be received in the form of audio data when the user input data represents a voice command to perform an action. In other examples, the user input data may be received in the form of text data when the user input data represents a typed or otherwise textual command to perform an action. It should be understood that the user input data may be received in any form and the primary device may be configured to perform language processing on the user input data to determine what action should be performed. In examples, the LMs described herein may be configured to infer the action to be performed as indicated by the user input data.

At block 804, the process 800 may include generating, utilizing the first user input data, an activity indicator describing the visual event from the first user command. In a nonlimiting example, a user may provide user input data to a device, and the user input data may request that a given activity be remembered by the system. In this example, the user has provided an explicit instruction for images to be captured within the environment and for corresponding image data to be analyzed for the purpose provided by the user. In these and other examples, the user input data may be received at an event management component of the primary device. The event management component may analyze the user input data to determine an activity indicated by the user input data to be remembered over time. For example, the user input data may be "remember when I and/or Person A performs Activity B." In this example, the event management component may determine that the activity in question is Activity B.

At block 806, the process 800 may include storing the activity indicator in an activity catalog disposed on the device as one of multiple activity indicators. For example, as described above, once the activities are determined from user input data and/or from routines and/or from one or more other data sources indicating potential visual events that may be remembered utilizing the on-device LMs described herein, corresponding activity indicators may be generated that describe the activities. These activity indicators may be stored in an activity catalog of the primary device. By so doing, the activity indicators may be stored in such a manner that they may not be sent to remote components of the system.

At block 808, the process 800 may include receiving image data representing images in a field of view of a camera to the device, wherein the image data is received in response to motion being detected. In this example, the primary device may be configured to send commands to various other devices in the environment requesting image data from those devices and/or the primary device may cause itself to capture images, particularly in situations where motion is detected in the environment. In another example, image data may be generated by one or more devices. To do so, in a nonlimiting example, the devices may determine when motion is detected in the environment and may commence capturing images based at least in part on the detection of the motion. The image data may be sent from the various device(s) to a primary device. In examples, an instance of the image data may be stored in an image data storage while the image data is being processed.

At block 810, the process 800 may include generating, utilizing the activity indicator stored in the activity catalog, a first query requesting that a language model (LM) identify the activity in association with the object and the user from the image data, wherein the LM is disposed on the device and is configured to determine results utilizing the image data as the input. For example, the image data may be received by an activity recognition component, which may construct an image description prompt to be utilized by a LM to generate keyframe descriptions of activities depicted in images. To do so, the activity recognition component may query the activity catalog for the activity indicators stored therein. These activity indicators may be utilized to construct the prompt such that the LM is instructed to infer whether one or more of the activities associated with the activity indicators are occurring in the images.

Additionally, contextual data such as which space the images were captured in (e.g., the images are from a device situated in a "kitchen" space or a "living room" space) may be utilized to select an object classification model. The object classification model may analyze the keyframes to determine if the images depict any of the objects that the object classification model is trained to detect. Additional details on the object classification model, including the use of computer vision techniques to detect objects, is provided below with respect to FIG. 15. The object classification model may detect objects depicted in the images and may generate data indicating these recognized objects.

Additionally, the image data itself may be utilized to identify features of a depicted user. Additional contextual signals such as device beaconing data, speech-related data, location data, etc. may be utilized by the entity recognition component to determine which user is depicted in the images, if any. Additional details on the detection of users utilizing image data and/or contextual signals is provided below with respect to FIGS. 16-19. The entity recognition component may detect users depicted in the images and may generate data indicating these recognized users (otherwise referred to herein as recognized entities).

At block 812, the process 800 may include determining, at the device utilizing the LM and the first query, that the image data depicts the activity being performed in association with the object and the user. For example, the keyframes of the image data may be received by the activity recognition component, which may construct an image description prompt to be utilized by a LM to generate keyframe descriptions of activities depicted in images. To do so, the activity recognition component may query the activity catalog for the activity indicators stored therein. The activity indicators received from the activity catalog may be utilized to construct the prompt described above such that the LM is instructed to infer whether one or more of the activities associated with the activity indicators are occurring in the images. The LM may intake the keyframes of the image data and utilize the image description prompt to generate keyframe descriptions of activities inferred from the image data. Thereafter, a LM may be utilized, with the keyframe descriptions as input, to determine whether the keyframes depict one or more of the activities from the activity catalog.

At block 814, the process 800 may include storing first data indicating occurrence of the visual event in response to the activity being performed in association with the object and the user. For example, an activity database may store the first data indicating that the visual event has been detected from the image data, and in examples the indication may be that the activity has been detected in association with the user in question and the object in question.

At block 816, the process 800 may include receiving second user input data representing a natural language request associated with stored visual events. For example, the natural language request may correspond to a request to recall, from visual events detected by the on-device LM, a certain visual event. The natural language request may also correspond to a request to summarize detected visual events, to parse visual events, to identify objects and/or users associated with a detected visual event, to provide a response indicating whether a given visual event has occurred and/or when the particular visual event occurred, etc.

At block 818, the process 800 may include determining, utilizing the second user input data, that the natural language request is associated with the visual event. For example, the second user input data may be utilized by the on-device LM to parse the detected visual events in the activity database to determine if the natural language request is associated with any of the detected visual events. The on-device LM may utilize keyframe descriptions, activity descriptions, object recognition results, entity recognition results, and/or any other data from the activity database to determine if the natural language request is associated with the detected visual events.

At block 820, the process 800 may include generating, utilizing the LM, a first natural language response to the second user input data, wherein generating the first natural language response is in response to the visual event being one of the visual events from the first data. In examples, one or more of the on-device LMs may be utilized to infer and/or generate the summary of the requested event(s) utilizing the data stored in the activity database. For example, a summary prompt may be constructed utilizing the data from the activity database and the prompt may request that a textual LM utilize the keyframe descriptions stored in the activity database to recognize the activity in question and to generate the requested summary. In the example above, the generated summary may be that Person A played the piano for a certain period of time. The generated summary may also include the image data associated with the activity, the keyframes, and/or contextual information utilized by the primary device to generate the summary.

Additionally, or alternatively, the process 800 may include determining, utilizing the LM, a description of an image data frame received at the device and storing, at the device, data representing the description of the image data frame. The process 800 may also include receiving third user input data requesting determination of whether a particular visual event has occurred, the particular visual event differing from the multiple activity indicators. The process 800 may also include generating a second query requesting that the LM determine whether the particular visual event occurred and determining, utilizing the LM and in response to the second query, that the description is associated with the particular visual event. The process 800 may also include generating a second natural language response to the third user input data, wherein generating the second natural language response is in response to determining that the description is associated with the particular visual event.

Additionally, or alternatively, the process 800 may include determining account data associated with the device and determining a routine associated with the account data, the routine indicating an action to be performed upon occurrence of an additional activity. The process 800 may also include generating one of the multiple activity indicators utilizing the additional activity from the routine. In these examples, the LM may select the activity being performed from the multiple activity indicators.

Additionally, or alternatively, the process 800 may include receiving third user input data requesting a summary of occurrences of the visual event over a period of time and determining, utilizing the LM, additional occurrences of the activity from additional image data received over the period of time. The process 800 may also include storing visual event identifiers of the activity on the device over the period of time. The process 800 may also include generating, utilizing the LM and the visual event identifiers, the summary of the occurrences of the visual event over the period of time.

FIG. 9 illustrates a flow diagram of another example process 900 for visual event processing using LMs. The order in which the operations or steps are described is not intended to be construed as a limitation, and any number of the described operations may be combined in any order and/or in parallel to implement process 900.

At block 902, the process 900 may include receiving first user input data representing a first user command to store an activity indictor representing an occurrence of a visual event, the visual event associated with an activity in an environment. In examples, the user input data may be received in the form of audio data when the user input data represents a voice command to perform an action. In other examples, the user input data may be received in the form of text data when the user input data represents a typed or otherwise textual command to perform an action. It should be understood that the user input data may be received in any form and the primary device may be configured to perform language processing on the user input data to determine what action should be performed. In examples, the LMs described herein may be configured to infer the action to be performed as indicated by the user input data.

At block 904, the process 900 may include storing an activity indicator in a device. In a nonlimiting example, a user may provide user input data to a device, and the user input data may request that a given activity be remembered by the system. In this example, the user has provided an explicit instruction for images to be captured within the environment and for corresponding image data to be analyzed for the purpose provided by the user. In these and other examples, the user input data may be received at an event management component of the primary device. The event management component may analyze the user input data to determine an activity indicated by the user input data to be remembered over time. For example, the user input data may be "remember when I and/or Person A performs Activity B." In this example, the event management component may determine that the activity in question is Activity B. Once the activities are determined from user input data and/or from routines and/or from one or more other data sources indicating potential visual events that may be remembered utilizing the on-device LMs described herein, corresponding activity indicators may be generated that describe the activities. These activity indicators may be stored in an activity catalog of the primary device. By so doing, the activity indicators may be stored in such a manner that they may not be sent to remote components of the system.

At block 906, the process 900 may include generating, utilizing the activity indicator stored in the device, a first query requesting that a language model (LM) identify the activity from image data, wherein the LM is disposed on the device and is configured to determine results utilizing the image data as the input. For example, the image data may be received by an activity recognition component, which may construct an image description prompt to be utilized by a visual LM to generate keyframe descriptions of activities depicted in images. To do so, the activity recognition component may query the activity catalog for the activity indicators stored therein. These activity indicators may be utilized to construct the prompt such that the visual LM is instructed to infer whether one or more of the activities associated with the activity indicators are occurring in the images.

At block 908, the process 900 may include determining, at the device utilizing the LM and the first query, that the image data depicts the activity. For example, another of the components utilized to analyze the image data may be an activity recognition component configured to utilizing on-device LMs to infer an activity being performed by a user depicted in the images. For example, the keyframes of the image data may be received by the activity recognition component, which may construct an image description prompt to be utilized by a visual LM to generate keyframe descriptions of activities depicted in images. To do so, the activity recognition component may query the activity catalog for the activity indicators stored therein. The activity indicators received from the activity catalog may be utilized to construct the prompt described above such that the visual LM is instructed to infer whether one or more of the activities associated with the activity indicators are occurring in the images. The visual LM may intake the keyframes of the image data and utilize the image description prompt to generate keyframe descriptions of activities inferred from the image data. Thereafter, a textual LM may be utilized, with the keyframe descriptions as input, to determine whether the keyframes depict one or more of the activities from the activity catalog.

At block 910, the process 900 may include storing first data indicating occurrence of the visual event based at least in part on the LM determining that the image data depicts the activity. For example, an activity database may store the first data indicating that the visual event has been detected from the image data, and in examples the indication may be that the activity has been detected in association with the user in question and the object in question.

At block 912, the process 900 may include receiving second user input data representing a natural language request associated with stored visual events. For example, the natural language request may correspond to a request to recall, from visual events detected by the on-device LM, a certain visual event. The natural language request may also correspond to a request to summarize detected visual events, to parse visual events, to identify objects and/or users associated with a detected visual event, to provide a response indicating whether a given visual event has occurred and/or when the particular visual event occurred, etc.

At block 912, the process 900 may include generating a first natural language response to the second user input data indicating that the visual event has been detected, wherein generating the first natural language response is based at least in part on the first data indicating occurrence of the visual event. In examples, one or more of the on-device LMs may be utilized to infer and/or generate the summary of the requested event(s) utilizing the data stored in the activity database. For example, a summary prompt may be constructed utilizing the data from the activity database and the prompt may request that a textual LM utilize the keyframe descriptions stored in the activity database to recognize the activity in question and to generate the requested summary. In the example above, the generated summary may be that Person A played the piano for a certain period of time. The generated summary may also include the image data associated with the activity, the keyframes, and/or contextual information utilized by the primary device to generate the summary.

Additionally, or alternatively, the process 900 may include determining, utilizing the LM, a description of an image data frame received at the device and receiving third user input data requesting determination of whether an additional visual event has occurred, the additional visual event differing from the activity indicator. The process 900 may also include determining, utilizing the LM and based at least in part on the third user input data, that the description is associated with the additional visual event. The process 900 may also include generating a second natural language response indicating occurrence of the additional visual event based at least in part on determining that the description is associated with the additional visual event.

Additionally, or alternatively, the process 900 may include determining a routine associated with the device, the routine indicating an action to be performed upon occurrence of an additional activity. The process 900 may also include generating an additional activity indicator based at least in part on the routine.

Additionally, or alternatively, the process 900 may include receiving third user input data requesting a summary of occurrences of the visual event over a period of time. The process 900 may also include determining, utilizing the LM, additional occurrences of the activity from additional image data received over the period of time and storing visual event identifiers of the activity on the device over the period of time. The process 900 may also include generating, utilizing the LM and the visual event identifiers, the summary of the occurrences of the visual event over the period of time.

Additionally, or alternatively, the process 900 may include determining a keyframe representing the image data and inputting the keyframe into the LM. The process 900 may also include receiving, from the LM, a description of the keyframe and storing the description of the keyframe on the device. The process 900 may also include querying at least one of the LM or another LM disposed on the device to determine, from the description of the keyframe, whether the image data depicts the activity. In these examples, determining that the image data depicts the activity may be based at least in part on the description of the keyframe.

Additionally, or alternatively, the process 900 may include determining to store the first data including the image data and an indication that the activity was detected for a first period of time based at least in part on the visual event being detected. The process 900 may also include receiving additional image data and determining to store the additional image data for a second period of time based at least in part on the additional image data being unassociated with one or more activity indicators stored on the device, the second period of time being less than the first period of time.

Additionally, or alternatively, the process 900 may include determining that the first user input data indicates an object associated with the activity and a user associated with the activity. The process 900 may also include determining, utilizing the LM, that the activity determined from the image data is performed in association with the object and the user. In these examples, generating the first natural language response may be based at least in part on the activity being performed in association with the object and the user.

Additionally, or alternatively, the process 900 may include determining, from the image data, a subset of frames of the image data to be analyzed by the LM at the device, the subset of frames determined based at least in part on pixel differences detected as between consecutive frames of the image data. The process 900 may also include inputting the subset of frames into the LM along with the first query, wherein the first query prompts the LM to determine whether the activity is determined from individual frames of the subset of frames. The process 900 may also include receiving, from the LM, an identification of which of the individual frames are associated with the activity.

Figure 10:
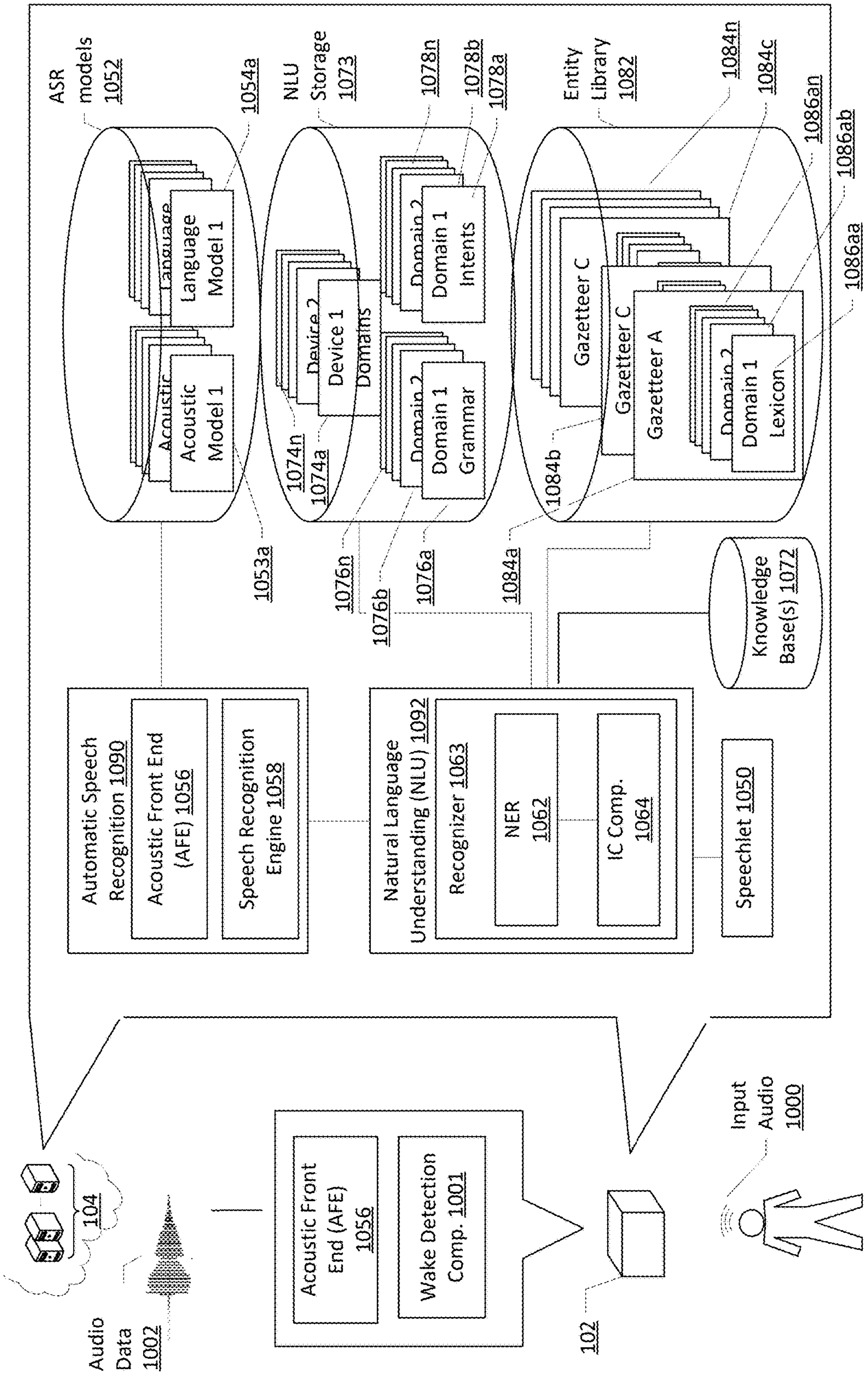
FIG. 10 illustrates a conceptual diagram of components of a speech-processing system for processing audio data provided by one or more devices.

FIG. 10 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 10 may occur directly or across a network 106. An audio capture component, such as a microphone 112 of the device 102, or another device, captures audio 1002 corresponding to a spoken utterance. The device 102, using a wake detection component 1001, then processes audio data corresponding to the audio 1000 to determine if a keyword (such as a wakeword) is detected in the audio data. Following detection of a wakeword, the device 102 processes audio data 1002 corresponding to the utterance utilizing an ASR component 1090. The audio data 1002 may be output from an optional acoustic front end (AFE) 1056 located on the device prior to transmission. In other instances, the audio data 1002 may be in a different form for processing by a remote AFE 1056, such as the AFE 1056 located with the ASR component 1090.

The wake detection component 1001 works in conjunction with other components of the user device, for example a microphone to detect keywords in audio 1000. For example, the device may convert audio 1000 into audio data 1002, and process the audio data 1002 with the wake detection component 1001 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake detection component 1001 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake detection component 1001 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/RNN structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake." The audio data 1002 may include data corresponding to the wakeword. Further, a local device may "wake" upon detection of speech/spoken audio above a threshold, as described herein. An ASR component 1090 may convert the audio data 1002 into text. The ASR transcribes audio data into text data or other ASR output data representing the words of the speech contained in the audio data 1002. The text data or other ASR output data may then be used by other components for various purposes, such as executing system commands, inputting data, etc. A spoken utterance in the audio data is input to a processor configured to perform ASR which then interprets the utterance based on the similarity between the utterance and pre-established language models 1054 stored in an ASR model knowledge base (ASR Models Storage 1052). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053 stored in an ASR Models Storage 1052), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 1090 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1056 and a speech recognition engine 1058. The acoustic front end (AFE) 1056 transforms the audio data from the microphone into data for processing by the speech recognition engine 1058. The speech recognition engine 1058 compares the speech recognition data with acoustic models 1053, language models 1054, and other data models and information for recognizing the speech conveyed in the audio data. The AFE 1056 may reduce noise in the audio data and divide the digitized audio data into frames representing time intervals for which the AFE 1056 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1058 may process the output from the AFE 1056 with reference to information stored in speech/model storage (1052). Alternatively, post front-end processed data (such as feature vectors) may be received by the device executing ASR processing from another source besides the internal AFE. For example, the user device may process audio data into feature vectors (for example using an on-device AFE 1056).

The speech recognition engine 1058 attempts to match received feature vectors to language phonemes and words as known in the stored acoustic models 1053 and language models 1054. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, what time is the pool open until" The wake detection component may identify the wake word, otherwise described as a trigger expression, "Alexa," in the user utterance and may "wake" based on identifying the wake word. The speech recognition engine 1058 may identify, determine, and/or generate text data or other ASR output data corresponding to the user utterance, here "what time is the pool open until."

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 858 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 1092 may include various components, including potentially dedicated processor(s), memory, storage, etc. As shown in FIG. 10, an NLU component 1092 may include a recognizer 1063 that includes a named entity recognition (NER) component 1062 which is used to identify portions of query text that correspond to a named entity that may be recognizable by the system. A downstream process called named entity resolution links a text portion to a specific entity known to the system. To perform named entity resolution, the system may utilize gazetteer information (1084*a*-1084*n*) stored in entity library storage 1082. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 1090 based on the utterance input audio 1000) and attempts to make a semantic interpretation of the text. That is, the NLU process determines the meaning behind the text based on the individual words and then implements that meaning. NLU processing 1092 interprets a text string to derive an intent or a desired action from the user as well as the pertinent pieces of information in the text that allow a device (e.g., device 102) to complete that action. For example, if a spoken utterance is processed using ASR 1090 and outputs the text "what time is the pool open until" the NLU process may determine that the user intended to receive a response to the voice command indicating a time when the pool of the enterprise entity closes.

The NLU 1092 may process several textual inputs related to the same utterance. For example, if the ASR 1090 outputs N text segments (as part of an N-best list), the NLU may process all N outputs to obtain NLU results.

As will be discussed further below, the NLU process may be configured to parse and tag to annotate text as part of NLU processing. For example, for the text "what time is the pool open until," "what time" may be tagged as a command (to determine a time to respond to the user with).

To correctly perform NLU processing of speech input, an NLU process 1092 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1062 receives a query in the form of ASR results and attempts to identify relevant grammars and lexical information that may be used to construe meaning. To do so, the NLU component 1092 may begin by identifying potential domains that may relate to the received query. The NLU storage 1073 includes a database of devices (1074*a*-1074*n*) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 863, language model and/or grammar database (1076*a*-1076*n*), a particular set of intents/actions (1078*a*-1078*n*), and a particular personalized lexicon (1086). Each gazetteer (1084*a*-1084*n*) may include domain-indexed lexical information associated with a particular user and/or device. For example, the Gazetteer A (1084*a*) includes domain-index lexical information 1086*aa* to 1086*an*. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1064 parses the query to determine an intent or intents for each identified domain, where the intent corresponds to the action to be performed that is responsive to the query. Each domain is associated with a database (1078*a*-1078*n*) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1064 identifies potential intents for each identified domain by comparing words in the query to the words and phrases in the intents database 1078. In some instances, the determination of an intent by the IC component 1064 is performed using a set of rules or templates that are processed against the incoming text to identify a matching intent.

In order to generate a particular interpreted response, the NER 1062 applies the grammar models and lexical information associated with the respective domain to actually recognize a mention of one or more entities in the text of the query. In this manner, the NER 1062 identifies "slots" or values (i.e., particular words in query text) that may be needed for later command processing. Depending on the complexity of the NER 1062, it may also label each slot with a type of varying levels of specificity (such as noun, place, device name, device location, city, artist name, song name, amount of time, timer number, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with the shopping domain may include a database of words commonly used when people discuss shopping.

The intents identified by the IC component 1064 are linked to domain-specific grammar frameworks (included in 1076) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1076) framework or frameworks may correspond to sentence structures such as "purchase item called 'Item A' from Marketplace A."

For example, the NER component 1062 may parse the query to identify words as subject, object, verb, preposition, etc., based on grammar rules and/or models, prior to recognizing named entities. The identified verb may be used by the IC component 1064 to identify intent, which is then used by the NER component 1062 to identify frameworks. A framework for the intent of "play a song," meanwhile, may specify a list of slots/fields applicable to play the identified "song" and any object modifier (e.g., specifying a music collection from which the song should be accessed) or the like. The NER component 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1062 may search the database of generic words associated with the domain (in the knowledge base 1072). So, for instance, if the query was "identify this song," after failing to determine which song is currently being output, the NER component 1062 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to the speechlet 1050. The speechlet 1050 may be determined based on the NLU output. For example, if the NLU output includes a command to send a message, the destination speechlet 1050 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the destination speechlet 1050 may provide some or all of this information to a text-to-speech (TTS) engine. The TTS engine may then generate an actual audio file for outputting the audio data determined by the application (e.g., "okay," or "the pool closes at 10:00 pm").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 1092 during runtime operations where NLU operations are performed on text (such as text output from an ASR component 1090). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1063. Each recognizer may include various NLU components such as an NER component 1062, IC component 1064 and other components such as an entity resolver, or other components.

For example, a messaging domain recognizer 1063-A (Domain A) may have an NER component 1062-A that identifies what slots (i.e., portions of input text) may correspond to particular words relevant to that domain. The words may correspond to entities such as (for the messaging domain) a recipient. An NER component 1062 may use a machine learning model, such as a domain specific conditional random field (CRF) to both identify the portions corresponding to an entity as well as identify what type of entity corresponds to the text portion. The messaging domain recognizer 1063-A may also have its own intent classification (IC) component 1064-A that determines the intent of the text assuming that the text is within the proscribed domain. An IC component may use a model, such as a domain specific maximum entropy classifier to identify the intent of the text, where the intent is the action the user desires the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the input processing. The multiple devices may include overlapping components. The components of the user device and the system 104, as illustrated herein are exemplary, and may be located in a stand-alone device or may be included, in whole or in part, as a component of a larger device or system, may be distributed across a network or multiple devices connected by a network, etc.

FIG. 11 illustrates further example components included in the system 1100 configured to determine an action responsive to a user input and in which the context handler component 1126 may be implemented. As shown in FIG. 11, the system may include a user device 102, local to a user 1102, in communication with a system component(s) 104 via a network(s) 106. The network(s) 106 may include the Internet and/or any other wide- or local-area network, and may include wired, wireless, and/or cellular network hardware.

The system component(s) 104 may include various components, such as a LM orchestrator component 1112, and an action plan execution component 1116. The LM orchestrator component 1112 may include a task generation component 1106, an LM shortlister component 1108, and a response arbitration component 1134.

In some embodiments, the LM orchestrator component 1112 may generate prompt data representing a prompt for input to one or more language models. As shown in FIG. 11, the system component(s) 104 receive the user input data 1104, which may be provided to the LM orchestrator component 1112. In some instances, the user input data 1104 may correspond to various data types, such as text (e.g., a text or tokenized representation of a user input), audio, image, video, etc. For example, the user input data may include input text (or tokenized) data when the user input is a typed natural language user input. For further example, prior to the LM orchestrator component 1112 receiving the user input data 1104, another component (e.g., an automatic speech recognition (ASR) component 1090) of the system 1100 may receive audio data representing the user input. The ASR component 1090 may perform ASR processing on the audio data to determine ASR data corresponding to the user input, which may correspond to a transcript of the user input. As described below, with respect to FIG. 13, the ASR component 1090 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 1090 level of confidence that the corresponding hypothesis represents what the user said. The ASR component 1090 may also determine token scores corresponding to each token/word of the ASR hypothesis, where the token score indicates the ASR component's 1090 level of confidence that the respective token/word was spoken by the user. The token scores may be identified as an entity score when the corresponding token relates to an entity. In some instances, the user input data 1104 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 1100 may include one or more components configured to process such user inputs to generate the text or tokenized representation of the user input (e.g., the user input data 1104).

In some embodiments, the LM orchestrator component 1112 may receive input data, which may be processed in a similar manner as the user input data 1104 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the device 102, a user entering the home, etc.). In some embodiments, the system 1100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 1100 may include one or more components configured to process the input data to generate a natural language representation of the input data. The system 1100 may process the input data and may perform an action. For example, in response to detecting a garage door opening, the system 1100 may cause garage lights to turn on, living room lights to turn on, etc. As another example, in response to detecting an oven beeping, the system 1100 may cause a device 102 (e.g., a smartphone, a smart speaker, etc.) to present an alert to the user. The LM orchestrator component 1112 may process the input data to generate tasks that may cause the foregoing example actions to be performed.

In some embodiments, the LM orchestrator component 1112 may generate prompt data representing a prompt for input to the language models. As shown in FIG. 11, the user input data 1104 may be received at the task generation component 1106 of the LM orchestrator component 1112, which may be configured to generate a list (e.g., one or more) of tasks (e.g., steps/actions) that are to be completed in order to perform an action responsive to the user input and select a task of the list of the tasks that is to be completed first (e.g., in a current iteration of processing by the system 1100), as described in detail herein below with respect to FIG. 14. For example, for a user input of "What is the weather for today," the task generation component 1106 may generate a list of tasks of "(1) determine current outside temperature from thermostat; and (2) determine weather forecast for today" and select the task of "determine weather forecast for today" to be completed first. For further example, for a user input of "I am back, please continue outputting the recipe instructions," the task generation component 1106 may generate a list of tasks of "(1) determine context for outputting the recipe instructions; and (2) resume output of the recipe instructions" and select the task of "determine context for outputting the recipe instructions" to be completed first.

In instances where the task generation component 1106 generates more than one task to be completed in order to perform the action responsive to the user input, the task generation component 1106 may further maintain and prioritize the list of tasks as the processing of the system 1100 with respect to the user input is performed. In other words, as the system 1100 processes to complete the list of tasks, the task generation component 1106 may (1) incorporate the potential responses associated with completed tasks into data provided to other components of the system 1100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed. The task generation component 1106 may generate and send task data 1110 representing the selected task to be completed and various other information needed to perform further processing with respect to the task (e.g., the user input data 1104, an indication of the selected task, potential responses associated with previous tasks, the remaining task(s), and context data associated with the user input data 1104, as described in detail herein below with respect to FIG. 14) to the LM shortlister component 1108.

The LM shortlister component 1108 may be configured to determine one or more components (e.g., an API provider component 1118, skill component(s) 1122, LM agent component(s) 1120, a TTS component 1124, the context handler component 1126, etc.) configured to perform an action related to the user input or the current task. The LM shortlister component 1108 may further be configured to generate and cause the execution of a request(s) (e.g., an API call(s), an incomplete API call/API call format, an indication of an action to be performed by a component, etc.) for the one or more components to provide a potential response(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task). For example, for a current task of "determine weather forecast for today," the LM shortlister component 1108 may generate requests of "determine user's preferred weather application," "use Weather Application A to determine weather forecast for today," "use Weather Application B to determine weather forecast for today," or the like. Such requests may be represented in the action plan data 1114 sent to the action plan execution component 1116. The action plan execution component 1116 may identify the request(s) in the action plan data 1114, generate executable API calls corresponding to the request(s), and cause the corresponding components (e.g., the API provider component 1118, the LM agent component 1120, the skill component 1122, the TTS component 1124, and/or the context handler component 1126) to generate action response data 1128 representing the requested potential response(s), where individual action response data 1128 may be provided by/correspond to a particular component-one of the API provider component 1118, the LM agent component 1120, the skill component 1122, the TTS component 1124, and/or the context handler component 1126. In some embodiments, the action response data 1128 may include an identifier (e.g., a component name, an alphanumerical value associated with the component, etc.) for the component providing the data. The LM shortlister component 1108 receives and processes the action response data 1128 and generates potential response data 1130 representing the potential response(s) (e.g., relevant potential responses, selected potential responses, ranked potential responses, etc.) for further processing. If the LM shortlister component 1108 determines that there are no remaining tasks to generate potential responses for, the LM shortlister component 1108 may send the potential response data 1130 to the response arbitration component 1134.

The potential response data 1130, in some embodiments, may be determined based on receiving potential responses from various different components that may be relevant in responding to the user input data 1104. For example, the potential response data 1130 may include a first potential response from a first component configured to perform a first task determined by the task generation component 1106, a second potential response from a second component configured to perform a second task determined by the task generation component 1106, etc. The potential response data 1130 can include more than one potential response relating to an individual task. In some embodiments, the potential response data 1130 may be natural language data.

The response arbitration component 1134 processes the potential response data 1130 to determine whether the potential responses generated for the one or more tasks are responsive to the user input. The response arbitration component 1134 processes the potential response data 1130 (representing at least the generated potential responses) and selects one or more of the potential responses that are determined to be responsive to the user input and/or determines that none of the actions are responsive to the user input. For example, the response arbitration component 1134 may process the potential response data 1130 to determine if one or more of the potential responses performable by the API(s) (e.g., the potential responses and/or potential actions) are responsive to the current task. In some embodiments, the response arbitration component 1134 may generate a natural language summary of one or more of the selected responses and output the natural language summary. For example, for a user input of "what is the weather for today" and potential responses of "The weather for today is a high of 75 and a low of 68" and "The weather for today is mostly sunny with a slight chance of rain in the evening," the response arbitration component 1134 may generate a natural language summary of "The weather for today is expected to be mostly sunny with a high of 75 and a low of 68 and a slight chance of rain in the evening," or the like.

Figure 12:
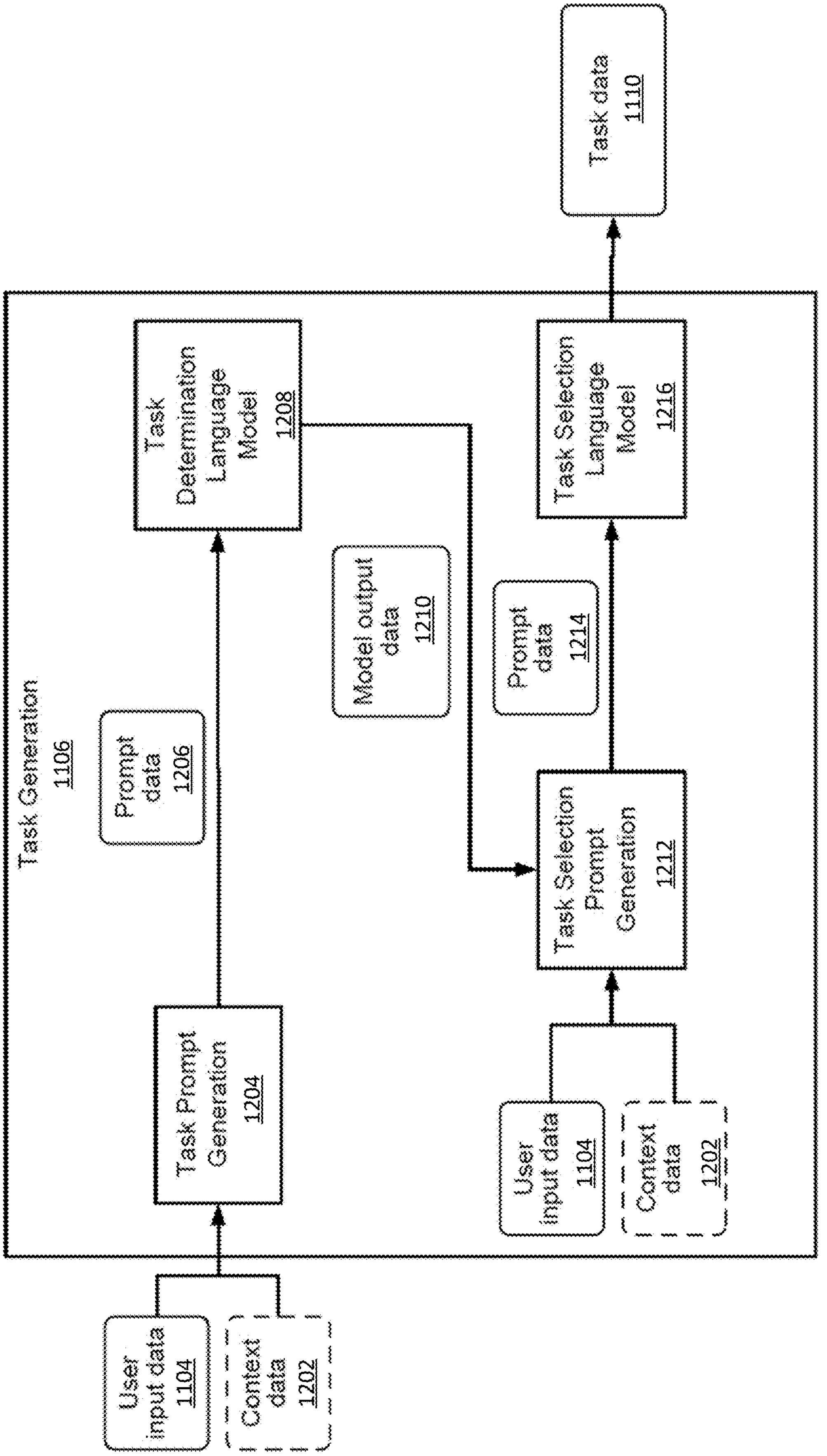
FIG. 12 is a conceptual diagram illustrating example components and processing of a plan generation component, according to embodiments of the present disclosure.

FIG. 12 illustrates example processing of the task generation component 1106. As shown in FIG. 12, the task generation component 1106 may include a task prompt generation component 1204, a task determination language model 1208, a task selection prompt generation component 1212, and a task selection language model 1216.

As further shown in FIG. 12, the user input data 1104 is received at the task prompt generation component 1204, which is configured to generate a list (e.g., one or more) of tasks (e.g., steps/actions) that are to be completed in order to perform an action responsive to the user input and select a task of the list of the tasks that is to be completed first (e.g., in a current iteration of processing by the system 1100).

The task prompt generation component 1204 processes the user input data 1104 to generate prompt data 1206 representing a prompt for input to the task determination language model 1208. In some embodiments, the task prompt generation component 1204 may further receive an indication of one or more remaining tasks to be completed with respect to the user input data 1104. A task to be completed may correspond to a task for which the system 1100 has yet to generate potential responses for (e.g., for which a responding component, such as the API provider component 1118, the LM agent component 1120, the skill component 1122, the TTS component 1124, and/or the context handler component 1126 have yet to generate action response data for). Similarly, a completed task may correspond to a task for which the system 1100 has generated potential responses for (e.g., for which a responding component, such as the API provider component 1118, the LM agent component 1120, the skill component 1122, the TTS component 1124, and/or the context handler component 1126 have generated action response data). For example, if the current iteration of processing with respect to the user input data 1104 is a subsequent iteration of processing (e.g., the system previously determined that more than one task is to be completed in order to perform an action responsive to the user input data 1104 and has previously generated potential responses for at least a first task of the more than one tasks), then the task prompt generation component 1204 may further receive an indication of the remaining tasks to be completed. In such embodiments, the task prompt generation component 1204 may further receive an indication of the task(s) to complete processing for and/or the potential response(s) of the processing. The task prompt generation component 1204 may further receive the context data 1202 representing various contextual signals associated with/relevant to the user input data 1104, such as user profile information (e.g., user ID, user behavioral information, user preferences, age, gender, devices associated with the user profile, etc.), weather information, time of day, device information associated with the device that sent the user input data 1104 (e.g., device ID, device states, historical device interaction data, etc.). In some embodiments, the context data 1202 may correspond to the context data retrieved by the context handler component 1126. For example, the context data 1202 may be retrieved during a previous iteration of processing by the LM orchestrator component 1112, where the context data 1202 was caused to be retrieved by the LM shortlister component 1108 (e.g., in response to the task generation component 1106 determining that the context data is to be retrieved) and sent to the task generation component 1106 thereafter (e.g., as potential response data). In other embodiments, the context data 1202 may correspond to the context data stored in the memory storage, as discussed herein. Such prompt data 1206 may be generated based on combining the user input data 1104 and the context data 1202 (and, in some embodiments, the indication of the remaining task(s), completed task(s), and/or the potential responses).

In some embodiments, the prompt data 1206 may be an instruction for the task determination language model 1208 to determine one or more tasks (e.g., steps/actions) that are to be completed in order to perform an action responsive to the user input given the other information (e.g., the context data 1202, the indication of the remaining task(s), the indication of the completed task(s), and/or the corresponding potential responses) included in the prompt data 1206.

For example for a user input of "turn on all of the lights except the garage," the task prompt generation component 1204 may generate example prompt data 1206:

{
Create a new task if necessary to help complete a request to turn on all of the lights except the garage.
Here are the completed tasks, their potential responses, user inputs, and context so far:
[ ]
These are the remaining tasks to be completed:
[ ]
Based on the result, create new tasks to be completed, if necessary.
}

In some embodiments, the task prompt generation component 1204 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 1206 may include "Please generate a polite, respectful, and safe response and one that does not violate protected class policy."

The task determination language model 1208 processes the prompt data 1206 to generate model output data 1210 representing one or more predicted tasks to be completed in order to perform the action responsive to the user input. For example, based on processing the first example prompt data provided above, the task determination language model 1208 may output model output data 1210: {"turn on all of the lights except the garage light,"} or the like. In some embodiments, the threshold for determining the one or more tasks may be such that the task determination language model 1208 is encouraged to generate multiple predicted tasks for a given user input, where the system 1100 may parse and filter the list of tasks during downstream processing (e.g., during the processing of the task selection language model 1216). For example, based on processing the first example prompt data provided above, the task determination language model 1208 may output model output data 1210: {"turn on all of the lights except the garage light," "turn on all lights," "identify which garage light," "turn on all lights then turn off garage light," "turn on all lights where user is located," "turn on kitchen lights, living room lights, dining room lights, hallways lights" "turn on all lights on first floor,"} or the like. As discussed herein above, in some embodiments the LM may correspond to the task determination language model 1208. As such, in such embodiments, the task determination language model 1208 may process, in addition to the processing described herein below, similarly to LM discussed herein above (e.g., the task determination language model 1208 may determine that context data is needed to generate a response to a user input, such as by generating a context-retrieval task).

As an example of a user input that is associated with more than one task, the LM orchestrator component 1112 may receive a user input of "please order some pizza for dinner" and the task prompt generation component 1204 may generate example prompt data 1206:

{
Create a new task if necessary to help complete a request to order some pizza for dinner.
Here are the completed tasks, their potential responses, user inputs, and context so far:
[ ]
These are the remaining tasks to be completed:
[ ]
Based on the result, create new tasks to be completed, if necessary.
}

The task determination language model 1208 processes the prompt data 1206 to generate model output data 1210 representing one or more predicted tasks to be completed in order to perform the action responsive to the user input. For example, based on processing the example prompt data provided above, the task determination language model 1208 may output model output data 1210: {"identify user pizza preference;" (or some other request for context, such as "determine context to order pizza for dinner") "find application that enables ordering of pizza,"} or the like.

As an example of a subsequent round of processing with respect to a user input (e.g., processing performed with respect to a user input that is associated with more than one task), and for the abovementioned user input of "please order some pizza for dinner", the system 1100 may process as described herein below to select and complete the task of "identify user pizza preference" (or some other request for context). The task prompt generation component 1204 may process the user input, corresponding context data, the remaining task list, and the potential responses (e.g., the users pizza preference, determined, for example, using the context data 1202 retrieved using the context handler component 1126) to generate example prompt data 1206:

{
Create a new task if necessary to help complete a request to order some pizza for dinner.
Here are the completed tasks, their potential responses, user inputs, and context so far:
Completed tasks:
Identify user pizza preference: user ordered Brooklyn style pizza from [Pizza Company Name 1]
These are the remaining tasks to be completed:
Find application to order pizza
Based on the result, create new tasks to be completed, if necessary.
}

The task determination language model 1208 processes the prompt data 1206 to generate model output data 1210 representing one or more predicted tasks to be completed in order to perform the action responsive to the user input. For example, based on processing the example prompt data provided above, including the context data retrieved using the context handler component 1126 during the previous round of processing, the task determination language model 1208 may further output model output data 1210: {"find an application to order pizza" "find API to order [Pizza Company Name 1] pizza,"} or the like.

In some embodiments, the one or more predicted tasks may include a task of storing context data. For example, the model output data 1210 may include a task of storing relevant context data used during the processing performed with respect to the user input data 1104. For further example, the model output data 1210 may include a task of storing context data that was used during the processing performed with respect to previous user input data.

The model output data 1210 is sent to the task selection prompt generation component 1212, which processes the model output data 1210 to generate prompt data 1214 representing a prompt for input to the task selection language model 1216. In some embodiments, such prompt data 1214 may be generated based on combining the user input data 1104, the context data 1202, the prompt data 1206, and/or the model output data 1210. In some embodiments, the task generation component 1106 may include another component that parses the model output data 1210 to determine the one or more tasks and may send a representation of the one or more tasks to the task selection prompt generation component 1212.

In some embodiments, the prompt data 1214 may be an instruction for the task selection language model 1216 to select a task of the one or more tasks that is to be completed first (e.g., completed during the current iteration of processing) given the information (e.g., user input data 1104, the context data 1202, and the one or more tasks) included in the prompt data 1214. In some embodiments, the prompt data 1214 may further include an instruction for the task selection language model 1216 to determine a priority of the one or more tasks (e.g., an ordered list representing the order in which the one or more tasks are to be completed).

For example, for the example user input provided above of "please order some pizza for dinner," the task selection prompt generation component 1212 may generate example prompt data 1214:

{
Select the top prioritized task given the ultimate goal of order some pizza for dinner
Here are the completed tasks, their potential responses, user inputs, and context so far:
[ ]
Here are the task candidates:
Identify user pizza preference (or some other context retrieval task)
Find an application that sells pizza
Return your selected task, return None if the goal is achieved or indicate existing ambiguities.
}

For further example, for the second round of processing performed with respect to the example user input of "please order some pizza for dinner," the task selection prompt generation component 1212 may generate example prompt data 1214:

{
Select the top prioritized task given the ultimate goal of please order some pizza for dinner
Here are the completed tasks, their potential responses, user inputs and context so far:
Completed tasks:
Identify user pizza preference: user ordered Brooklyn style pizza from [Pizza Company 1 Name]
Here are the task candidates:
find an application that sells pizza
find API that sells [Pizza Company 1 Name] pizza
Return your selected task, return None if the goal is achieved or indicate existing ambiguities.
}

In some embodiments, the task selection prompt generation component 1212 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The task selection language model 1216 processes the prompt data 1214 to generate model output data representing the task to be completed first and/or a prioritization of the one or more tasks. For example, based on processing the first example prompt data 1214 provided above, the task selection language model 1216 may output model output data: {"1. Identify user pizza preference,"} or the like. For further example, based on processing the second example prompt data 1214 provided above, the task selection language model 1216 may output model output data: {"1. Find an API that sells [Pizza Company Name 1] pizza,"} or the like. In some embodiments, during processing of the task selection language model 1216 to select and/or prioritize the one or more tasks, the task selection language model 1216 may update the task list to remove any redundant and/or conflicting tasks. For example, for the example prompt data 1214, the task selection language model 1216 may determine that the remaining tasks of "find an application that sells pizza" and "find an API that sells [Pizza Company Name 1] pizza" are redundant, and that "find an API that sells [Pizza Company Name 1] pizza has a higher priority. Therefore, the task selection language model 1216 may remove the task of "find an application that sells pizza" from the remaining task list. Thereafter, the task generation component 1106 (or another component of the task generation component 1106) may process the model output data of the task selection language model 1216 to determine task data 1110 representing the user input data 1104 and/or the task selected by the task selection language model 1216 to be completed first. In some embodiments, the task data 1110 may include the remaining one or more tasks and/or may indicate the prioritization of the one or more tasks, as determined by the task selection language model 1216. The task data 1110 may be sent to the LM shortlister component 1108, which is described in detail herein below with respect to FIG. 13.

Figure 13:
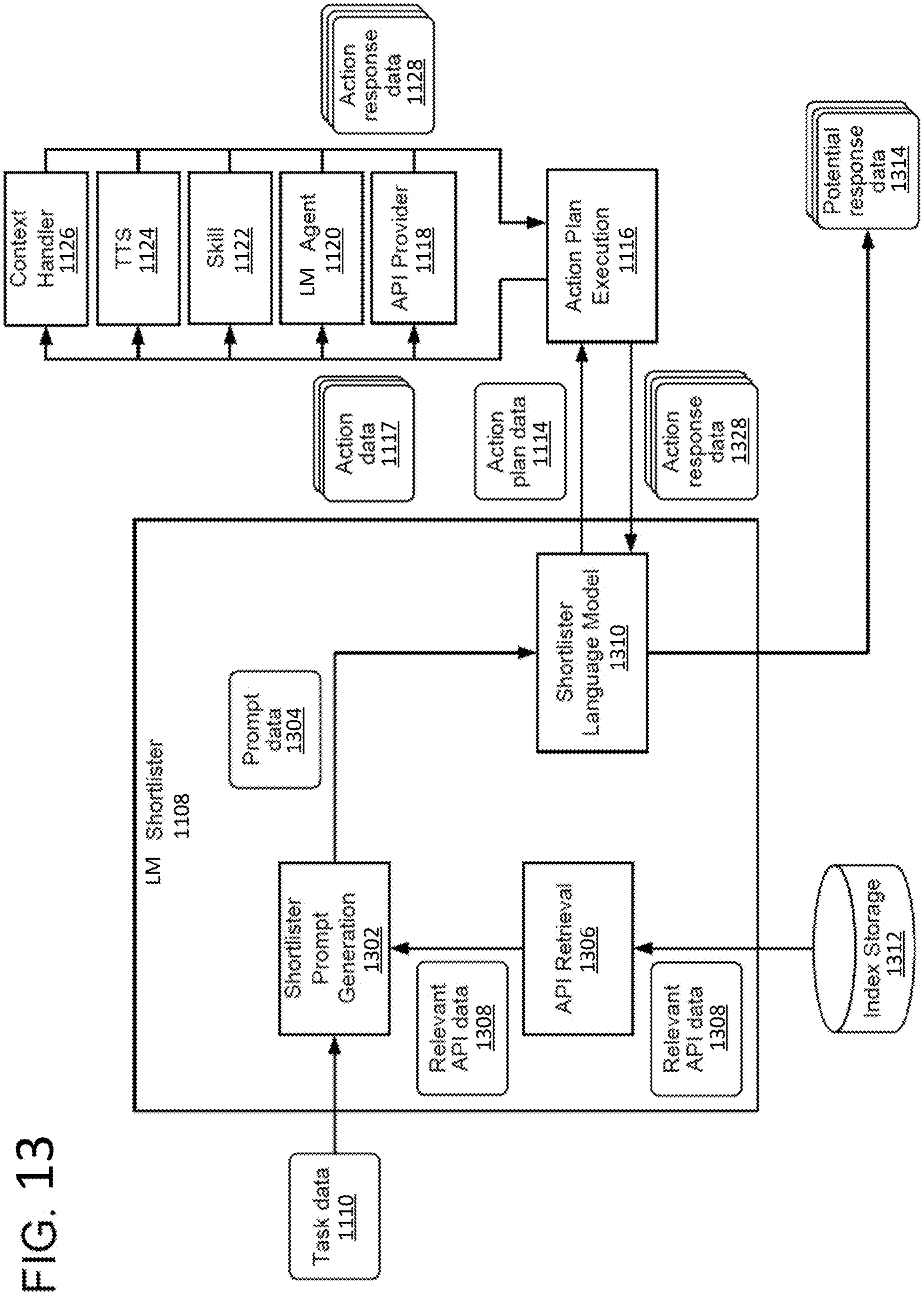
FIG. 13 is a conceptual diagram illustrating example components and processing of a language model LM shortlister component, according to embodiments of the present disclosure.

FIG. 13 illustrates example processing of the LM shortlister component 1108. As shown in FIG. 13, the LM shortlister component 1108 may include an index storage 1312, an API retrieval component 1306, a shortlister prompt generation component 1302, and a shortlister language model 1310.

The LM shortlister component 1108 is configured to determine one or more components (e.g., APIs (via the API provider component 1118, skill component(s) 1122, LM agent component(s) 1120, TTS component 1124, context handler component 1126, etc.) configured to perform an action related to the user input or the current task. The LM shortlister component 1108 is further configured to generate and cause the execution of a request(s) (e.g., an API call(s), an incomplete API call/API call format, an indication of an action to be performed by a component, etc.) for the one or more components to provide a potential response(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task).

As further shown in FIG. 13, the task data 1110 is received at the shortlister prompt generation component 1302. The shortlister prompt generation component 1302 processes the task data 1110 to generate prompt data 1304 representing a prompt for input to the shortlister language model 1310. In some embodiments, such prompt data 1304 may be generated based on combining the task data 1110 (e.g., the user input data 1104, the context data 1202, the selected task, remaining tasks, potential responses associated with one or more previous tasks, etc.) and relevant API data 1308 representing one or more APIs associated with the user input data 1104 and/or the current task.

The relevant API data 1308 may be generated by the API retrieval component 1306, which may be configured to retrieve one or more (e.g., top-k) relevant APIs associated with the user input data 1104 or the current task. In some embodiments, the APIs may correspond to various components. For example, the components may correspond to rule-based components, ML-based components, LM-based components, or the like, such as the orchestrator component 1112, the API provider component 1118, the LM agent component 1120, the skill component 1122, the TTS component 1124, the context handler component 1126, etc.) In some embodiments, the APIs may correspond to the components.

The API retrieval component 1306 may use retrieval-based approaches to retrieve the one or more relevant APIs from the index storage 1312, which may store various information associated with multiple APIs (and/or components) such as component descriptions, API arguments (e.g., parameter inputs/outputs), identifiers for components (e.g., such as the API provider component 1118, the LM agent component 1120, the skill component 1122, the TTS component 1124, the context handler component 1126, etc.) that provides the API, etc. For example, the API retrieval component 1306 may compare one or more APIs (and/or components) included in the index storage 1312 to the user input or the current task to determine one or more APIs (or components) (top-k) that corresponds to the user input or the current task (e.g., APIs (and/or components) that are semantically similar to the user input or the current task, APIs (and/or components) that are capable of performing the current task, etc.). In some embodiments, the API retrieval component 1306 (or another component of the API retrieval component 1306) may determine an encoded representation of the user input or the current task and compare (e.g., using cosine similarity) the encoded representation(s) to an encoded representation of a component description for the API (and/or component) to determine whether the API (and/or component) is semantically similar to the user input or the current task. A component description may correspond to a description of the one or more function that the API (and/or component) is configured to perform and/or other information associated with the API (and/or component) (e.g., an API call formatting structure (e.g., including input parameters), historical accuracy/defect rate, historical latency value, etc.). In some embodiments, the component description may further include one or more exemplars associated with use of the API (and/or component) (e.g., an example user input, corresponding API call, and example API output). If the value of semantic similarity meets or exceeds a threshold, the API (and/or component) (and, optionally, the component description) may be included in the relevant API data 1308. In some embodiments, the API retrieval component 1306 may determine the relevant API data 1308 further using contextual information, including the context data 1202, an accuracy/defect rate value associated with the APIs (and/or components), and/or a historical latency value associated with the APIs (and/or components) (e.g., which may be included in the description of the API). In some embodiments, the index storage 1312 may be included in the API retrieval component 1306. Similar processing may be performed to determine one or more components that are semantically similar to the user input or the current task, which may be included in the relevant API data 1308. The API retrieval may send the relevant API data 1308 to the shortlister prompt generation component 1302.

In some embodiments, the prompt data 1304 may be an instruction for the shortlister language model 1310 to determine one or more APIs (and/or components) that are to process with respect to the user input or the current task (e.g., determine one or more API calls to cause the APIs (and/or components) to process) given the information (e.g., the user input data 1104, the context data 1202, the current task, and the relevant API data 1308). As discussed herein above, in some embodiments the task prompt generation component 1204 may corresponding to the shortlister prompt generation component 1302. As such, in some embodiments, the shortlister prompt generation component 1302 may, in addition to the processing discussed herein below, process similar to the task prompt generation component 1204 (e.g., to generate prompt data for input to an LM configured to generate a request for context data).

For example, for the selected task of "turn on all of the lights except the garage light" and corresponding relevant API data, the shortlister prompt generation component 1302 may generate example prompt data 1304:

{
Find an execute an API to complete the task of turn on all of the lights except the garage light
Here is a list of relevant API available:
Let's chat API
Classic NLU API
Smart Home skill If no appropriate API is found, summarize as nothing is found.

}

For further example, for the selected task of "Identify user pizza preference" (or some other related context retrieval task) and corresponding relevant API data, the shortlister prompt generation component 1302 may generate example prompt data 1304:

{

Find an execute an API to complete the task of identifying the user's pizza preference Here is a list of relevant API available:

Context Handler API

If no appropriate API is found, summarize as nothing is found.

}

As another example, for the subsequently selected task of "find application to order pizza" and corresponding relevant API data, the shortlister prompt generation component 1302 may generate example prompt data 1304:

{

Find and execute an API to complete the task of find application to order pizza

Here is a list of relevant API available:

Let's chat API

[Food Ordering Application 1] API

[Food Ordering Application 2] API

If no appropriate API is found, summarize as nothing is found.

}

In some embodiments, the shortlister prompt generation component 1302 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The shortlister language model 1310 processes the prompt data 1304 to generate one or more API calls corresponding to request(s) that the corresponding APIs (and/or components) return a potential response to the user input/current task and/or a potential action(s) that the APIs (and/or components) are configured to/will perform with respect to the user input and/or the current task (e.g., a natural language description of the potential action(s)). In some embodiments, the shortlister language model 1310 may generate API calls for a subset of the APIs represented in the prompt data 1304. For example, based on processing the first example prompt data provided above, the shortlister language model 1310 may output model output data: {"Use Let's chat API to turn on all of the lights except the garage light, Use Smart Home skill to turn on all of the lights except the garage light"}, {"Letschat ("turn on all of the lights except the garage light"), or the like. For further example, based on processing the second example prompt data provided above, the shortlister language model 1310 may output model output data: {"retrieve context to identify user's pizza preference,"} or the like. As another example, based on processing the third example prompt data provided above, the shortlister language model 1310 may output model output data: {"Use [Food Ordering Application 1] to order pizza, Use [Food Ordering Application 2] to order pizza,"} or the like.

As discussed herein above, in some embodiments, the LM may correspond to the shortlister language model 1310. In such embodiments, the shortlister language model 1310 may, in addition to the processing discussed herein with respect to FIG. 11, process similar to the LM. For example, the shortlister language model 1310 may be configured to generate a request for the context handler component 1126 to retrieve context data relevant to the user input data 1104 and/or one or more of the tasks. For further example, the shortlister language model 1310 may be configured to generate a request for the context handler component 1126 to store context data, such as in response to a corresponding task and/or in response to a request from the response arbitration component 1134.

The shortlister language model 1310 may generate the one or more APIs calls (including the required input parameters) by applying in-context learning for cold-starting API calls (e.g., one-shot/few-shot learning). For example, in embodiments where the relevant API data 1308 includes the component descriptions, the shortlister language model 1310 may use the one or more exemplars included in the component descriptions (included in the prompt data 1304) to determine the one or more input parameters for the API call. In some embodiments, the shortlister language model 1310 may be finetuned on such exemplars (e.g., during offline or runtime processing), such that the shortlister language model 1310 is capable of determining the one or more input parameters for the given API call.

During processing of the shortlister language model 1310 and after generating the one or more requests, the shortlister language model 1310 may cause the one or more requests to be executed. For example, as shown in FIG. 13, the shortlister language model 1310 may send action plan data 1114 representing the one or more requests to the action plan execution component 1116, which causes execution of the one or more requests included in the action plan data 1114. For example, the action plan execution component 1116 may process the action plan data 1114 to generate action data 1117. Action data 1117 may represent, for example, an instruction (e.g., an executable API call determined from/generated based on the action plan data 1114) for a particular API to process with respect to the user input and/or the current task. In embodiments where the action plan data 1114 includes requests corresponding to incomplete API calls, API call formats, indications of actions to be performed by one or more components, the action plan execution component 1116 may be configured to generate executable API calls corresponding to the action plan data 1114. In some embodiments, the action plan execution component 1116 may generate the action data 1117 to represent an instruction to provide the responses including the potential response(s)/potential action(s) with respect to the user input and/or the current task.

In some embodiments, the shortlister language model 1310 may send model output data including the one or more requests to another component of the LM orchestrator component 1112, which may be configured to parse the model output data to identify the one or more requests. Thereafter, the component may generate the action plan data 1114 representing the one or more requests and send the action plan data 1114 to the action plan execution component 1116.

The action plan execution component 1116 may send the action data 1117 to the API provider component 1118, the LM agent component 1120, the skill component 1122, the TTS component 1124, and/or the context handler component 1126. The API provider component may include one or more components (e.g., rule-based components, ML-based components, LM-based components, or the like) that may be caused to process using the action data 1117 (e.g., using the API calls generated by the LM shortlister component 1108).

The TTS component 1124 may be configured to process textual or tokenized input to generate audio data representing synthesized speech corresponding to the textual or tokenized input spoken by a synthetic voice.

The skill component 1122 may be software running on the system component(s) 104 that is akin to a software application. That is, a skill component 1122 may enable the system component(s) 104 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 104 may be configured with more than one skill component 1122. For example, a weather service skill component may enable the system component(s) 104 to provide weather information, a car service skill component may enable the system component(s) 104 to book a trip with respect to a taxi or ride sharing service, a restaurant skill component may enable the system component(s) 104 to order a pizza with respect to the restaurant's online ordering system, etc. A skill component 1122 may operate in conjunction between the system component(s) 104 and other devices, such as the user device 102, in order to complete certain functions. A skill component 1122 may include hardware, software, firmware, or the like that may be dedicated to a particular skill component 1122 or shared among different skill components 1122.

The LM agent component 1120 may correspond to one or more LM agents. An LM agent component 1120 may correspond to a custom instantiation of an LM (and other components) that is configured to handle user inputs relating to a particular domain/functionality. In some embodiments, the LM agent component 1120 may be configured to handle specific use cases via particular prompt generation, fine-tuning of the LM, etc. For example, the LM agent component 1120 may be configured to handle user inputs/tasks related to information query, the LM agent component 1120 may be configured handle user inputs/tasks related to shopping, the LM agent component 1120 may be configured to handle user inputs/tasks related to ordering food from various restaurants, the LM agent component 1120 may be configured to handle user inputs/tasks related to ordering food from a particular restaurant (e.g., a particular pizza restaurant), the LM agent component 1120 may be configured to handle user inputs/tasks related to booking a hotel, the LM agent component 1120 may be configured to handle user inputs/tasks related to booking a flight, etc.

The API provider component 1118 may include various components that may be caused to execute using the action data 1117. For example, the API provider component 1118 may include an entity recognition (ER) component, which may be configured to process textual or tokenized input to link one or more entity references included in the textual or tokenized input to a specific corresponding entity known to the system 1100. For example, based on the textual or tokenized input (e.g., a context of the textual or tokenized input), the ER component may determine that a reference to "Neil Armstrong" is directed to the American astronaut. In some embodiments, the action data 1117 may include an indication(s) (e.g., slots) of one or more entities included in the user input, as determined by one or more of the language models described with respect to FIG. 11, in which case the ER component may process to link the one or more entities to the specific, referenced, entity known to the system 1100.

In other embodiments, the ER component may be configured to process the action data 1117 to determine the one or more entities included in the user input and link the one or more determined entities to the specific, referenced, entity (entities) known to the system 1100. For example, the ER component may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component links a slot of text data to a specific entity known to the system. To perform entity resolution, the ER component may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

For further example, the API provider component 1118 may include a search component, which may be configured to query a storage (e.g., a database, repository, knowledge base, etc.) for information usable for generating a response to a user input. For example, if the action data 1117 represents a request for information of "Who won the game between [Team 1 Name] and [Team 2 Name]," then the search component may query the storage (or other sources, such as the Internet), to retrieve the information "[Team 1 Name] won the game between [Team 1 Name] and [Team 2 Name]."

As an even further example, the API provider component 1118 may include the device controller component discussed herein above, which may be further configured to cause a device to perform an action corresponding to the action data 1117.

In some embodiments, the API provider component 1118 may include a domain service component, which may be configured for interacting with one or more services defined by particular users, such as developers, specialists, or the like (e.g., to receive information, such as responses or annotations, to cause an action.

One or more of abovementioned components may send action response data 1128 representing one or more potential responses generated by the one or more APIs corresponding to the action data 1117 (e.g., the potential response(s) and/or potential action(s)) to the action plan execution component 1116. For example, in response to an API call to the skill component 1122 associated with a user input for turning on a light, the action response data 1128 may correspond to a potential action of "turn on the light," or the like. For further example, in response to an API call to the context handler component 1126 associated with retrieving context for a user input for ordering pizza, the action response data 1128 may correspond to context data representing the user has previously indicated that they prefer Brooklyn style pizza. For further example, in response to an API call to the skill component 1122 associated with a user input for ordering a pizza from a particular restaurant, the action response data 1128 may correspond to a potential action of "order medium pizza from [restaurant name]", or the like. The action plan execution component 1116 may send the action response data 1128 to the shortlister language model 1310.

In some embodiments, the action plan execution component 1116 may send the action response data 1128 to the shortlister prompt generation component 1302, which may generate further prompt data including the action response data 1128 and be sent to the shortlister language model 1310. For example, the further prompt data may be generated based on combining the prompt data 1304 and the action response data 1128.

In some embodiments, the shortlister language model 1310 may process the action response data 1128 (or the further prompt data including action response data 1128) to generate a natural language summary of the action response data (e.g., the potential response data 1130). In some embodiments, the potential response data 1130 may include an association between action response data 1128 (or a summarized representation of the action response data 1128) and an indication of the API/component that generated the action response data 1128 (e.g., a component identifier, component description, etc.). In some embodiments, the shortlister language model 1310 may be configured to filter and/or rank the action response data 1128 based on how relevant the action response data 1128 is to the current task. In some embodiments, the shortlister language model 1310 may be configured to filter and/or rank the action response data 1128 based on a confidence level of the component that provided the action response data, where the confidence level may indicate a likelihood of the component being able to respond (e.g., within a period of time), the component being able to perform a potential action that corresponds to the current task, etc. In some embodiments, the action response data 1128 may indicate whether or not the corresponding component is able to respond (e.g., the action response data 1128 may include a Boolean value such as "yes" or "no" or other similar indications). In some embodiments, the shortlister language model 1310 may filter and/or rank the action response data 1128 based on information included in the prompt data 1304 (e.g., the user input data 1104, the relevant API data 1308, the context data 1202, the prompt data 1206, etc.). For example, the potential response data 1130 may include a subset of the action response data 1128 (or the summarized representations of the action response data 1128) and may further include a representation of a confidence associated with the action response data 1128 (or a summarized representation of the action response data 1128). As such, the potential response data 1130 may further include data representing a confidence of how relevant the action response data 1128 is to the current task. In some embodiments, the shortlister language model 1310 may consider a rating associated with the component that provided the action response data 1128, where the rating may be a user satisfaction rating provided by multiple different users of the system 1100, a user satisfaction rating provided by the user 1102 associated with the user input data 1104, a system generated rating based on the number of past tasks handled by the component, an accuracy rating based on the number of past tasks the component had handled correctly/provided a desired response for, etc.

The LM shortlister component 1108 may send the potential response data 1130 for further processing. In instances where the task generation component 1106 determined that more than one task is to be completed, the LM shortlister component 1108 may send the potential response data 1130 to the task generation component 1106, which may process as described herein above to maintain and prioritize the task list based on the potential response data 1130 and select a new task to be completed. For example, in the instance where the selected task was "identify user's pizza preference," or some other context retrieval task, the shortlister language model 1310 may send potential response data 1314 corresponding to the context data retrieved by the context handler component 1126 to the task generation component 1106, to process.

In instances where the task generation component 1106 determined that only one task is to be completed, or in instances where the LM shortlister component 1108 determines that there are no remaining tasks to be completed, the LM shortlister may send the potential response data 1130, and the potential responses associated with previously completed tasks (e.g., previous action response data) to the response arbitration component 1134 to process as discussed herein above. The LM shortlister component 1108 may further send the user input data 1104, the context data 1202, etc., to the task generation component 1106 and/or the response arbitration component 1134.

As discussed herein above, in some embodiments, the LM orchestrator component 1112 may further include a memory storage which may store various information associated with the processing performed. In addition, or alternative, the memory storage may store any of the additional information discussed herein above that was determined/generated during one or more previous iterations of processing by the LM orchestrator component 1112 for the user input data 1104 (e.g., the user input data 1104, the prompt data 1206, the context data 1202, the model output data 1210, prompt data 1214, the task data 1110, the relevant API data 1308, the prompt data 1304, the action plan data 1114, the action response data 1128, the potential response data 1130, etc.). As such, after the LM shortlister component 1108 generates the potential response data 1130, the LM orchestrator component 1112 may send the abovementioned data to the memory storage. In some embodiments, the above-mentioned data may be sent to the memory storage as it is generated by the system 1100.

In such embodiments, one or more of the prompt generation components discussed herein may be configured to include (e.g., append) one or more portions of the data included in the memory storage in the data (e.g., the generated prompts) to the corresponding language models. For example, during a subsequent iteration of processing, the task prompt generation component 1204 may receive one or more portions of the data included in the memory storage (which were generated during one or more previous iterations of processing performed with respect to the user input data 1104) and include the one or more portions of data in the prompt data 1206.

In some embodiments, the response arbitration component 1134 may be configured to further process data representing a potential response to the user input that is generated by one or more other components of the system 1100 not included in the LM orchestrator component 1112. For example, the response arbitration component 1134 may further receive data from an orchestrator component 1412 (discussed in detail herein below with respect to FIG. 14) representing a potential response to the user input (e.g., the output of the skill component 1122), where the orchestration of the processing performed to generate the potential response was performed by the orchestrator component 1412, rather than the LM orchestrator component 1112. In such embodiments, the response arbitration component 1134 may be further configured to arbitrate between first potential responses received as a result of the processing of the LM orchestrator component 1112 and second potential responses received as a result of the processing of the orchestrator component 1512. As discussed above, the response arbitration component 1134 may select one or more portions (e.g., potential actions, potential responses, etc.) of the first potential responses and/or the second potential responses that are determined to be responsive to the user input and cause output of the one or more portions (or a summarized representation of the one or more portions) and/or performance of the potential actions corresponding to the selected responses.

In some embodiments, the data received from the orchestrator component 1412 may be included in the potential response data 1130. For example, the orchestrator component 1412 may be determined to be configured to perform a function (e.g., cause another component(s) to perform a function) potentially relevant to the user input such that the LM shortlister component 1108 may cause the orchestrator component 1412 to generate potential responses potentially responsive to the user input, which may be included in the potential response data 1130 sent to the response arbitration component 1134.

In some embodiments, the language models of FIGS. 12, and/or 13 may be fine-tuned to perform a particular task(s). Fine-tuning of the language models may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, as discussed above, one or more components of the system 1100 discussed herein above may be configured to begin processing with respect to data as soon as the data or a portion of the data is available to the one or more components. Some components of the system 1100 are generative components/models that can begin processing with respect to portions of data as they are available, instead of waiting to initiate processing after the entirety of data is available. In other words, the system 1100 may be configured to stream portions of data associated with processing with respect to a user input to the one or more components such that the one or more components may begin performing their configured processing with respect to that data as soon as it is available to the one or more components. For example, if the output of the task determination language model 1208, the task selection language model 1216, and/or the shortlister language model 1310 indicates that additional information is needed to complete a first task associated with a user input, a request for the additional information may be sent to the context handler component 1126. Thereafter, the task determination language model 1208, the task selection language model 1216, and/or the shortlister language model 1310 may continue to process to complete their configured operations. For example, while the context handler component 1126 is processing to determine the context data, the system 1100 may begin processing with respect to a second task associated with the user input. Thereafter, the output of the context handler component 1126 may be sent to the response arbitration component 1134 such that once the response arbitration component 1134 receives the output of the LM shortlister component 1108, the response arbitration component 1134 may resolve the ambiguity that resulted in the request for the context data in order to generate the responsive output data 1132. For further example, if the user input data 1104 is generated to include the natural language representation of the user input, but the processing required to determine the corresponding contextual signals (e.g., weather data, time of data, dialog history, device information, etc.) is yet to be completed, the task generation component 1106 may begin processing with respect to the natural language representation of the user input. Once the corresponding contextual signals have been generated, the task generation component 1106 may begin processing with respect to the contextual signals and may update downstream components with the result of the processing with respect to the contextual signals.

As another example, if the task generation component 1106 determines that more than one task is to be completed to perform an action responsive to a user input, and the LM shortlister component 1108 processes as described herein above to cause one or more components to generate potential responses with respect to a first task of the more than one tasks, the LM shortlister component 1108 may send the potential responses (and a representation of the user input and the current task) to the response arbitration component 1134 to process as described herein above with respect to those potential responses while the system 1100 (e.g., the task generation component 1106 and/or the LM shortlister component 1108) completes processing with respect to the remaining tasks of the one or more tasks. Therefore, the response arbitration component 1134 may process as described herein to select between the potential responses associated with the first task while the potential responses associated with one or more of the remaining tasks is completed. As such, the response arbitration component 1134 may only need to arbitrate between the potential responses associated with the first task that were previously selected by the response arbitration component 1134 as being responsive to the first task when the response arbitration component 1134 later processes with respect to further potential responses associated with further tasks.

As a further example, if the API retrieval component 1306 determines (e.g., with a confidence value that meets or exceeds a particular threshold) that a particular API or component description should be included in the relevant API data, the API retrieval component 1306 may provide the corresponding relevant API data to the shortlister prompt generation component 1302 so that the shortlister prompt generation component 1302 may begin processing with respect to the relevant API data while the API retrieval component 1306 continues to determine one or more further relevant API data. In general, the system 1100 is capable of performing such streaming and processing of portions of data discussed herein (e.g., for processing with respect to a user input) and updating downstream components with the results of processing of newly available portions of data as the data becomes available for processing.

Figure 14:
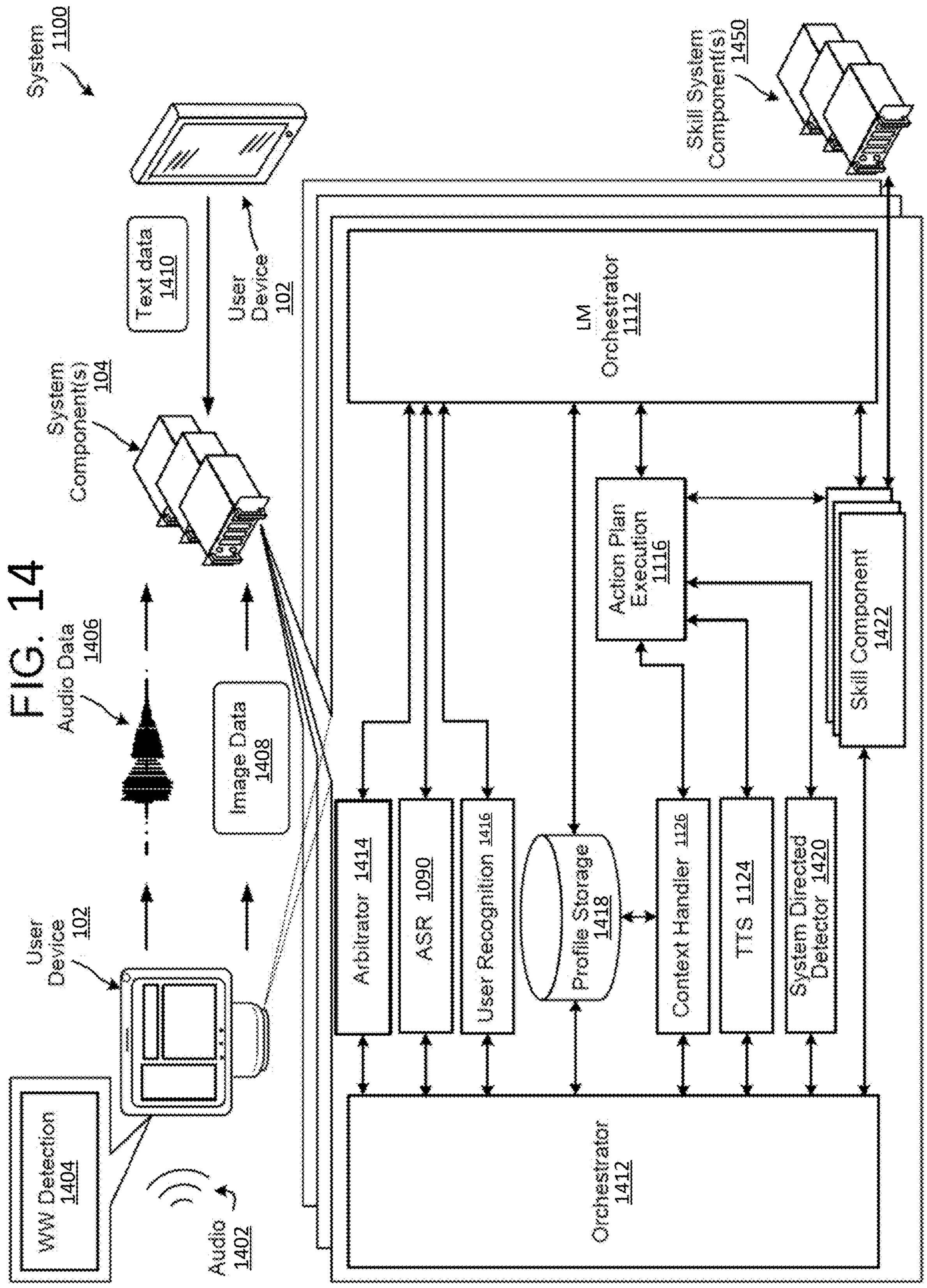
FIG. 14 is a conceptual diagram illustrating example component and processing of a response arbitration component, according to embodiments of the present disclosure.

The system 1100 may operate using various components as described in FIG. 14. The various components may be located on same or different physical devices. Communication between various components may occur directly or across a network(s) 106. The user device 102 may include audio capture component(s), such as a microphone or array of microphones of a user device 102, captures audio 1402 and creates corresponding audio data. Once speech is detected in audio data representing the audio 1402, the user device 102 may determine if the speech is directed at the user device 102/system component(s). In at least some embodiments, such determination may be made using a wakeword detection component 1404. The wakeword detection component 1404 may be configured to detect various wakewords. In at least some examples, each wakeword may correspond to a name of a different digital assistant. An example wakeword/digital assistant name is "Alexa." In another example, input to the system may be in form of text data 1410, for example as a result of a user typing an input into a user interface of user device 102. Other input forms may include indication that the user has pressed a physical or virtual button on user device 102, the user has made a gesture, etc. The user device 102 may also capture images using camera(s) of the user device 102 and may send image data 1408 representing those image(s) to the system component(s). The image data 1408 may include raw image data or image data processed by the user device 102 before sending to the system component(s). The image data 1408 may be used in various manners by different components of the system to perform operations such as determining whether a user is directing an utterance to the system, interpreting a user command, responding to a user command, etc.

The wakeword detection component 1404 of the user device 102 may process the audio data, representing the audio 1402, to determine whether speech is represented therein. The user device 102 may use various techniques to determine whether the audio data includes speech. In some examples, the user device 102 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 102 may implement a classifier configured to distinguish speech from background noise. The classifier may be implemented by techniques such as linear classifiers, support vector machines, and decision trees. In still other examples, the user device 102 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 1402, is analyzed to determine if specific characteristics of the audio data match preconfigured acoustic waveforms, audio signatures, or other data corresponding to a wakeword.

Thus, the wakeword detection component 1404 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1404 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 1404 and/or input is detected by an input detector, the user device 102 may "wake" and begin transmitting audio data 1406, representing the audio 1402, to the system component(s) 104. The audio data 1406 may include data corresponding to the wakeword; in other embodiments, the portion of the audio corresponding to the wakeword is removed by the user device 102 prior to sending the audio data 1406 to the system component(s) 104. In the case of touch input detection or gesture-based input detection, the audio data may not include a wakeword.

In some implementations, the system 1100 may include more than one system component(s). The system component(s) 104 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 1404 may result in sending audio data to system component(s) for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 1422 of one or more system component(s) 104.

The user device 102/system component(s) may also include a system directed input detector 1420. The system directed input detector 1420 may be configured to determine whether an input to the system (for example speech, a gesture, etc.) is directed to the system or not directed to the system (for example directed to another user, etc.). The system directed input detector 1420 may work in conjunction with the wakeword detection component 1404. If the system directed input detector 1420 determines an input is directed to the system, the user device 102 may "wake" and begin sending captured data for further processing. If data is being processed the user device 102 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 1420 determines an input is not directed to the system (such as a speech or gesture directed to another user) the user device 102 may discard the data and take no further action for processing purposes. In this way the system 1100 may prevent processing of data not directed to the system, thus protecting user privacy. As an indicator to the user, however, the system may output an audio, visual, or other indicator when the system directed input detector 1420 is determining whether an input is potentially device directed. For example, the system may output an orange indicator while considering an input, and may output a green indicator if a system directed input is detected. Other such configurations are possible.

Upon receipt by the system component(s) 104, the audio data 1406 may be sent to an orchestrator component 1412 and/or the LM orchestrator component 1112. The orchestrator component 1412 may include memory and logic that enables the orchestrator component 1412 to transmit various pieces and forms of data to various components of the system, as well as perform other operations as described herein. In some embodiments, the orchestrator component 1412 may optionally be included in the system component(s) 104. In embodiments where the orchestrator component 1412 is not included in the system component(s) 104, the audio data 1406 may be sent directly to the LM orchestrator component 1112. Further, in such embodiments, each of the components of the system component(s) 104 may be configured to interact with the LM orchestrator component 1112, the action plan execution component 1116, and/or the API provider component.

In some embodiments, the system component(s) 104 may include an arbitrator component 1414, which may be configured to determine whether the orchestrator component 1412 and/or the LM orchestrator component 1112 are to process with respect to the audio data 1406. In some embodiments, the LM orchestrator component 1112 may be selected to process with respect to the audio data 1406 only if the user 1102 associated with the audio data 1406 (or the user device 102 that captured the audio 1402) has previously indicated that the LM orchestrator component 1112 may be selected to process with respect to user inputs received from the user 1102.

In some embodiments, the arbitrator component 1414 may determine the orchestrator component 1412 and/or the LM orchestrator component 1112 are to process with respect to the audio data 1406 based on metadata associated with the audio data 1406. For example, the arbitrator component 1414 may be a classifier configured to process a natural language representation of the audio data 1406 (e.g., output by the ASR component 1090) and classify the corresponding user input as to be processed by the orchestrator component 1412 and/or the LM orchestrator component 1112. For further example, the arbitrator component 1414 may determine whether the device from which the audio data 1406 is received is associated with an indicator representing the audio data 1406 is to be processed by the orchestrator component 1412 and/or the LM orchestrator component 1112. As an even further example, the arbitrator component 1414 may determine whether the user (e.g., determined using data output from the user recognition component 1416) from which the audio data 1406 is received is associated with a user profile including an indicator representing the audio data 1406 is to be processed by the orchestrator component 1412 and/or the LM orchestrator component 1112. As another example, the arbitrator component 1414 may determine whether the audio data 1406 (or the output of the ASR component 1090) corresponds to a request representing that the audio data 1406 is to be processed by the orchestrator component 1412 and/or the LM orchestrator component 1112 (e.g., a request including "let's chat" may represent that the audio data 1406 is to be processed by the LM orchestrator component 1112).

In some embodiments, if the arbitrator component 1414 is unsure (e.g., a confidence score corresponding to whether the orchestrator component 1412 and/or the LM orchestrator component 1112 is to process is below a threshold), then the arbitrator component 1414 may send the audio data 1406 to both of the orchestrator component 1412 and the LM orchestrator component 1112. In such embodiments, the orchestrator component 1412 and/or the LM orchestrator component 1112 may include further logic for determining further confidence scores during processing representing whether the orchestrator component 1412 and/or the LM orchestrator component 1112 should continue processing, as is discussed further herein below.

The arbitrator component 1414 may send the audio data 1406 to an ASR component 1090. In some embodiments, the component selected to process the audio data 1406 (e.g., the orchestrator component 1412 and/or the LM orchestrator component 1112) may send the audio data 1406 to the ASR component 1090. The ASR component 1090 may transcribe the audio data 1406 into text data. The text data output by the ASR component 1090 represents one or more than one (e.g., in the form of an N-best list) ASR hypotheses representing speech represented in the audio data 1406. The ASR component 1090 interprets the speech in the audio data 1406 based on a similarity between the audio data 1406 and pre-established language models. For example, the ASR component 1090 may compare the audio data 1406 with models for sounds (e.g., acoustic units such as phonemes, senons, phones, etc.) and sequences of sounds to identify words that match the sequence of sounds of the speech represented in the audio data 1406. The ASR component 1090 sends the text data generated thereby to the arbitrator component 1414, the orchestrator component 1412, and/or the LM orchestrator component 1112. In instances where the text data is sent to the arbitrator component 1414, the arbitrator component 1414 may send the text data to the component selected to process the audio data 1406 (e.g., the orchestrator component 1412 and/or the LM orchestrator component 1112). The text data sent from the ASR component 1090 to the arbitrator component 1414, the orchestrator component 1412, and/or the LM orchestrator component 1112 may include a single top-scoring ASR hypothesis or may include an N-best list including multiple top-scoring ASR hypotheses. An N-best list may additionally include a respective score associated with each ASR hypothesis represented therein.

A skill system component(s) 1450 may communicate with a skill component(s) 1422 within the system component(s) 104 directly with the orchestrator component 1412 and/or the action plan execution component 1116, or with other components. A skill system component(s) 1450 may be configured to perform one or more actions. An ability to perform such action(s) may sometimes be referred to as a "skill." That is, a skill may enable a skill system component(s) 1450 to execute specific functionality in order to provide data or perform some other action requested by a user. For example, a weather service skill may enable a skill system component(s) 1450 to provide weather information to the system component(s) 104, a car service skill may enable a skill system component(s) 1450 to book a trip with respect to a taxi or ride sharing service, an order pizza skill may enable a skill system component(s) 1450 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 104 may be configured with a skill component 1422 dedicated to interacting with the skill system component(s) 1450. Unless expressly stated otherwise, reference to a skill, skill device, or skill component may include a skill component 1422 operated by the system component(s) 104 and/or skill operated by the skill system component(s) 1450. Moreover, the functionality described herein as a skill or skill may be referred to using many different terms, such as an action, bot, app, or the like. The skill component 1422 and or skill system component(s) 1450 may return output data to the orchestrator component 1412.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 1124. The TTS component 1124 may generate audio data (e.g., synthesized speech) from text data using one or more different methods. Text data input to the TTS component 1124 may come from a skill component 1422, the orchestrator component 1412, or another component of the system. In one method of synthesis called unit selection, the TTS component 1124 matches text data against a database of recorded speech. The TTS component 1124 selects matching units of recorded speech and concatenates the units together to form audio data. In another method of synthesis called parametric synthesis, the TTS component 1124 varies parameters such as frequency, volume, and noise to create audio data including an artificial speech waveform. Parametric synthesis uses a computerized voice generator, sometimes called a vocoder.

The user device 102 may include still image and/or video capture components such as a camera or cameras to capture one or more images. The user device 102 may include circuitry for digitizing the images and/or video for transmission to the system component(s) 104 as image data. The user device 102 may further include circuitry for voice command-based control of the camera, allowing a user 1102 to request capture of image or video data. The user device 102 may process the commands locally or send audio data 1406 representing the commands to the system component(s) 104 for processing, after which the system component(s) 104 may return output data that can cause the user device 102 to engage its camera.

The system component(s) 104/the user device 102 may include a user recognition component 1416 that recognizes one or more users using a variety of data. However, the disclosure is not limited thereto, and the user device 102 may include the user recognition component 1416 instead of and/or in addition to the system component(s) 104 without departing from the disclosure.

The user recognition component 1416 may take as input the audio data 1406 and/or text data output by the ASR component 1090. The user recognition component 1416 may perform user recognition by comparing audio characteristics in the audio data 1406 to stored audio characteristics of users. The user recognition component 1416 may also perform user recognition by comparing biometric data (e.g., fingerprint data, iris data, etc.), received by the system in correlation with the present user input, to stored biometric data of users assuming user permission and previous authorization. The user recognition component 1416 may further perform user recognition by comparing image data (e.g., including a representation of at least a feature of a user), received by the system in correlation with the present user input, with stored image data including representations of features of different users. The user recognition component 1416 may perform additional user recognition processes, including those known in the art.

The user recognition component 1416 determines scores indicating whether user input originated from a particular user. For example, a first score may indicate a likelihood that the user input originated from a first user, a second score may indicate a likelihood that the user input originated from a second user, etc. The user recognition component 1416 also determines an overall confidence regarding the accuracy of user recognition operations.

Output of the user recognition component 1416 may include a single user identifier corresponding to the most likely user that originated the user input. Alternatively, output of the user recognition component 1416 may include an N-best list of user identifiers with respective scores indicating likelihoods of respective users originating the user input. The output of the user recognition component 1416 may be used to inform processing of the arbitrator component 1414, the orchestrator component 1412, and/or the LM orchestrator component 1112 as well as processing performed by other components of the system.

The system component(s) 104/user device 102 may include a presence detection component that determines the presence and/or location of one or more users using a variety of data.

The system 1100 (either on user device 102, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1418 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 102, the user profile (associated with the presented login information) may be updated to include information about the user device 102, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 1418 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1418 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 14 may be illustrated as part of system component(s) 104, user device 102, or otherwise, the components may be arranged in other device(s) (such as in user device 102 if illustrated in system component(s) 104 or vice-versa, or in other device(s) altogether) without departing from the disclosure.

In at least some embodiments, the system component(s) may receive the audio data 1406 from the user device 102, to recognize speech corresponding to a spoken input in the received audio data 1406, and to perform functions in response to the recognized speech. In at least some embodiments, these functions involve sending directives (e.g., commands), from the system component(s) to the user device 102 (and/or other devices) to cause the user device 102 to perform an action, such as output an audible response to the spoken input via a loudspeaker(s), and/or control secondary devices in the environment by sending a control command to the secondary devices.

Thus, when the user device 102 is able to communicate with the system component(s) over the network(s) 106, some or all of the functions capable of being performed by the system component(s) may be performed by sending one or more directives over the network(s) 106 to the user device 102, which, in turn, may process the directive(s) and perform one or more corresponding actions. For example, the system component(s), using a remote directive that is included in response data (e.g., a remote response), may instruct the user device 102 to output an audible response (e.g., using TTS processing performed by an on-device TTS component) to a user's question via a loudspeaker(s) of (or otherwise associated with) the user device 102, to output content (e.g., music) via the loudspeaker(s) of (or otherwise associated with) the user device 102, to display content on a display of (or otherwise associated with) the user device 102, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 1102 as part of a shopping function, establishing a communication session (e.g., a video call) between the user 1102 and another user, and so on.

In at least some embodiments, a hybrid selector, of the user device 102, may send the audio data 1406 to the wakeword detection component 1404. If the wakeword detection component 1404 detects a wakeword in the audio data 1406, the wakeword detection component 1404 may send an indication of such detection to the hybrid selector. In response to receiving the indication, the hybrid selector may send the audio data 1406 to the system component(s) and/or the ASR component of the user device 102. The wakeword detection component 1404 may also send an indication, to the hybrid selector, representing a wakeword was not detected. In response to receiving such an indication, the hybrid selector may refrain from sending the audio data 1406 to the system component(s), and may prevent the ASR component of the user device 102 from further processing the audio data 1406. In this situation, the audio data 1406 can be discarded.

The user device 102 may conduct its own speech processing using on-device language processing components, such as an ASR component, similar to the manner discussed herein with respect to the ASR component 1090 of the system component(s). The user device 102 may also internally include, or otherwise have access to, other components such as one or more skill components capable of executing commands based on the output of an orchestrator component, an LM orchestrator, or other results determined by the user device 102/system component(s) (which may operate similarly to skill components 1422), an arbitrator component (configured to process in a similar manner to that discussed herein above with respect to the arbitrator component 1414), an action plan execution component (configured to process in a similar manner to that discussed herein with respect to the action plan execution component 1116), a context handler component (configured to process in a similar manner to that discussed herein with respect to the context handler component 1126), a user recognition component (configured to process in a similar manner to that discussed herein with respect to the user recognition component 1416 of the system component(s)), profile storage (configured to store similar profile data to that discussed herein with respect to the profile storage 1418 of the system component(s)), or other components. In at least some embodiments, the profile storage may only store profile data for a user or group of users specifically associated with the user device 102. Similar to as described above with respect to skill component 1422, a skill component of the user device 102 may communicate with a skill system component(s) 1450. The user device 102 may also have its own TTS component, which may operate similarly to TTS component 1124.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 102 attempts to process a natural language user input for which the on-device language processing components are not necessarily best suited, the language processing results determined by the user device 102 may indicate a low confidence or other metric indicating that the processing by the user device 102 may not be as accurate as the processing done by the system component(s).

The hybrid selector, of the user device 102, may include a hybrid proxy (HP) configured to proxy traffic to/from the system component(s). For example, the HP may be configured to send messages to/from a hybrid execution controller (HEC) of the hybrid selector. For example, command/directive data received from the system component(s) can be sent to the HEC using the HP. The HP may also be configured to allow the audio data 1406 to pass to the system component(s) while also receiving (e.g., intercepting) this audio data 1406 and sending the audio data 1406 to the HEC.

In at least some embodiments, the hybrid selector may further include a local request orchestrator (LRO) configured to notify the ASR component of the user device 102 about the availability of new audio data 1406 that represents user speech, and to otherwise initiate the operations of local language processing when new audio data 1406 becomes available. In general, the hybrid selector may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 102 receives directive data from the system component(s) and chooses to use that remotely-determined directive data.

Thus, when the audio data 1406 is received, the HP may allow the audio data 1406 to pass through to the system component(s) and the HP may also input the audio data 1406 to the on-device ASR component by routing the audio data 1406 through the HEC of the hybrid selector, whereby the LRO notifies the on-device ASR component of the audio data 1406. At this point, the hybrid selector may wait for response data from either or both of the system component(s) or the local language processing components. However, the disclosure is not limited thereto, and in some examples the hybrid selector may send the audio data 1406 only to the local ASR component without departing from the disclosure. For example, the user device 102 may process the audio data 1406 locally without sending the audio data 1406 to the system component(s).

The local ASR component is configured to receive the audio data 1406 from the hybrid selector, and to recognize speech in the audio data 1406. The user device 102 and/or the system component(s) may associate a unique identifier with each natural language user input. The user device 102 may include the unique identifier when sending the audio data 1406 to the system component(s), and the response data from the system component(s) may include the unique identifier to identify which natural language user input the response data corresponds.

In at least some embodiments, the user device 102 may include, or be configured to use, one or more skill components that may work similarly to the skill component(s) 1422 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device 102 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 102 may be in communication with one or more skill system component(s) 1450. For example, a skill system component(s) 1450 may be located in a remote environment (e.g., separate location) such that the user device 102 may only communicate with the skill system component(s) 1450 via the network(s) 106. However, the disclosure is not limited thereto. For example, in at least some embodiments, a skill system component(s) 1450 may be configured in a local environment (e.g., home server and/or the like) such that the user device 102 may communicate with the skill system component(s) 1450 via a private network, such as a local area network (LAN).

A skill system component(s) 1450 may communicate with a skill component(s) 922 within the system component(s) 104 directly with the orchestrator component 1412 and/or the action plan execution component 1116, or with other components. A skill system component(s) 1450 may be configured to perform one or more actions. An ability to perform such action(s) may sometimes be referred to as a "skill." That is, a skill may enable a skill system component(s) 1450 to execute specific functionality in order to provide data or perform some other action requested by a user. For example, a weather service skill may enable a skill system component(s) 1450 to provide weather information to the system component(s) 104, a car service skill may enable a skill system component(s) 1450 to book a trip with respect to a taxi or ride sharing service, an order pizza skill may enable a skill system component(s) 1450 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 104 may be configured with a skill component 1122 dedicated to interacting with the skill system component(s) 1450. Unless expressly stated otherwise, reference to a skill, skill device, or skill component may include a skill component 1122 operated by the system component(s) 104 and/or skill operated by the skill system component(s) 1450. Moreover, the functionality described herein as a skill or skill may be referred to using many different terms, such as an action, bot, app, or the like. The skill component 1122 and or skill system component(s) 1450 may return output data to the orchestrator component 1412.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 1124. The TTS component 1124 may generate audio data (e.g., synthesized speech) from text data using one or more different methods. Text data input to the TTS component 1124 may come from a skill component 1122, the orchestrator component 1412, or another component of the system. In one method of synthesis called unit selection, the TTS component 1124 matches text data against a database of recorded speech. The TTS component 1124 selects matching units of recorded speech and concatenates the units together to form audio data. In another method of synthesis called parametric synthesis, the TTS component 1124 varies parameters such as frequency, volume, and noise to create audio data including an artificial speech waveform. Parametric synthesis uses a computerized voice generator, sometimes called a vocoder.

The user device 102 may include still image and/or video capture components such as a camera or cameras to capture one or more images. The user device 102 may include circuitry for digitizing the images and/or video for transmission to the system component(s) 104 as image data. The user device 102 may further include circuitry for voice command-based control of the camera, allowing a user 1102 to request capture of image or video data. The user device 102 may process the commands locally or send audio data 1406 representing the commands to the system component(s) 104 for processing, after which the system component(s) 104 may return output data that can cause the user device 102 to engage its camera.

The system component(s) 104 may include a user recognition component 1416 that recognizes one or more users using a variety of data. The user recognition component 1416 may take as input the audio data 1406 and/or text data output by the ASR component 1090. The user recognition component 1416 may perform user recognition by comparing audio characteristics in the audio data 1406 to stored audio characteristics of users. The user recognition component 1416 may also perform user recognition by comparing biometric data (e.g., fingerprint data, iris data, etc.), received by the system in correlation with the present user input, to stored biometric data of users assuming user permission and previous authorization. The user recognition component 1416 may further perform user recognition by comparing image data (e.g., including a representation of at least a feature of a user), received by the system in correlation with the present user input, with stored image data including representations of features of different users. The user recognition component 1416 may perform additional user recognition processes, including those known in the art.

The user recognition component 1416 determines scores indicating whether user input originated from a particular user. For example, a first score may indicate a likelihood that the user input originated from a first user, a second score may indicate a likelihood that the user input originated from a second user, etc. The user recognition component 1416 also determines an overall confidence regarding the accuracy of user recognition operations.

Output of the user recognition component 1416 may include a single user identifier corresponding to the most likely user that originated the user input. Alternatively, output of the user recognition component 1416 may include an N-best list of user identifiers with respective scores indicating likelihoods of respective users originating the user input. The output of the user recognition component 1416 may be used to inform processing of the arbitrator component 1414, the orchestrator component 1412, and/or the LM orchestrator component 1112 as well as processing performed by other components of the system.

The system component(s) 104/user device 102 may include a presence detection component that determines the presence and/or location of one or more users using a variety of data.

The system 1100 (either on user device 102, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1418 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 102, the user profile (associated with the presented login information) may be updated to include information about the user device 102, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 1418 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1418 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 14 may be illustrated as part of system component(s) 104, user device 102, or otherwise, the components may be arranged in other device(s) (such as in user device 102 if illustrated in system component(s) 104 or vice-versa, or in other device(s) altogether) without departing from the disclosure.

In at least some embodiments, the system component(s) may receive the audio data 1406 from the user device 102, to recognize speech corresponding to a spoken input in the received audio data 1406, and to perform functions in response to the recognized speech. In at least some embodiments, these functions involve sending directives (e.g., commands), from the system component(s) to the user device 102 (and/or other user devices) to cause the user device 102 to perform an action, such as output an audible response to the spoken input via a loudspeaker(s), and/or control secondary devices in the environment by sending a control command to the secondary devices.

Thus, when the user device 102 is able to communicate with the system component(s) over the network(s) 106, some or all of the functions capable of being performed by the system component(s) may be performed by sending one or more directives over the network(s) 106 to the user device 102, which, in turn, may process the directive(s) and perform one or more corresponding actions. For example, the system component(s), using a remote directive that is included in response data (e.g., a remote response), may instruct the user device 102 to output an audible response (e.g., using TTS processing performed by an on-device TTS component) to a user's question via a loudspeaker(s) of (or otherwise associated with) the user device 102, to output content (e.g., music) via the loudspeaker(s) of (or otherwise associated with) the user device 102, to display content on a display of (or otherwise associated with) the user device 102, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 1102 as part of a shopping function, establishing a communication session (e.g., a video call) between the user 1102 and another user, and so on.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 15:
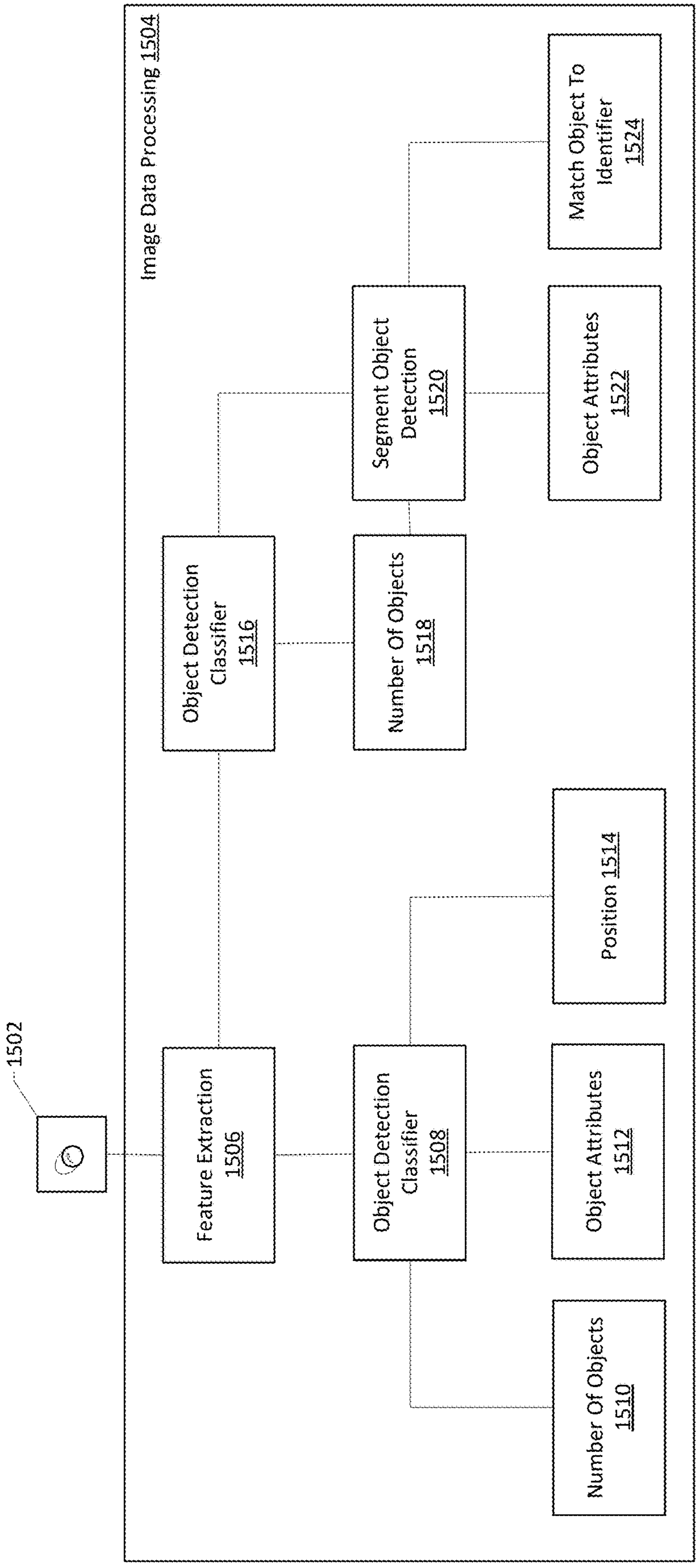
FIG. 15 is a schematic diagram of a process for detecting objects in image data.

FIG. 15 is a schematic diagram of an example process for detecting objects in image data. The processes described with respect to FIG. 15 may be performed by the LMs described herein. For example, a camera apparatus 1502 acquires image data for processing using image data processing 1504. In some instances, the image data processing 1504 can be performed by the camera apparatus 1502. In some instances, the image data processing 1504 can be performed by other components. For instance, a system can receive the image data from the camera apparatus 1502, and then perform the image data processing 1504.

To process the image data, the image data processing 1504 can use one or more image processing techniques (e.g., facial recognition, object recognition, etc.) to extract features 1506 from the image data. In some instances, the features can include objects (e.g., guests, robots, etc.) and faces. For instance, the image data processing 1504 can identify each object and face that is within the image data.

For objects, the image data processing 1504 may include an object detection classifier 1508 in order to detect a number of objects 1510 in a field of view, attributes 1512 (e.g., characteristics) associated with each of the objects, and a position 1514 for each of the objects. For instance, the number of objects 1510 can include how many objects are in the field of view. The attributes 1512 associated with each object can include a height of the object, hair color of the object, an approximate weight of the object (e.g., 150 pounds), a body type for the object (e.g., slim, etc.), clothes that the object is wearing, facial recognition of the object, or the like, object shapes, object colors, object thicknesses, etc.

For faces, the image data processing 1504 can apply an object detection classifier 1516 in order to detect a number of objects 1518 (e.g., faces). Additionally, for each face, the image data processing 1504 can perform segment object detection 1520 in order to determine attributes 1522 (e.g., characteristics) for each of the faces at the environment and detect an identifier 1524 for each of the objects (e.g., faces) at the environment.

Attributes 1522 for each face can include a relative size, a color, a shape of the face, or the like. An identifier 1524 for a face can include any type of identity, such as a user profile identifier.

When image data is described herein as being analyzed, that analysis may include the use of computer vision to identify objects depicted in the image data. For example, with respect to computer vision techniques, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification) —One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR) —Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT) —Differentiating human beings (e.g., head and shoulder patterns) from objects.

Some functions and components (e.g., hardware) found in many computer vision systems are described here. For example, a digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales. Image features at various levels of complexity are extracted from the image data. Typical examples of such features are: Lines, edges, and ridges; Localized interest points such as corners, blobs, or points; More complex features may be related to texture, shape, or motion. At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions; estimation of application-specific parameters, such as object pose or object size; classifying a detected object into different categories; and comparing and combining two different views of the same object. Making the final decision required for the application, for example match/no-match in recognition applications, may then be performed.

Figure 16:
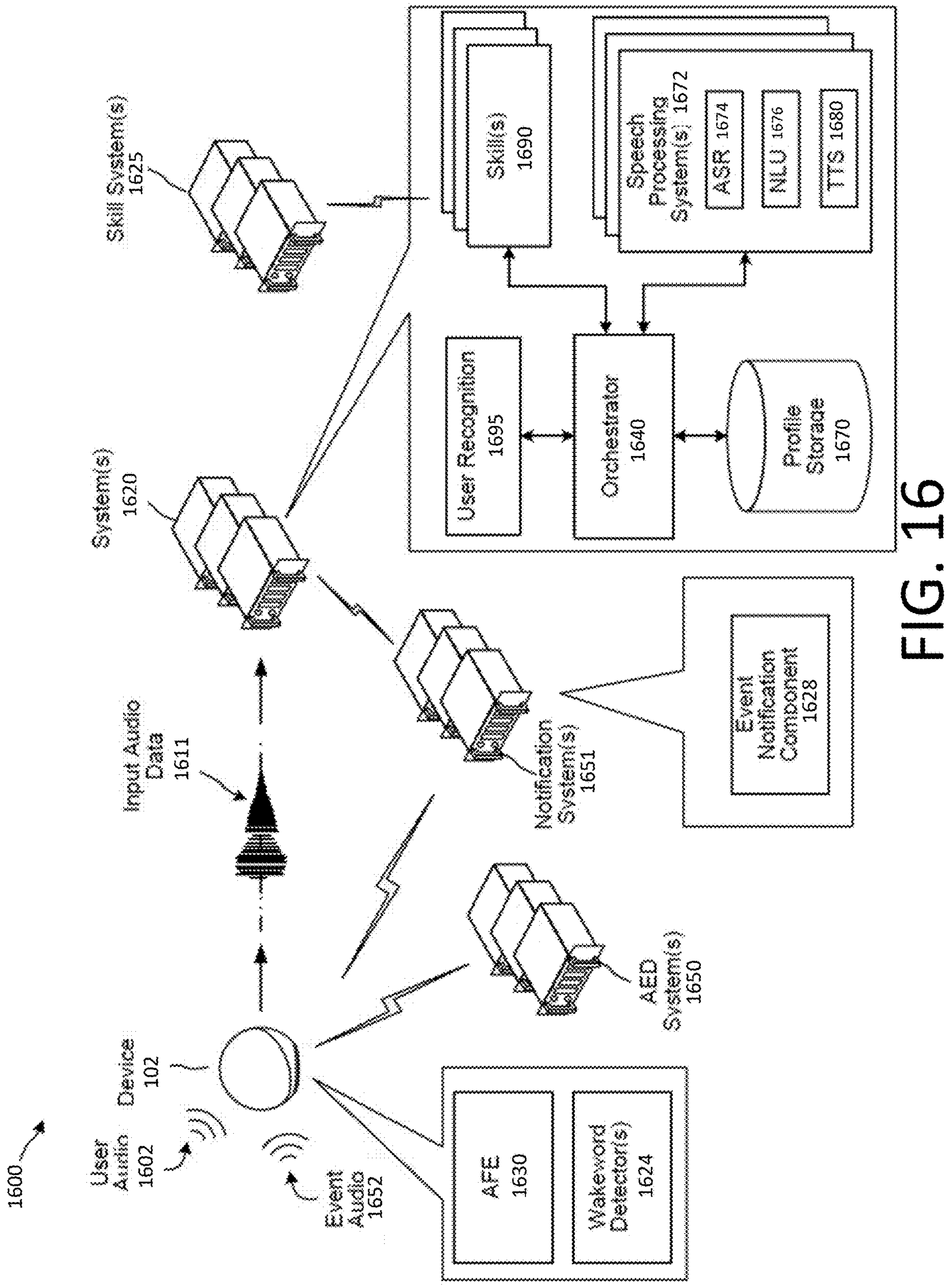
FIG. 16 is conceptual diagram illustrating a system configured for detecting an acoustic event and a system for speech processing.

FIG. 16 is conceptual diagram illustrating a system configured for detecting an acoustic event and a system for speech processing. The processes described with respect to FIG. 15 may be performed by the LMs described herein. The system 1600 may operate using various components as described in FIG. 16. The various components may be located on the same or different physical devices. For example, as shown in FIG. 16, some components may be disposed on a device 102, while other components may be disposed on a system(s) 1620; however, some or all of the components may be disposed on the device 102. Communication between various components may thus occur directly (via, e.g., a bus connection) or across the network(s) described herein.

An audio capture component(s), such as a microphone or array of microphones of the device 102, captures input audio, such as the event audio 1652 and/or user audio 1602 (e.g., speech/spoken inputs from a user(s)) and creates corresponding input audio data 1611.

The device 102 may include an acoustic front end (AFE) component 1630. The AFE component 1630 may be configured to process the audio data 1611 and determine acoustic feature data. The AFE component 1630 may process the audio data 1611 using a number of techniques, such as determining frequency-domain representations of the audio data 1611 by using a transform such as a Fast Fourier transform (FFT) and/or determining a Mel-cepstrum corresponding to the audio data 1611.

In some embodiments, the device 102 may include one AFE component 1630 that may process the audio data 1611 to generate the acoustic feature data to be used by the AED models described herein, and another AFE component 1630 that may process the audio data 1611 to generate acoustic feature data to be used by a wakeword detector 1624. In other embodiments, the AFE component 1630 may generate acoustic feature data that may be used by the AED models and the wakeword detector 1624.

Upon receipt by the system(s) 1620 and/or upon determination by the device 102, the input audio data 1611 may be sent to an orchestrator component 1640. The orchestrator component 1640 may include memory and logic that enables it to transmit various pieces and forms of data to various components of the system, as well as perform other operations as described herein. The orchestrator component 1640 may be or include a speech-processing system manager and/or one or more of the speech-processing systems 1620, which may be used to determine which, if any, of the ASR component 1674, NLU component 1676, and/or TTS component 1680 should receive and/or process the audio data 1611. In some embodiments, the orchestrator component 1640 includes one or more ASR components 1674, NLU components 1676, TTS components 1680, and/or other processing components, and processes the input audio data 1611 before sending it and/or other data to one or more speech-processing components for further processing.

In some embodiments, the orchestrator 1640 and/or speech-processing system manager communicate with the speech-processing systems using an application programming interface (API). The API may be used to send and/or receive data, commands, or other information to and/or from the speech-processing systems. For example, the orchestrator 1640 may send, via the API, the input audio data 1611 to a speech-processing systems elected by the speech-processing system manager and may receive, from the selected speech-processing system, a command and/or data responsive to the audio data 1611.

If NLU results data includes a single NLU hypothesis, the NLU component 1676 may send the NLU results data to the skill component(s) 1690 associated with the NLU hypothesis. If the NLU results data includes an N-best list of NLU hypotheses, the NLU component 1676 may send the top scoring NLU hypothesis to a skill component(s) 1690 associated with the top scoring NLU hypothesis. As described above, the NLU component 1676 and/or skill component 1690 may determine, using the interaction score, text data representing an indication of a handoff from one speech-processing system to another.

A skill system(s) 1625 may communicate with a skill component(s) 1690 within the system(s) 1620 directly and/or via the orchestrator component 1640. A skill system(s) 1625 may be configured to perform one or more actions. A skill may enable a skill system(s) 1625 to execute specific functionality in order to provide data or perform some other action requested by a user.

The system(s) 1620 may include a user-recognition component 1695 that recognizes one or more users associated with data input to the system(s) 1620. The user-recognition component 1695 may take as input the audio data 1611 and/or ASR data output by the ASR component 1674. The user-recognition component 1695 may perform user recognition by comparing audio characteristics in the input audio data 1611 to stored audio characteristics of users. The user-recognition component 1695 may also perform user recognition by comparing biometric data (e.g., fingerprint data, iris data, etc.), received by the system in correlation with the present user input, to stored biometric data of users. The user-recognition component 1695 may further perform user recognition by comparing image data (e.g., including a representation of at least a feature of a user), received by the system in correlation with the present user input, with stored image data including representations of features of different users. The user-recognition component 1695 may perform additional user recognition processes, including those known in the art.

The system(s) 1620 may also include profile storage 1670. The profile storage 1670 may include a variety of information related to individual users, groups of users, devices, etc. that interact with the system. The profile storage may be the same or similar to the user registry 124 described with respect to FIG. 1.

The profile storage 1670 may include one or more user profiles, with each user profile being associated with a different user identifier. Each user profile may include various user identifying information. Each user profile may also include preferences of the user and/or one or more device identifiers, representing one or more devices of the user. When a user logs into to an application installed on a device 102, the user profile (associated with the presented login information) may be updated to include information about the device 102. As described, the profile storage 1670 may further include data that shows an interaction history of a user, including commands and times of commands.

The system 1600 may include one or more notification system(s) 1651 which may include an event notification component 1628. Although illustrated as a separate system, notification system(s) 1651 may be configured within system(s) 1620, device 102, or otherwise depending on system configuration. For example, event notification component 1628 may be configured within system(s) 1620, device 102, or otherwise. The event notification component 1628 may handle sending notifications/commands to other devices upon the occurrence of a detected acoustic event. The event notification component 1628 may have access to information/instructions (for example as associated with profile storage 1670 or otherwise) that indicate what device(s) are to be notified upon detection of an acoustic event, the preferences associated with those notifications or other information. The event notification component 1628 may have access to information/instructions (for example as associated with profile storage 1670 or otherwise) that indicate what device(s) are to perform what actions in response to detection of an acoustic event (for example locking a door, turning on/off lights, notifying emergency services, or the like.

Figure 17:
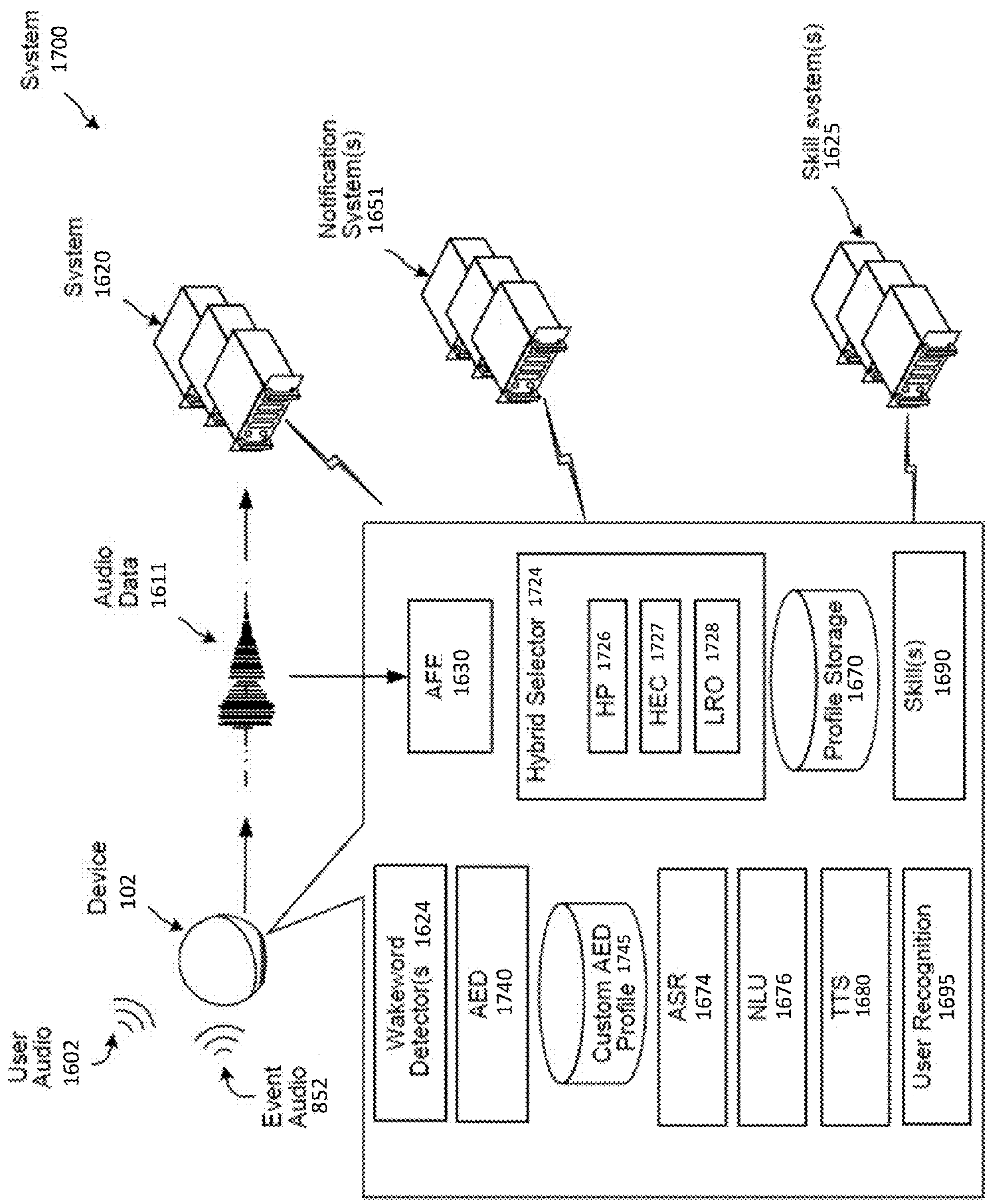
FIG. 17 is a conceptual diagram illustrating components that may be included in a device for AED customization.

The foregoing describes illustrative components and processing of the system(s) 1620. The following describes illustrative components and processing of the device 102. As illustrated in FIG. 17, in at least some embodiments the system(s) 1620 may receive audio data 1611 from the device 102, to recognize speech corresponding to a spoken natural language in the received audio data 1611, and to perform functions in response to the recognized speech. In at least some embodiments, these functions involve sending directives (e.g., commands), from the system(s) 1620 to the device 102 to cause the device 102 to perform an action, such as output synthesized speech (responsive to the spoken natural language input) via a loudspeaker(s), and/or control one or more secondary devices by sending control commands to the one or more secondary devices. The processes described with respect to FIG. 17 may be performed by the LMs described herein.

Thus, when the device 102 is able to communicate with the system(s) 1620 over the network(s) described herein, some or all of the functions capable of being performed by the system(s) 1620 may be performed by sending one or more directives over the network(s) to the device 102, which, in turn, may process the directive(s) and perform one or more corresponding actions. For example, the system(s) 1620, using a remote directive that is included in response data (e.g., a remote response), may instruct the device 102 to output synthesized speech via a loudspeaker(s) of (or otherwise associated with) the device 102, to output content (e.g., music) via the loudspeaker(s) of (or otherwise associated with) the device 102, to display content on a display of (or otherwise associated with) the device 102, and/or to send a directive to a secondary device (e.g., a directive to turn on a smart light). It will be appreciated that the system(s) 1620 may be configured to provide other functions in addition to those discussed herein, such as, without limitation, providing step-by-step directions for navigating from an origin location to a destination location, conducting an electronic commerce transaction on behalf of a user as part of a shopping function, establishing a communication session (e.g., an audio or video call) between the user and another user, and so on.

The AFE components 1630 may receive audio data from a microphone or microphone array; this audio data may be a digital representation of an analog audio signal and may be sampled at, for example, 256 kHz. The AED component 1740 may instead or in addition receive acoustic feature data, which may include one or more LFBE and/or MFCC vectors, from the AFE component 1630 as described above. The AFE component 1630 for the AED component 1740 may differ from the AFE component 1630 for the wakeword detector 1624 at least because the AED component 1740 may require a context window greater in size that that of the wakeword detector 1624. For example, the wakeword acoustic-feature data may correspond to one second of audio data, while the AED acoustic-feature data may correspond to ten seconds of audio data.

The wakeword detector(s) 1624 may process the audio data 1611 as described above, and may be configured to detect a wakeword (e.g., "Alexa") that indicates to the device 102 that the audio data 1611 is to be processed for determining NLU output data. In at least some embodiments, a hybrid selector 1724, of the device 102, may send the audio data 1611 to the wakeword detector(s) 1624. If the wakeword detector(s) 1624 detects a wakeword in the audio data 1611, the wakeword detector(s) 1624 may send an indication of such detection to the hybrid selector 1724. In response to receiving the indication, the hybrid selector 1724 may send the audio data 1611 to the system(s) 1620 and/or an on-device ASR component 1674. The wakeword detector(s) 1624 may also send an indication, to the hybrid selector 1724, representing a wakeword was not detected. In response to receiving such an indication, the hybrid selector 1724 may refrain from sending the audio data 1611 to the system(s) 1620, and may prevent the on-device ASR component 1674 from processing the audio data 1611. In this situation, the audio data 1611 can be discarded.

The device 102 may conduct its own speech processing using on-device language processing components (such as an on-device SLU component, an on-device ASR component 1674, and/or an on-device NLU component 1676) similar to the manner discussed above with respect to the speech processing system-implemented ASR component 1674, and NLU component 1676. The device 102 may also internally include, or otherwise have access to, other components such as one or more skills 1690, a user recognition component 1695, profile storage 1670, a TTS component 1680 and other components. In at least some embodiments, the on-device profile storage 1670 may only store profile data for a user or group of users specifically associated with the device 102. Additionally, the device 102 may include an AED component 1740 and a custom AED profile storage 1745.

In at least some embodiments, the on-device language processing components may not have the same capabilities as the language processing components implemented by the system(s) 1620. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system(s) 1620. If the device 102 attempts to process a natural language input for which the on-device language processing components are not necessarily best suited, the NLU output data, determined by the on-device components, may have a low confidence or other metric indicating that the processing by the on-device language processing components may not be as accurate as the processing done by the system(s) 1620.

The hybrid selector 1724, of the device 102, may include a hybrid proxy (HP) 1726 configured to proxy traffic to/from the system(s) 1620. For example, the HP 1726 may be configured to send messages to/from a hybrid execution controller (HEC) 1727 of the hybrid selector 1724. For example, command/directive data received from the system(s) 1620 can be sent to the HEC 1727 using the HP 1726. The HP 1726 may also be configured to allow the audio data 1611 to pass to the system(s) 1620 while also receiving (e.g., intercepting) this audio data 1611 and sending the audio data 1611 to the HEC 1727.

In at least some embodiments, the hybrid selector 1724 may further include a local request orchestrator (LRO) 1728 configured to notify the on-device ASR component 1674 about the availability of the audio data 1611, and to otherwise initiate the operations of on-device language processing when the audio data 1611 becomes available. In general, the hybrid selector 1724 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 102 receives directive data from the system(s) 1620 and chooses to use that remotely-determined directive data.

Thus, when the audio data 1611 is received, the HP 1726 may allow the audio data 1611 to pass through to the system(s) 1620 and the HP 1726 may also input the audio data 1611 to the on-device ASR component 1674 by routing the audio data 1611 through the HEC 1727 of the hybrid selector 1724, whereby the LRO 1728 notifies the on-device ASR component 1674 of the audio data 1611. At this point, the hybrid selector 1724 may wait for response data from either or both the system(s) 1620 and/or the on-device language processing components. However, the disclosure is not limited thereto, and in some examples the hybrid selector 1724 may send the audio data 1611 only to the on-device ASR component 1674 without departing from the disclosure. For example, the device 102 may process the audio data 1611 on-device without sending the audio data 1611 to the system(s) 1620.

Figure 18:
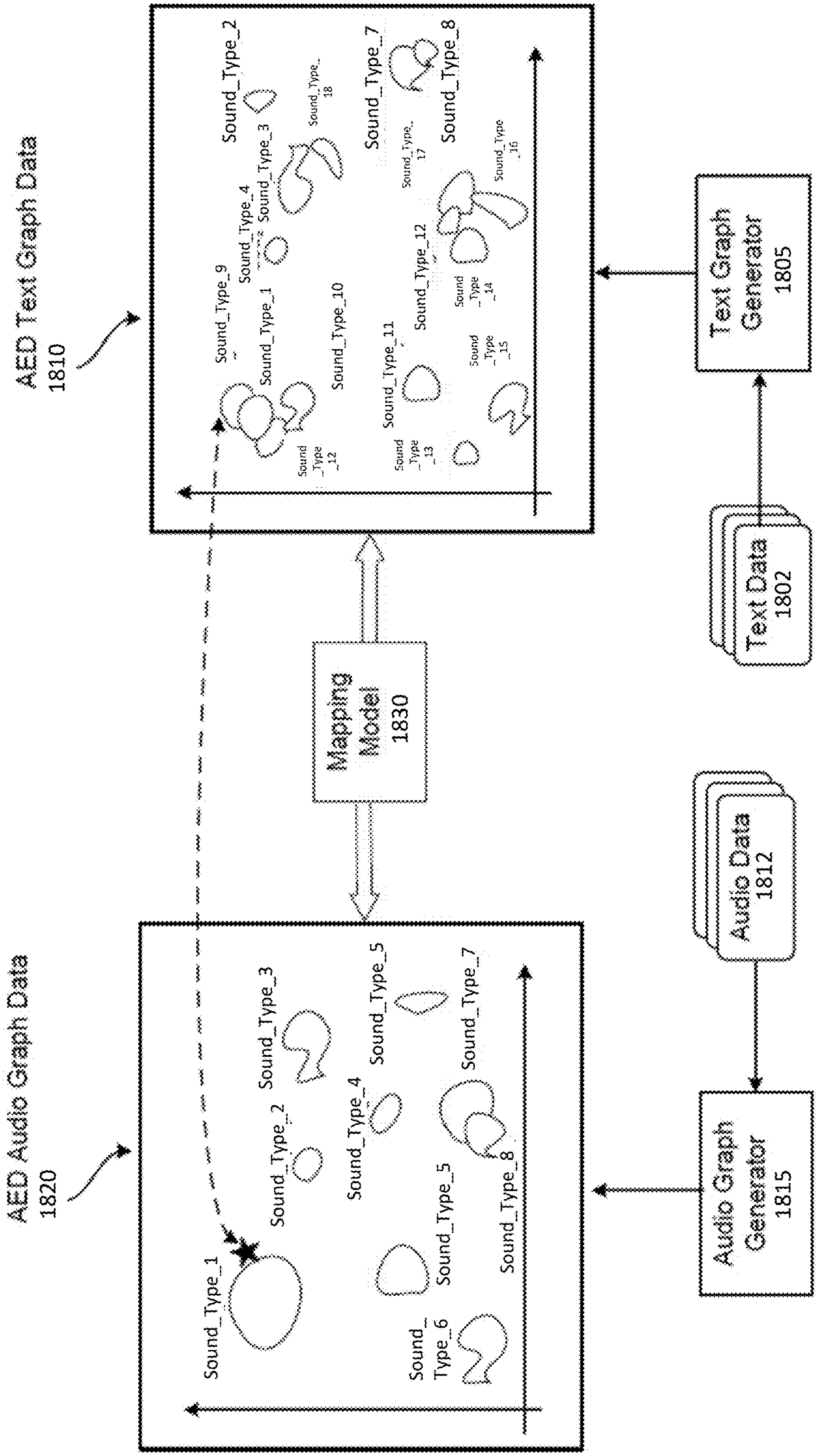
FIG. 18 is a conceptual diagram illustrating audio graph data, text graph data, and how a correspondence between audio and text descriptions are generated.

FIG. 18 illustrates how graph data, that may be stored at AED knowledge storage, may be generated. A text graph generator 1805 may generate AED text graph data 1810 by processing text data 1802. The AED text graph data 1810 may represent relationships between various natural language descriptions for acoustic events based on the semantic meanings of the natural language descriptions. An audio graph generator 1815 may generate AED audio graph data 1820 by processing audio data 1812. The AED audio graph data 1820 may represent relationships between various audio data based on similarities in their corresponding acoustic features. The system may further include a mapping model 1030 to generate mappings between the text data represented in the AED text graph data 1810 and the audio data represented in the AED audio graph data 1820. The processes described with respect to FIG. 18 may be performed by the LMs described herein.

As described herein, one graph, AED text graph data 1810, may integrate and represent relationships between natural language descriptions, which may be based on text embeddings or word embeddings. The AED text graph data 1810 may be generated using text data 1802. The text data 1802 may be determined from public sources, such as the Internet, and/or more inputs provided by various users. In some embodiments, the text data 1802 relates to acoustic events, and may not describe non-acoustic events. For example, the text data 1802 may represent various sound types (e.g., 1-18) which may correspond to “dog barking”, “fridge door alarm”, “cat meow”, etc. In other embodiments, the text data 1802 may encompass various descriptions or words, and a text graph generator 1805 may process the text data 1802 to determine a subset of text data relating to acoustic events only. The text graph generator 1805 may use part-of-speech (POS) tagging, named entity recognition (NER), and/or other techniques to determine text data relating to acoustic events. The text data 1802 may also refer to token data, sub-words, etc.

In some embodiments, an example set of text relating to acoustic events may be used to determine further text data 1802 relating to acoustic events from public sources. For example, starting with the example text “speech”, the system may identify a public website that describes “speech”, and then use POS tagging and/or NER based methods to extract words/entities related to “speech” from the website. For example, text such as “human vocal communication”, “language”, “lexicon of a language”, “vocalization”, etc. may be extracted from the website. The system may use one or more gating mechanisms that select the text that have high semantic similarities with the example text. In this manner, acoustic event-specific text data is extracted from public sources to maximize the richness of the text, evaluated by the text graph generator 1805, while not including many irrelevant texts. The text graph generator 1805 may use the determined words/entities as new nodes for the AED text graph data 1810 when they are determined to be acoustic event relevant. The text corpus, for the AED text graph data 1810, may be expanded by following related web pages, NER of existing text data/web pages, etc. as one acoustic event description can lead to discovery of multiple others during the search of relevant text data on the Internet.

Additionally, in some embodiments, user inputs may be used to contribute to the text corpus used to generate the AED text graph data 1810. For example, a user may provide natural language descriptions of various different acoustic events through spoken inputs, using a companion application of the AED system(s) 1650, etc. Such user inputs may be anonymized and may not be associated with a user identifier, a device identifier, or other identifying information. Additionally, in some embodiments, user inputs provided when configuring the AED system(s) 1650 to detect custom acoustic events may be used to generate the AED text graph data 1810.

The determined AED-specific text corpus (e.g., the text data 1802) may be used to fine-tune one or more generic text embedding models such that the structural relationships of different acoustic events are preserved. The fine-tuned text embedding model may then be used to encode the determined text data 1802 into semantic representations, which may be vector data with a fixed dimension. The encoded text data may be used to build the vertices of the AED text graph data 1810, which may reflect the high-level relationship between different acoustic events. In some embodiments, a vertex between acoustic event A and acoustic event B is determined to be valid by measuring the distance between the vector data/semantic representations of A and B (e.g., Euclidean distance of the two vectors) against a condition (e.g., a dynamic threshold) for similarity measure.

The text graph generator 1805 may determine text embeddings for a natural language description for an acoustic event. In some embodiments, a word2vec technique may be used (that generates a 300 dimensional vector representation), and when the natural language description includes multiple words, an average of the vectors for the individual words may be used as the text embedding for the description. In other embodiments, the text graph generator 1805 may employ a universal sentence encoder (e.g., that generates a 512 dimensional vector). In yet other embodiments, the text graph generator 1805 may employ a tokenizer to identify words that are nouns, verbs or adjectives from the text corpus, and select words with high cosine similarities with respect to the corresponding labels using their vector representations. Then the average of the vector representations of the selected words weighted by their occurrences in the text corpus. This POS tagging-based word selection method makes the text embedding invariant to the order of concatenation of texts from various sources or multiple web pages. The text embeddings may be referred to as word embeddings, in some cases, and may correspond to sub-words, token data, etc.

In some embodiments, the audio data 1812 relates to acoustic events and may have natural language descriptions that are included in the text data 1802. The mapping model 1830 is trained using labeled mappings between a portion of the audio data 1812 and a portion of the text data 1802. Not all of the descriptions represented in the text data 1802 may have corresponding audio data, and not all of the audio data 1812 may have a corresponding description. The mapping model 1830 may process the AED text graph data 1810 and the AED audio graph data 1820 to determine bi-linear mappings between text embeddings that do not have a mapping to an audio embedding.

In some embodiments, the audio embeddings may be extracted from log mel spectrogram features of the audio data 1812. In some embodiments, the mapping model 1830 may use a dense layer (e.g., a 527-unit dense layer) with a sigmoid activation along with an audio encoder may be used to extract audio embeddings corresponding to the audio data 1812. The mapping model 1830 may be configured using a two-view alignment loss between text embeddings and audio embeddings as a regularizer to the supervised loss. In some embodiments, cosine similarity may be enforced for the multi-view alignment. In other embodiments, linear canonical correlation analysis loss may be used. An example overall loss equation is shown below, where a hyper-parameter a to adjust the relative importance of the supervised cross-entropy loss $L_{sup}$ and the embedding alignment loss $L_{cons}$:

$$L = E_i\left\{L_{sup}(\hat{y}_i, y_i) + \alpha\frac{1_{r\in Eve(i)}L_{cons}(E_i, Me_i^r)}{\sum_r 1_{\in Eve(i)}}\right\} \tag{1}$$

$$L_{sup} = y_i^T \cdot \log(\hat{y}_i) + (1 - y_i^T) \cdot \log(1 - \hat{y}_i) \tag{2}$$

$$L_{cons} = \frac{E_i \cdot Me_i^r}{\|E_i\| \cdot \|Me_i^r\|} \tag{3}$$

In equation (1) above, Eve(i) is the set of events present in audio i. The label description is $y_i$, the predicted description is $\hat{y}_i$, the audio embedding is $E_i$ and the text embedding is $e_i$. M is a matrix used to map the text embeddings into the same shape/space as the audio embeddings, which is shared across all the acoustic events. In equation (1) one acoustic event (amongst all events present in the label) is chosen at random (denoted as r in equations (1) and (3)) and use its text embeddings to calculate $L_{cons}$. As the number of epochs becomes sufficiently large, the stochastic implementation approximately converges to equation (1). The supervised loss $L_{sup}$ is updated regularly with all events present in each sample.

After the mapping model 1830 is trained, it may be used to process audio data 1812 that does not have a bi-linear mapping. At inference time, the mapping model 1830 may process first audio data 1812 to determine first text data 1802 that represents a natural language description of the first audio data 1812. The bi-linear mappings between the audio data 1812 and the text data 1802 may be stored at the AED knowledge graph storage. In some embodiments, the bi-linear mappings may be stored as data representing an association/correspondence between an audio embedding and a text embedding.

The stored bi-linear mappings can then be used to determine audio data corresponding to a user-provided natural language description for a custom acoustic event. That is, the AED system(s) 1650 may determine a natural language description (e.g., as provided by the user or a refined version of the user-provided description), determine a text embedding corresponding to the natural language description, and determine a first node in the AED text graph data 1810 that is semantically similar to the text embedding. Using the bi-linear mappings, the AED system(s) 1650 may determine a second node in the AED audio graph data 1820 that is associated with the first node in the AED text graph data 1810, and may use the audio data/audio embedding (e.g., the audio data 1812) corresponding to the second node as a potential sample of the custom acoustic event described by the user.

When a user-provided natural language description is determined to be a novel node that is not already represented in the AED text graph data 1810 (e.g. a user says "Alexa, I want to build a custom sound detector for my puppy dog whimper,"), the system determines an estimated degree of the node to determine how to insert the novel node into the AED text graph data 1810. For example, "animal" may be a 'super-category' with the highest degree, "dog sound" and "cat sound" may be its 'sub-categories' that branch into multiple children nodes, and "dog bark" and "cat hiss" may be 'leaf nodes' which do not have children nodes. When a super-category is discovered, then some clusters may be broken up into smaller sub-graphs in order to fit in a new concept. On the other hand, when a leaf node is discovered, it is appended to end of an appropriate branch.

The AED text graph data 1810 can be used to provide reference semantics in a "text view" to support various audio tasks when limited or no audio samples are available. For example, concept clusters can be built in both audio and text views. As text data is more readily available (from public sources), the concept clusters may be denser and more accurate in the text view than in the audio view. Using existing audio and text pairs, the mapping model 1830 may be trained to determine a bi-linear mapping between the two views. Therefore, when expanding to a new acoustic event, the text representation and the learned bi-linear mapping can be used to estimate its audio representation. For acoustic events that share common "low-level" acoustic features, for example, "cat sound" and "dog sound" are both produced through the same biological pathway (i.e. lung→vocal fold→oral cavity→lips) and their sounds share similar sound production mechanism, the mapping model 1830 can generalize well in generating the bi-linear mappings.

In some cases, the AED text graph data 1810 can be used for making manual annotations for custom acoustic events more efficient. Because the AED text graph data 1810 has a top-down structure, where a sub-graph or cluster embodies the concept of a "super-category" and the leaf nodes represent the more fine-grained description to summarize the target acoustic event, this can be leveraged this to help the manual annotators make faster decisions. With the AED text graph data 1810 and the bi-linear map, a few plausible annotation paths can be predicted to assist the annotators to find the best descriptions for acoustic events present in an audio clip. Given a pair of audio embedding and text description, the system can propose top N paths for plausible events based on the likelihoods in a top-down order (super-category→sub-category→leaf node). For example, if an audio contains "dog cry", the system may propose the following few paths:

- animal sound→domestic pets→dog sound→dog bark→dog cry→puppy dog cry;
- animal sound→domestic pets→dog sound→dog bark→dog whimper→multiple dog whimper→multiple dog whimper and bark;
- animal sound→domestic pets→cat sound→cat meow→cat meow and hiss.

The AED text graph data 1810 may be updated based on user inputs provided by multiple users. For example, the AED text graph data 1810 may be updated to include natural language descriptions provided by the user that are not already represented in the AED text graph data 1810. The AED audio graph data 1820 may be updated based on event audio (e.g. the event audio) that occurred in multiple user environments. For example, the AED audio graph data 1820 may be updated to include audio embeddings that are not already represented in the AED audio graph data 1820. The updated AED graph data may be used to process subsequently received user inputs requesting configuration of custom acoustic event detection. For example, a first user may provide a natural language description for a sound made by a particular brand of appliance, and the AED system(s) 1650 may capture event audio representing the sound made by the particular brand of appliance. The natural language description and the event audio may be integrated in the respective AED graph data 1810, 1820, so that when a second user requests detection of the sound made by the particular brand of appliance, the AED system(s) 1650 can retrieve audio embedding data corresponding to the previously received event audio, and use the audio embedding data to detect occurrence of the sound made by the particular brand of appliance in the second user's environment.

Figure 19:
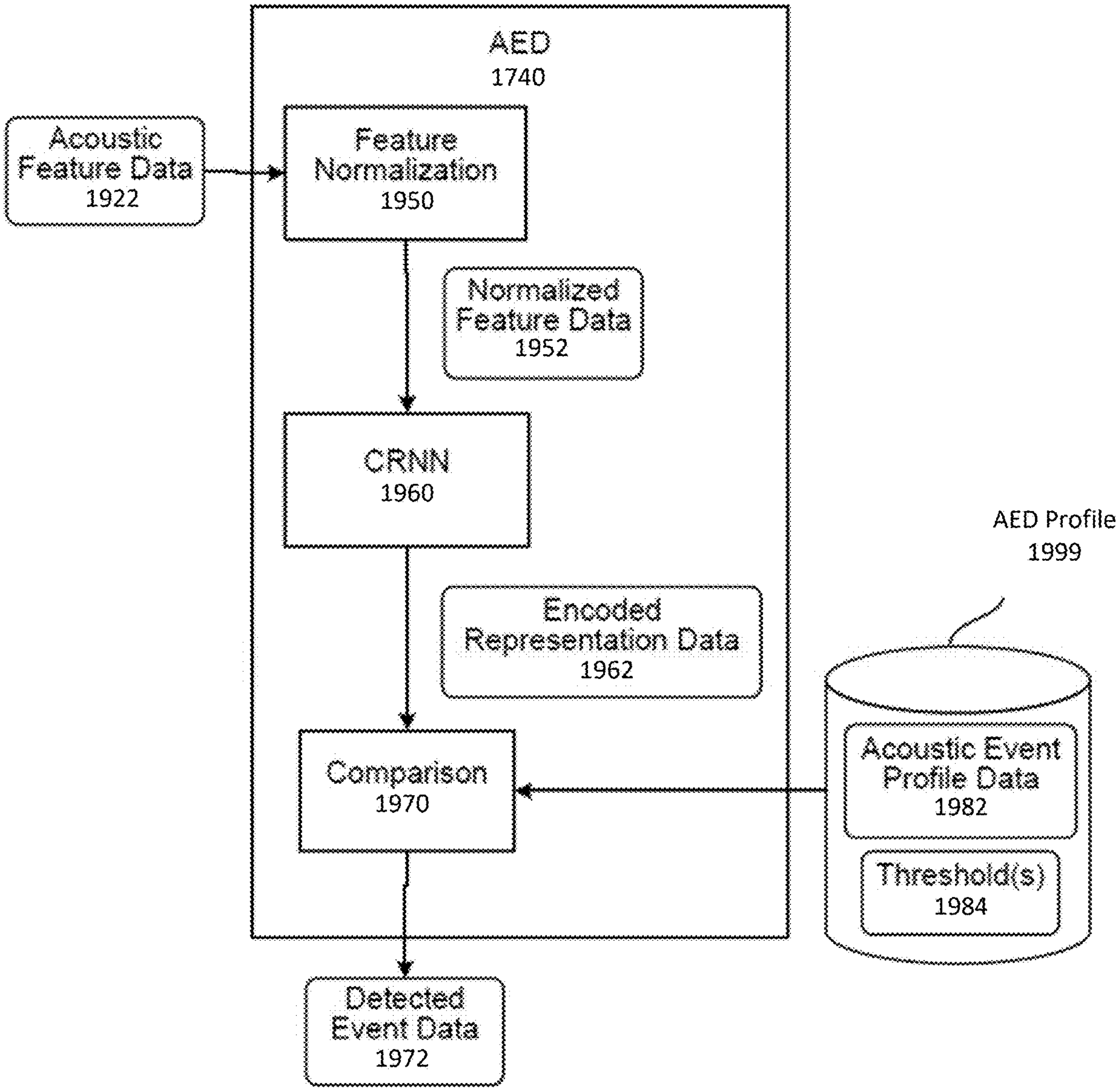
FIG. 19 is a conceptual diagram illustrating components of an AED component as utilized herein.

FIG. 19 illustrates components of the AED component 1740. As shown, the AED component 1740 may include a feature normalization component 1950, a CRNN 1960, and a comparison component 1970. These components may be configured to detect custom acoustic events defined by the user of the devices 102. The processes described with respect to FIG. 19 may be performed by the LMs described herein.

The feature normalization component 1950 may process the acoustic feature data 1922 and may determine normalized feature data 1952. The feature normalization component 1950 may process the acoustic feature data 1922, and may perform some normalization techniques. Different environments (e.g., homes, offices, buildings, etc.) have different background noises and may also generate event audio at different levels, intensities, etc. The feature normalization component 1950 may process the acoustic feature data 1922 to remove, filter, or otherwise reduce the effect, of any environmental differences that may be captured by the device 102 in the event audio, on the processing performed by the CRNN 1960 and the comparison component 1970. The feature normalization component 1950 may use a normalization matrix derived by performing statistical analysis on audio samples corresponding to a wide range of acoustic events.

The CRNN 1960 may be an encoder that generates encoded representation data 1962 using the normalized feature data 1952. The CRNN 1960 may include one or more convolutional layers followed by one or more recurrent layer(s) that may process the normalized feature data 1952 to determine one or more probabilities that the audio data includes one or more representations of one or more acoustic events. The CRNN 1960 may include a number of nodes arranged in one or more layers. Each node may be a computational unit that has one or more weighted input connections, a transfer function that combines the inputs in some way, and an output connection. The CRNN 1960 may include one or more recurrent nodes, such as LSTM nodes, or other recurrent nodes, such as gated rectified unit (GRU) noes. For example, the CRNN 1960 may include 128 LSTM nodes; each LSTM node may receive one feature vector of the acoustic feature data during each frame. For next frames, the CRNN 1960 may receive different sets of 128 feature vectors (which may have one or more feature vectors in common with previously-received sets of feature vectors—e.g., the sets may overlap). The CRNN 1960 may periodically reset every, for example, 10 seconds. The CRNN 1960 may be reset when a time of running the model (e.g., a span of time spent processing audio data) is greater than a threshold time. Resetting of the CRNN 1960 may ensure that the CRNN 1960 does not deviate from the state to which it had been trained. Resetting the CRNN 1960 may include reading values for nodes of the model—e.g., weights—from a computer memory and writing the values to the recurrent layer(s).

The CRNN 1960 may be trained using ML techniques and training data. The training data, for the CRNN 1960, may include audio samples of a wide variety of acoustic events (e.g., sounds from different types/brands of appliances, sounds of different types of pets, etc.). The training data may further include annotation data indicating which acoustic events are of interest and which acoustic events are not of interest. The CRNN 1960 may be trained by processing the training data, evaluating the accuracy of its response against the annotation data, and updating the recurrent layer(s) via, for example, gradient descent. The CRNN 1960 may be deemed trained when it is able to predict occurrence of acoustic events of interest in non-training data within a required accuracy.

The CRNN 1960 may be configured to generate encoded representation data that can be used to detect a wider range of acoustic events, so that the CRNN 1960 can be used to detect any custom acoustic event taught by the user.

The CRNN 1960 may thus receive the acoustic-feature data and, based thereon, determine an AED probability, which may be one or more numbers indicating a likelihood that the acoustic-feature data represents the acoustic event. The AED probability may be, for example, a number that ranges from 0.0 to 1.0, wherein 0.0 represents a 0% likelihood that the acoustic-feature data represents the acoustic event, 1.0 represents a 100% likelihood that the acoustic-feature data represents the acoustic event, and numbers between 0.0 and 1.0 represent varying degrees of likelihood that the acoustic-feature data represents the acoustic event. A value of 0.75, for example, may correspond to 75% confidence in the acoustic-feature data including a representation of the acoustic event. The AED probability may further include a confidence value over time and may indicate at which times in the acoustic-feature data that the acoustic event is more or less likely to be represented.

A number of activation function components—one for each acoustic event—may be used to apply an activation function to the probability of occurrence of that event output by the recurrent layer(s). The activation function may transform the probability data such that probabilities near 50% are increased or decreased based on how far away from 50% they lie; probabilities closer to 0% or 100% may be affected less or even not at all. The activation function thus provides a mechanism to transform a broad spectrum of probabilities—which may be evenly distributed between 0% and 100%—into a binary distribution of probabilities, in which most probabilities lie closer to either 0% or 100%, which may aid classification of the probabilities as to either indicating an acoustic event or not indicating an acoustic event by an event classifier. In some embodiments, the activation function is a sigmoid function.

In some embodiments, the CRNN 1960 may be configured to convert a higher dimensional feature vector (the normalized feature data 1952) to a lower dimensional feature vector (the encoded representation data 1962). The CRNN 1960 may process multiple frames of acoustic feature data 1922, represented in the normalized feature data 1952, corresponding to an acoustic event and may ultimately output a single N-dimensional vector that uniquely identifies the event. That is, a first N-dimensional vector is first encoded representation data that represents a first predetermined acoustic event, a second N-dimensional vector is second encoded representation data that represents a second predetermined acoustic event, and so on. The N-dimensional vectors may correspond to points in an N-dimensional space known as an embedding space or feature space; in this space, data points that represent similar-sounding events are disposed closer to each other, while data points that represent different-sounding events are disposed further from each other. The CRNN 1960 may be configured by processing training data representing a variety of events; if the CRNN 1960 processes two items of audio data from two events known to be different, but maps them to similar points in the embedding space, the CRNN 1960 is re-trained so that it maps the training data from the different events to different points in the embedding space. Similarly, if the CRNN 1960 processes two items of audio data from two events known to be similar, but maps them to different points in the embedding space, the CRNN 1960 is re-trained so that it maps the training data from the similar events to similar points in the embedding space.

The comparison component 1970 may be configured to process the encoded representation data 1962 with respect to one or more acoustic event profile data 1982 using a corresponding threshold 1984. As described herein, the custom AED profile storage 1999 may store the acoustic event profile data 1982 and the corresponding threshold 1984 based on the user configuring the AED system(s) 1650 to identify a custom acoustic event. Each of the acoustic event profile data 1982 may be acoustic feature data corresponding to a single individual custom acoustic event. For example, first acoustic event profile data 1982*a* may correspond to a custom doorbell sound, second acoustic event profile data 1982*b* may correspond to a particular breed dog bark, etc. Each of the thresholds 1984 may be a threshold value of similarity, and may correspond to a single individual custom acoustic event. For example, a first threshold 1984*a* may be a first threshold value corresponding to the first acoustic event profile data 1982*a*, a second threshold 1984*b* may be a second threshold value corresponding to the second acoustic event profile data 1982*b*, etc.

The comparison component 1970 may process the encoded representation data 1962 with respect to each of the acoustic event profile data 1982, and may determine how similar the encoded representation data 1962 is to the acoustic event profile data 1982. The comparison component 1970 may determine such similarity using various techniques, for example, using a cosine similarity, using a number of overlapping data points within a feature space, using a distance between data points within a feature space, etc. The comparison component 1970 may determine that the encoded representation data 1962 corresponds to the custom acoustic event represented in the acoustic event profile data 1982 when the similarity satisfies the corresponding threshold 1984. The similarity may be represented as one or more numerical values or a vector of values, and the threshold 1984 may be represented as single numerical value. In some embodiments, the average of the similarity values may exceed/satisfy the threshold 1984 for the comparison component 1970 to determine that the corresponding custom acoustic event occurred. As described herein, the encoded representation data 1962 is a vector and the acoustic event profile data 1982 is a vector, and in some embodiments, if each of the values of the encoded representation data 1962 (e.g., each of the values of the N-vector) are within the threshold 1984 of each of the corresponding values of the acoustic event profile data 1982, the comparison component 1970 may determine that the corresponding custom acoustic event occurred.

The comparison component 1970 may evaluate the encoded representation data 1962 with respect to each of the acoustic event profile data 1982, and may determine, in some cases, that more than one custom acoustic event is represented in the event audio. For example, the comparison component 1970 may process the encoded representation data 1962 with respect to the first acoustic event profile data 1982*a* to determine first similarity data that satisfies the first threshold 1984*a*, and may process (in parallel) the encoded representation data 1962 with respect to the second acoustic event profile data 1982*b* to determine second similarity data that satisfies the second threshold 1984*b*, and may then determine, based on both of the first and second thresholds 1984 being satisfied, that the first and second custom acoustic events occurred.

The AED component 1740 may output detected event data 1972 representing one or more custom acoustic events occurred based on processing the event audio. The detected event data 1972 may be an indication (e.g., a label, an event identifier, etc.) of the custom acoustic event represented in the event audio. For example, the detected event data 1972 may be data indicating that a dog barking event occurred. In some cases, the event audio may represent more than one event occurrence, and the detected event data 1972 may indicate that more than one of the custom acoustic events occurred. For example, the detected event data 1972 may be data indicating that a dog barking event and a fridge door alarm event occurred. If the event audio does not correspond to any of the custom acoustic events, then the detected event data 1972 may be null, may indicate "other" or the like.

In some embodiments, the detected event data 1972 may correspond to a portion of the event audio, for example, a set of audio frames that are processed by the AED component 1740. The AED system(s) 1650 may include an event detection component that may aggregate the results (e.g., detected event data) of the AED component 1740 processing sets of audio frames of the event audio data corresponding to the event audio. The event detection component may perform further processing on the aggregated results/detected event data to determine an acoustic event represented in the event audio. Such further processing may involve normalizing, smoothing, and/or filtering of the results/detected event data.

In some embodiments, the AED component 1740 may determine the detected event data 1972 in a number of different ways. If multiple samples of the custom acoustic event is used/stored in the acoustic event profile data 1982, the AED component 1740 may encode each sample to a different point in the embedding space. The different points may define an N-dimensional shape; the comparison component 1970 may deem that the encoded representation data 1962 defines a point within the shape, or within a threshold distance of a surface of the shape, and thus, indicates occurrence of the corresponding custom acoustic event. In other embodiments, the AED component 1740 may determine a single point that represents the various points determined from the various samples of the custom acoustic event. For example, the single point may represent the average of each of the values corresponding to the samples. The single point may further represent the center of the shape defined by the points.

The comparison component 1970 may output the detected event data 1972 indicating which, if any, of the custom acoustic events (indicated in the custom AED profile storage 1999) occurred based on processing of the event audio. The detected event data 1972 may include one or more labels or indicators (e.g., Boolean values such as 0/1, yes/no, true/false, etc.) indicating whether and which of the custom acoustic events occurred. In some embodiments, each of the acoustic event profile data 1982 may be associated with an event identifier (e.g., a numerical identifier or a text identifier), and the detected event data 1972 may include the event identifier along with the label/indicator.

The AED component 1740 may output an indication of detection of a custom acoustic event as the detected event data 1972. Such detected event data 1972 may include an identifier of the custom acoustic event, a score corresponding to the likelihood of the custom acoustic event occurring, or other related data. Such detected event data 1972 may then be sent, over the network(s), to a downstream component, for example notification system(s) 1651/event notification component 1628 or another device.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A device, comprising:

one or more processors; and non-transitory computer-readable media storing computer-executable instructions that, when executed by the one or more processors, cause the one or more processors to perform operations comprising:

receiving first user input data representing a first user command to store occurrence of a visual event, the visual event associated with an activity physically performed by a user in association with an object other than the device;

generating, utilizing the first user input data, an activity indicator describing the visual event from the first user command;

storing the activity indicator in an activity catalog disposed on the device as one of multiple activity indicators;

receiving image data representing images in a field of view of a camera to the device, wherein the image data is received in response to motion being detected;

generating, utilizing the activity indicator stored in the activity catalog, a first query requesting that a language model (LM) identify the activity in association with the object and the user from the image data, wherein the LM is disposed on the device and is configured to determine results utilizing the image data as the input;

determining, at the device utilizing the LM and the first query, that the image data depicts the activity being performed in association with the object and the user;

storing first data indicating occurrence of the visual event in response to the activity being performed in association with the object and the user;

receiving second user input data representing a natural language request associated with stored visual events;

determining, utilizing the second user input data, that the natural language request is associated with the visual event; and generating, utilizing the LM, a first natural language response to the second user input data, wherein generating the first natural language response is in response to the visual event being one of the visual events from the first data.

2. The device of claim 1, the operations further comprising:

determining, utilizing the LM, a description of an image data frame received at the device;

storing, at the device, data representing the description of the image data frame;

receiving third user input data requesting determination of whether a particular visual event has occurred, the particular visual event differing from the multiple activity indicators;

generating a second query requesting that the LM determine whether the particular visual event occurred;

determining, utilizing the LM and in response to the second query, that the description is associated with the particular visual event; and generating a second natural language response to the third user input data, wherein generating the second natural language response is in response to determining that the description is associated with the particular visual event.

3. The device of claim 1, the operations further comprising:

determining account data associated with the device;

determining a routine associated with the account data, the routine indicating an action to be performed upon occurrence of an additional activity;

generating one of the multiple activity indicators utilizing the additional activity from the routine; and wherein the LM selects the activity being performed from the multiple activity indicators.

4. The device of claim 1, the operations further comprising:

receiving third user input data requesting a summary of occurrences of the visual event over a period of time;

determining, utilizing the LM, additional occurrences of the activity from additional image data received over the period of time;

storing visual event identifiers of the activity on the device over the period of time; and generating, utilizing the LM and the visual event identifiers, the summary of the occurrences of the visual event over the period of time.

5. A method, comprising:

receiving first user input data representing a first user command to store an activity indictor representing an occurrence of a visual event, the visual event associated with an activity in an environment;

storing an activity indicator in a device;

generating, utilizing the activity indicator stored in the device, a first query requesting that a language model (LM) identify the activity from image data, wherein the LM is disposed on the device and is configured to determine results utilizing the image data as the input;

determining, at the device utilizing the LM and the first query, that the image data depicts the activity;

storing first data indicating occurrence of the visual event based at least in part on the LM determining that the image data depicts the activity;

receiving second user input data representing a natural language request associated with stored visual events;

determining, utilizing the LM and based at least in part on the second user input data, that the natural language request is associated with the visual event; and generating a first natural language response to the second user input data indicating that the visual event has been detected, wherein generating the first natural language response is based at least in part on the first data indicating occurrence of the visual event.

6. The method of claim 5, further comprising:

determining, utilizing the LM, a description of an image data frame received at the device;

receiving third user input data requesting determination of whether an additional visual event has occurred, the additional visual event differing from the activity indicator;

determining, utilizing the LM and based at least in part on the third user input data, that the description is associated with the additional visual event; and generating a second natural language response indicating occurrence of the additional visual event based at least in part on determining that the description is associated with the additional visual event.

7. The method of claim 5, further comprising:

determining a routine associated with the device, the routine indicating an action to be performed upon occurrence of an additional activity; and generating an additional activity indicator based at least in part on the routine.

8. The method of claim 5, further comprising:

receiving third user input data requesting a summary of occurrences of the visual event over a period of time;

determining, utilizing the LM, additional occurrences of the activity from additional image data received over the period of time;

storing visual event identifiers of the activity on the device over the period of time; and generating, utilizing the LM and the visual event identifiers, the summary of the occurrences of the visual event over the period of time.

9. The method of claim 5, further comprising:

determining a keyframe representing the image data;

inputting the keyframe into the LM;

receiving, from the LM, a description of the keyframe;

storing the description of the keyframe on the device;

querying at least one of the LM or another LM disposed on the device to determine, from the description of the keyframe, whether the image data depicts the activity; and wherein determining that the image data depicts the activity comprises determining that the image data depicts the activity based at least in part on the description of the keyframe.

10. The method of claim 5, further comprising:

determining to store the first data including the image data and an indication that the activity was detected for a first period of time based at least in part on the visual event being detected;

receiving additional image data; and determining to store the additional image data for a second period of time based at least in part on the additional image data being unassociated with one or more activity indicators stored on the device, the second period of time being less than the first period of time.

11. The method of claim 5, further comprising:

determining that the first user input data indicates an object associated with the activity and a user associated with the activity;

determining, utilizing the LM, that the activity determined from the image data is performed in association with the object and the user; and wherein generating the first natural language response comprises generating the first natural language response based at least in part on the activity being performed in association with the object and the user.

12. The method of claim 5, further comprising:

determining, from the image data, a subset of frames of the image data to be analyzed by the LM at the device, the subset of frames determined based at least in part on pixel differences detected as between consecutive frames of the image data;

inputting the subset of frames into the LM along with the first query, wherein the first query prompts the LM to determine whether the activity is determined from individual frames of the subset of frames; and receiving, from the LM, an identification of which of the individual frames are associated with the activity.

13. A system, comprising:

one or more processors; and non-transitory computer-readable media storing computer-executable instructions that, when executed by the one or more processors, cause the one or more processors to perform operations comprising:

receiving first user input data representing a first user command to store an activity indictor representing an occurrence of a visual event, the visual event associated with an activity in an environment;

storing an activity indicator in a device;

generating, utilizing the activity indicator stored in the device, a first query requesting that a language model (LM) identify the activity from image data, wherein the LM is disposed on the device and is configured to determine results utilizing the image data as the input;

determining, at the device utilizing the LM and the first query, that the image data depicts the activity;

storing first data indicating occurrence of the visual event based at least in part on the LM determining that the image data depicts the activity;

receiving second user input data representing a natural language request associated with stored visual events;

determining, utilizing the LM and based at least in part on the second user input data, that the natural language request is associated with the visual event; and generating a first natural language response to the second user input data indicating that the visual event has been detected, wherein generating the first natural language response is based at least in part on the first data indicating occurrence of the visual event.

14. The system of claim 13, the operations further comprising:

determining, utilizing the LM, a description of an image data frame received at the device;

receiving third user input data requesting determination of whether an additional visual event has occurred, the additional visual event differing from the activity indicator;

determining, utilizing the LM and based at least in part on the third user input data, that the description is associated with the additional visual event; and generating a second natural language response indicating occurrence of the additional visual event based at least in part on determining that the description is associated with the additional visual event.

15. The system of claim 13, the operations further comprising:

determining a routine associated with the device, the routine indicating an action to be performed upon occurrence of an additional activity; and generating an additional activity indicator based at least in part on the routine.

16. The system of claim 13, the operations further comprising:

receiving third user input data requesting a summary of occurrences of the visual event over a period of time;

determining, utilizing the LM, additional occurrences of the activity from additional image data received over the period of time;

storing visual event identifiers of the activity on the device over the period of time; and generating, utilizing the LM and the visual event identifiers, the summary of the occurrences of the visual event over the period of time.

17. The system of claim 13, the operations further comprising:

determining a keyframe representing the image data;

inputting the keyframe into the LM;

receiving, from the LM, a description of the keyframe;

storing the description of the keyframe on the device;

querying at least one of the LM or another LM disposed on the device to determine, from the description of the keyframe, whether the image data depicts the activity; and wherein determining that the image data depicts the activity comprises determining that the image data depicts the activity based at least in part on the description of the keyframe.

18. The system of claim 13, the operations further comprising:

determining to store the first data including the image data and an indication that the activity was detected for a first period of time based at least in part on the visual event being detected;

receiving additional image data; and determining to store the additional image data for a second period of time based at least in part on the additional image data being unassociated with one or more activity indicators stored on the device, the second period of time being less than the first period of time.

19. The system of claim 13, the operations further comprising:

determining that the first user input data indicates an object associated with the activity and a user associated with the activity;

determining, utilizing the LM, that the activity determined from the image data is performed in association with the object and the user; and wherein generating the first natural language response comprises generating the first natural language response based at least in part on the activity being performed in association with the object and the user.

20. The system of claim 13, the operations further comprising:

determining, from the image data, a subset of frames of the image data to be analyzed by the LM at the device, the subset of frames determined based at least in part on pixel differences detected as between consecutive frames of the image data;

inputting the subset of frames into the LM along with the first query, wherein the first query prompts the LM to determine whether the activity is determined from individual frames of the subset of frames; and receiving, from the LM, an identification of which of the individual frames are associated with the activity.

* * * * *